United States Patent
De Rossi et al.

(10) Patent No.: US 9,523,864 B2
(45) Date of Patent: Dec. 20, 2016

(54) METHOD FOR DETERMINING A PROGRESSIVE OPHTHALMIC LENS

(75) Inventors: Helene De Rossi, Charenton le Pont (FR); Fabien Muradore, Charenton le Pont (FR)

(73) Assignee: ESSILOR INTERNATIONAL (COMPAGNIE GENERALE D'OPTIQUE), Charenton-le-Pont (FR)

(*) Notice: Subject to any disclaimer, the term of this patent is extended or adjusted under 35 U.S.C. 154(b) by 352 days.

(21) Appl. No.: 14/002,436

(22) PCT Filed: Nov. 16, 2011

(86) PCT No.: PCT/EP2011/070284
§ 371 (c)(1),
(2), (4) Date: Aug. 30, 2013

(87) PCT Pub. No.: WO2012/119668
PCT Pub. Date: Sep. 13, 2012

(65) Prior Publication Data
US 2013/0335699 A1    Dec. 19, 2013

(30) Foreign Application Priority Data
Mar. 7, 2011   (EP) .................................... 11305234

(51) Int. Cl.
G02C 7/06       (2006.01)
G02C 7/02       (2006.01)

(52) U.S. Cl.
CPC ............... *G02C 7/024* (2013.01); *G02C 7/025* (2013.01); *G02C 7/06* (2013.01); *G02C 7/061* (2013.01); *G02C 7/063* (2013.01)

(58) Field of Classification Search
CPC .......... G02C 7/06; G02C 7/068; G02C 7/024; G02C 7/025; G02C 7/027; G02C 7/028; G02C 7/041; G02C 7/063
(Continued)

(56) References Cited

U.S. PATENT DOCUMENTS 4,055,379 A   10/1977   Winthrop
4,606,626 A   8/1986    Shinohara
(Continued)

FOREIGN PATENT DOCUMENTS

EP   0 461 624   12/1991
EP   0 990 939   4/2000
(Continued)

OTHER PUBLICATIONS

International Search Report dated Feb. 22, 2012, corresponding to PCT/EP2011/070284.

*Primary Examiner* — Bumsuk Won
*Assistant Examiner* — William R Alexander
(74) *Attorney, Agent, or Firm* — Young & Thompson

(57) ABSTRACT

Method for determining a progressive ophthalmic lens wherein: a first or a second reference axes ($\Gamma_1$, $\Gamma_2$) are determined, the first reference axis being set to a value comprised between [$\gamma_T-20°$, $\gamma_T+20°$] with $\gamma_T$ being the average axis of astigmatism over a first temporal portion, and the second reference axis being set to a value comprised between [$\gamma_N-20°$, $\gamma_N+20°$] with $\gamma_N$ being the average axis of astigmatism over a second nasal portion; over the first portion, the sphere value along the first reference axis is superior to the sphere value along a perpendicular axis to the first reference axis (SPH($\Gamma_1$))>SPH($\bot\Gamma_1$)); or over the second portion, the sphere value along the second reference axis is superior to the sphere value along a perpendicular axis to the second reference axis ((SPH($\Gamma_2$))>(SPH($\bot\Gamma_2$)).

11 Claims, 82 Drawing Sheets

(58) Field of Classification Search
USPC ............ 351/159.05, 159.06, 159.41, 159.42, 351/159.73–159.77
See application file for complete search history.

(56) References Cited

U.S. PATENT DOCUMENTS

| | | | |
|---|---|---|---|
| 5,270,746 | A | 12/1993 | Kato |
| 6,318,859 | B1 | 11/2001 | Baudart et al. |
| 6,382,789 | B1 | 5/2002 | Baudart et al. |
| 7,210,780 | B1* | 5/2007 | Bourdoncle ........... G02C 7/025 351/159.42 |
| 2007/0035696 | A1 | 2/2007 | Altheimer et al. |
| 2010/0026954 | A1* | 2/2010 | Kozu .................... G02C 7/068 351/159.42 |

FOREIGN PATENT DOCUMENTS

| | | |
|---|---|---|
| EP | 2 207 118 | 7/2010 |
| WO | 98 12590 | 3/1998 |
| WO | 2007/069006 | 6/2007 |

\* cited by examiner

Evaluation of Distortion
Gaze Directions $D_A$ and $D_B$
Central Vision

Evaluation of Distortion
Peripheral Ray Directions $D_A$ and $D_B$
Peripheral Vision

METHOD FOR DETERMINING A PROGRESSIVE OPHTHALMIC LENS

FIELD OF THE INVENTION

The invention relates to a method for determining a progressive ophthalmic lens. The invention further relates to a progressive ophthalmic lens, a method for manufacturing a pair of progressive ophthalmic lens, a set of apparatuses for manufacturing a pair of ophthalmic lenses, a set of data, a computer program product and a computer readable medium associated to this method. The invention also relates to a semi-finished lens blank and to a method for manufacturing such a blank.

BACKGROUND OF THE INVENTION

A wearer may be prescribed a positive or negative optical power correction. For presbyopic wearers, the value of the power correction is different for far vision and near vision, due to the difficulties of accommodation in near vision. The prescription thus comprises a far-vision power value and an addition representing the power increment between far vision and near vision. The addition is qualified as prescribed addition. Ophthalmic lenses suitable for presbyopic wearers are multifocal lenses, the most suitable being progressive multifocal lenses.

The ophthalmic prescription can include a prescribed astigmatism. Such a prescription is produced by the ophthalmologist in the form of a pair formed by an axis value (in degrees) and an amplitude value (in diopters). The amplitude value represents the difference between minimal and maximal power in a given direction which enables to correct the visual defect of a wearer. According to the chosen convention, the axis represents the orientation of one of two powers with relation to a reference axis and in the sense of rotation chosen. Usually, the TABO convention is used. In this convention, the reference axis is horizontal and the sense of rotation is anticlockwise for each eye, when looking to the wearer. An axis value of +45° therefore represents an axis oriented obliquely, which when looking to the wearer, extends from the quadrant located up on the right to the quadrant located down on the left. Such an astigmatism prescription is measured on the wearer looking in far vision. The term <<astigmatism>> is used to designate the pair (amplitude, angle); despite this use not being strictly correct, this term is also used to refer to the amplitude of the astigmatism. The person skilled in the art can understand from the context which meaning is to be considered. It is also known for the person skilled in the art that the prescribed power and astigmatism of a wearer are usually called sphere SPH, cylinder CYL and axis. FIG. 1 is a schematic illustration of the prescription expressed in TABO referential desired for the left eye of a wearer. The axis of the prescription (65° here) gives the direction of the smallest power which is, in this case, 3.50 δ whereas the highest power is along the direction which is perpendicular to the axis of the prescription and its value corresponds to +3.50 δ+0.25 δ=3.75 δ. The mean power (also called the mean sphere SM) is the arithmetical average of the smallest power and the highest power and is equal to 3.625 δ.

As explained above, the most suitable lenses for presbyopic wearers are progressive multifocal lenses. However, such lenses induce optical defects that must be minimised in order to satisfy the wearer. When an image perceived by a wearer is formed through a lens, several phenomena degrading the imaging performances of a lens occur. Power defect, astigmatism defect and high order aberrations are example of optical defects which impact the optical quality of the image, then reducing its sharpness and its contrast. The optical defects also modify the appearance of the object perceived by the wearer. Indeed, an object may appear distorted (the shape of the image is modified) and/or delocalized compared to the object.

When designing a progressive multifocal lens, it is therefore sought to reduce as much as possible the optical defects even tough it is not possible to cancel them completely because of the power increment. Thus, it is also sought to spread the defects in such a way that the wearer's vision is the least affected by the remaining optical defects.

The person skilled in the art knows how to compensate for optical defects which comprise among others the power defect and astigmatism defect as described in EP-A-0,990,939, U.S. Pat. No. 5,270,746 (EP-A-0,461,624) and WO-A-98 12590. The lens designer has to handle two contradicting constraints when compensating the optical defects. On the one hand, he needs to design large central zones to provide the wearer with comfortable vision, when reading for instance. This can be done by pushing away the optical defects in lateral zones of the vision field thereby producing important gradients in the periphery of the vision field which impact dynamic vision. On the other hand, the designer needs to limit the gradients in the periphery of the vision field to improve dynamic vision; this being detrimental to the size of the central vision zone. Known methods oblige to a compromise between central and peripheral vision performances.

Moreover, the above-mentioned methods do only consider optical criteria which first of all improve or degrade the sharpness of the image perceived by the wearer. For instance, criteria of power, astigmatism and higher order of aberration are dealt with. The lens designer will make a compromise among those criteria to limit distortion of the image perceived through the lens. Thereby, the lenses are typically a compromise between sharpness and image deformation.

SUMMARY OF THE INVENTION

The aim of the present invention is to alleviate at least partly the above mentioned drawbacks.

More particularly, the invention aims to improve the comfort of wearing an ophthalmic lens for the wearer for whom the lens is intended by improving the performance of the lens relative to image deformation, i.e. distortion while guaranteeing a good sharpness.

This object is achieved with a method for determining a progressive ophthalmic lens, the lens comprising a main meridian separating the lens in a nasal area and a temporal area, the method comprising the steps of:

choosing a target optical function suited to the wearer, the target optical function defining, for each gaze direction when the lens is worn, a refractive power, a module of astigmatism and an axis of astigmatism, each gaze direction corresponding to a lowering angle and to an azimuth angle;

defining a first surface of the lens and a second surface of the lens, each surface having in each point a mean sphere value, a cylinder value and a cylinder axis, defining at least one first portion in the temporal area and at least one second portion in the nasal area;

for at least one of the first or the second portion of the first surface, determining respectively a first or a second reference axes, the first reference axis being set to a value comprised between [$\gamma_T$–20°, $\gamma_T$+20°] with $\gamma_T$ being the average axis of astigmatism of the target optical function for gaze directions intersecting the first surface over the first temporal portion, and the second reference axis being set to a value comprised between [$\gamma_N$–20°, $\gamma_N$+20°] with $\gamma_N$ being the average axis of astigmatism of the target optical function for gaze directions intersecting the first surface over the second nasal portion;

modifying the first surface so that:
over the first portion, the sphere value along the first reference axis is superior to the sphere value along a perpendicular axis to the first reference axis; or
over the second portion, the sphere value along the second reference axis is superior to the sphere value along a perpendicular axis to the second reference axis.

According to an embodiment, the first and the second reference axes are determined respectively for the first and second portion of the first surface and the first surface is modified so that:
over the first portion, the sphere value along the first reference axis is superior to the sphere value along a perpendicular axis to the first reference axis; and
over the second portion, the sphere value along the second reference axis is superior to the sphere value along a perpendicular axis to the second reference axis.

According to another embodiment, the first reference axis is determined for the first portion of the first surface and wherein the first surface is modified so that:
over the first portion, the sphere value along the first reference axis is superior to the sphere value along a perpendicular axis to the first reference axis; and
over the second portion, the sphere value along the first reference axis is superior to the sphere value along a perpendicular axis to the first reference axis.

According to another embodiment, the second reference axis is determined for the second portion of the first surface and wherein the first surface is modified so that:
over the first portion, the sphere value along the second reference axis is superior to the sphere value along a perpendicular axis to the second reference axis; and
over the second portion, the sphere value along the second reference axis is superior to the sphere value along a perpendicular axis to the second reference axis.

According to an embodiment, the first surface is modified so that the first surface is a toric surface with a cylinder axis in each point set to the determined reference axis.

According to an embodiment, the average axis of astigmatism of the target optical function is the average axis of prescribed astigmatism or the average axis of total astigmatism or the average axis of residual astigmatism for gaze directions intersecting the first surface over the portion considered.

According to an embodiment, the method further comprises a step of modifying the second surface to meet the target optical function.

According to an embodiment, the first reference axis is set to the average axis of astigmatism over the first temporal portion and wherein the second reference axis is set to the average axis of astigmatism over the second nasal portion.

According to an embodiment, each respective reference axis is defined by optical optimization to minimize the distortion over the respective portion.

According to an embodiment, the first surface has an upper part constituted by points of intersection with gaze directions corresponding to a negative lowering angle and a lower part of the lens constituted by points of intersection with gaze directions corresponding to a positive lowering angle, a vertical axis being defined based on micro-markings of the lens, the first surface being also modified so that:
over the first portion, the mean sphere value decreases along any line parallel to the vertical axis orientated from the upper part to the lower part, and
over the second portion, the mean sphere value decreases along any line parallel to the vertical axis orientated from the upper part to the lower part.

The invention also relates to a progressive ophthalmic lens having, when being worn and for each gaze direction, a refractive power, a module of astigmatism and an axis of astigmatism, each gaze direction corresponding to a lowering angle and to an azimuth angle, the lens comprising a first surface and a second surface, each surface having in each point a mean sphere value, a cylinder value and a cylinder axis, the cylinder axis being the axis of the maximum sphere, the lens comprising a main meridian separating the lens in a nasal area and a temporal area, wherein the first surface has:
in at least one first portion of the temporal area, a cylinder axis being comprised between [$\gamma_T$–20°; $\gamma_T$+20°], $\gamma_T$ being the mean axis of astigmatism of the lens over the portion considered; or
in at least one second portion of the nasal area, a cylinder axis being comprised between [$\gamma_N$–20°; $\gamma_N$+20°], $\gamma_N$ being the mean axis of astigmatism of the lens over the portion considered.

According to an embodiment, the first surface has:
in the first portion of the temporal area, a cylinder axis being comprised between [$\gamma_T$–20°; $\gamma_T$+20°], $\gamma_T$ being the mean axis of astigmatism of the lens over the portion considered; and
in the second portion of the nasal area, a cylinder axis being comprised between [$\gamma_N$–20°; $\gamma_N$+20°], $\gamma_N$ being the mean axis of astigmatism of the lens over the portion considered According to another embodiment, the first surface has:
in the first portion of the temporal area, a cylinder axis comprised between 90° and 180°; and
in the second portion of the nasal area, a cylinder axis such that the difference of angle in absolute value between the cylinder axis in the first portion and the cylinder axis in the second portion is superior to 20° ($|\gamma_{AX\_T}-\gamma_{AX\_N}|>20°$), the cylinder axis being defined as the axis of the maximum sphere.

According to another embodiment, the first surface has:
in the first portion of the temporal area, a cylinder axis equal to 155° plus or minus 20°, and
in the second portion of the nasal area, a cylinder axis equal to 27° plus or minus 20°.

According to another embodiment, the first surface has:
in the first portion of the temporal area, a cylinder axis comprised between 0° and 90°; and
in the second portion of the nasal area, a cylinder axis comprised between 0° and 90° and such that the difference of angle in absolute value between the cylinder axis in the first portion and the cylinder axis in the second portion is superior to 20° ($|\gamma_{AX\_T}-\gamma_{AX\_N}|>20°$), the cylinder axis being defined as the axis of the maximum sphere.

According to another embodiment, the first surface has:
in the first portion of the temporal area, a cylinder axis comprised between 0° and 70°; and in the second portion of the nasal area, a cylinder axis comprised between 0° and 70°, the cylinder axis being defined as the axis of the maximum sphere.

According to another embodiment, the first surface has:
in the first portion of the temporal area, a cylinder axis comprised between 110° and 180°; and
in the second portion of the nasal area, a cylinder axis comprised between 110° and 180°, the cylinder axis being defined as the axis of the maximum sphere.

According to another embodiment, the first surface has:
in the first portion of the temporal area, a cylinder axis being comprised between $[\gamma_T-20°; \gamma_T+20°]$; and
in the second portion of the nasal area, a cylinder axis being comprised between $[\gamma_T-20°; \gamma_T+20]$,
$\gamma_T$ being the mean axis of astigmatism of the lens over the first portion of the temporal area.

According to another embodiment, the first surface has:
in the first portion of the temporal area, a cylinder axis being comprised between $[\gamma_N-20°; \gamma_N+20°]$; and
in the second portion of the nasal area, a cylinder axis being comprised between $[\gamma_N-20°; \gamma_N+20]$,
$\gamma_N$ being the mean axis of astigmatism of the lens over the first portion of the nasal area.

According to another embodiment, the first surface has a cylinder axis in the second portion of the nasal area equal to the cylinder axis in the first portion of the temporal area.

According to another embodiment, the first surface is a toric surface.

According to an embodiment, the axis of astigmatism is the axis of prescribed astigmatism or is the axis of residual astigmatism of the lens in the portions considered or is the axis of total astigmatism of the lens in the portions considered, the total astigmatism being the combination between the residual astigmatism and the prescribed astigmatism.

According to another embodiment, the lens has, when being worn, an upper part defined for gaze directions corresponding to a negative lowering angle and a lower part defined for gaze directions corresponding to a positive lowering angle, a vertical axis being defined based on micro-markings of the lens and wherein the first surface has:
in at least one first portion of the temporal area, a mean sphere value that decreases along any line parallel to the vertical axis orientated from the upper part to the lower part;
in at least one second portion of the nasal area, a mean sphere value that decreases along any line parallel to the vertical axis orientated from the upper part to the lower part.

According to another embodiment, the first surface has a mean sphere value that remains substantially constant along the meridian.

The invention also relates to a computer program product comprising one or more stored sequence of instruction that is accessible to a processor and which, when executed by the processor, causes the processor to carry out the steps of the method of the invention. The invention also relates to a computer readable medium carrying out one or more sequences of instructions of the computer program product of the invention. The invention further relates to a set of data comprising data relating to a first surface of a lens determined according to the method of the invention.

The invention also relates to a method for manufacturing a progressive ophthalmic lens, comprising the steps of:
providing data relative to the eyes of a wearer,
transmitting data relative to the wearer,
determining a first surface of a lens according to the method of the invention,
transmitting data relative to the first surface,
carrying out an optical optimization of the lens based on the transmitted data relative to the first surface,
transmitting the result of the optical optimization,
manufacturing the progressive ophthalmic lens according to the result of the optical optimization.

The invention further relates to a set of apparatuses for manufacturing a progressive ophthalmic lens, wherein the apparatuses are adapted to carry out steps of such method.

The invention also relates to a method for manufacturing a semi-finished lens blank comprising the steps of:
defining a first surface and a second unfinished surface, the first surface having in each point a mean sphere value and a cylinder value and a cylinder axis;
choosing target optical functions suited for a given prescription set, the target optical function defining, for each gaze direction when the lens is worn, a refractive power, a module of astigmatism and an axis of astigmatism, each gaze direction corresponding to a lowering angle and to an azimuth angle;
defining a main meridian separating the first surface in a nasal area and a temporal area;
defining at least one first portion in the temporal area and at least one second portion in the nasal area;
for at least one of the first or the second portions of the first surface, determining respectively a first or a second reference axes, the first reference axis being set to a value comprised between $[\gamma_T-20°, \gamma_T+20°]$ with $\gamma_T$ being the average axis of astigmatism of the target optical function for gaze directions intersecting the first surface over the first temporal portion, and the second reference axis being set to a value comprised between $[\gamma_N-20°, \gamma_N+20°]$ with $\gamma_N$ being the average axis of astigmatism of the target optical function for gaze directions intersecting the first surface over the second nasal portion;
determining the first surface so that:
over the first portion, the sphere value along the first reference axis is superior to the sphere value along a perpendicular axis to the first reference axis; or
over the second portion, the sphere value along the second reference axis is superior to the sphere value along a perpendicular axis to the second reference axis;
surfacing or molding the first surface.

Further features and advantages of the invention will appear from the following description of embodiments of the invention, given as non-limiting examples, with reference to the accompanying drawings listed hereunder.

Figure 1:
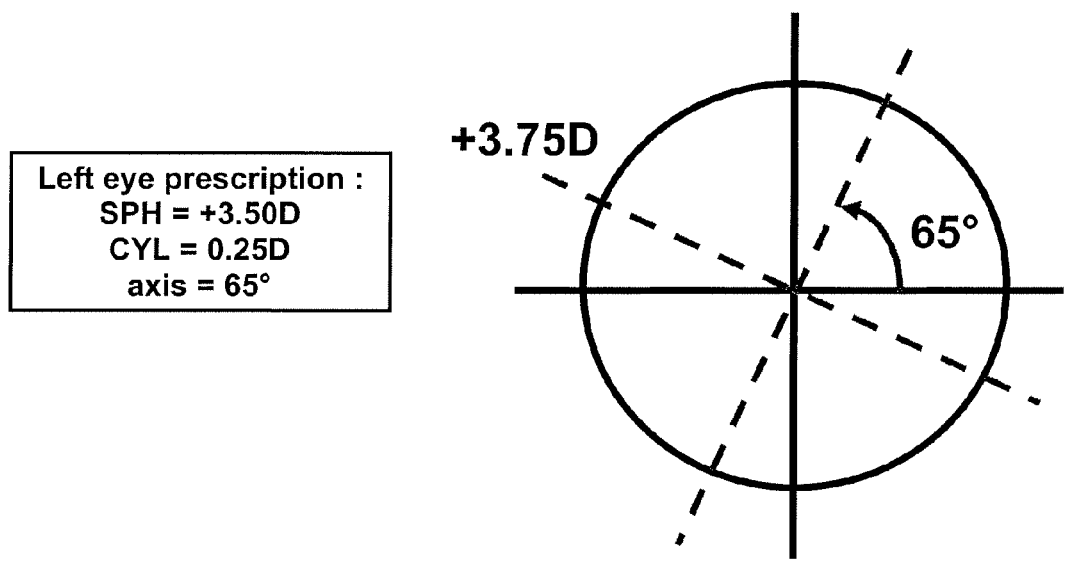
FIG. 1 shows a schematic illustration of the prescription desired for the left eye of a wearer expressed in TABO convention.

It can be appreciated that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF PREFERRED EMBODIMENTS

A method for determining a progressive ophthalmic lens is proposed. This method enables an improved distortion without degrading the performance in term of correction of the optical power and astigmatism. This results in an increased comfort for the wearer.

A progressive lens comprises two non-rotationally symmetrical aspheric surfaces, for instance but not limited to, progressive surface, regressive surface, toric or atoric surfaces.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in dioptres.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface, the expressions are the following:

$$SPH_{min} = (n-1)*CURV_{min} = \frac{n-1}{R_{max}} \text{ and } SPH_{max} = (n-1)*CURV_{max} = \frac{n-1}{R_{min}}$$

where n is the index of the constituent material of the lens.

If the surface considered is an eyeball side surface, the expressions are the following:

$$SPH_{min} = (1-n)*CURV_{min} = \frac{1-n}{R_{max}} \text{ and } SPH_{max} = (1-n)*CURV_{max} = \frac{1-n}{R_{min}}$$

where n is the index of the constituent material of the lens.

As it is known, a mean sphere $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula CYL=|SPH$_{max}$−SPH$_{min}$|.

The characteristics of any aspherical face of the lens may be expressed by means of the local mean spheres and cylinders. A surface can be considered as locally aspherical when the cylinder is at least 0.25 diopters.

Figure 2:
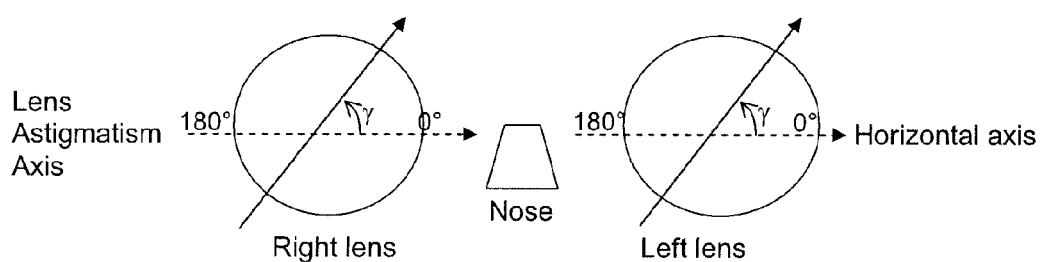
FIG. 2 illustrates the astigmatism axis γ of a lens in the TABO convention.

For an aspherical surface, a local cylinder axis $\gamma_{AX}$ may further be defined. FIG. 2 illustrates the astigmatism axis γ as defined in the TABO convention and FIG. 3 illustrates the cylinder axis $\gamma_{AX}$ in a convention defined to characterize an aspherical surface.

The cylinder axis $\gamma_{AX}$ is the angle of the orientation of the maximum curvature CURV$_{max}$ with relation to a reference axis and in the chosen sense of rotation. In the above defined convention, the reference axis is horizontal (the angle of this reference axis is 0°) and the sense of rotation is anticlockwise for each eye, when looking to the wearer (0°≤$\gamma_{AX}$≤180°). An axis value for the cylinder axis $\gamma_{AX}$ of +45° therefore represents an axis oriented obliquely, which when looking to the wearer, extends from the quadrant located up on the right to the quadrant located down on the left.

Figure 3:
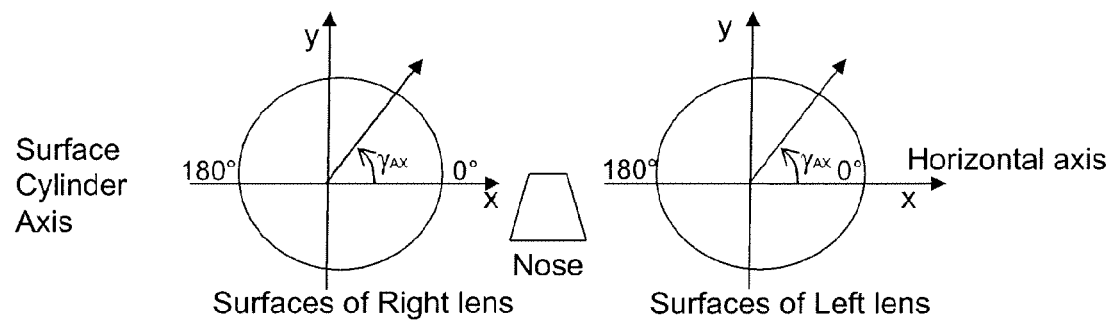
FIG. 3 illustrates the cylinder axis $\gamma_{AX}$ in a convention used to characterize an aspherical surface.
Figure 4:
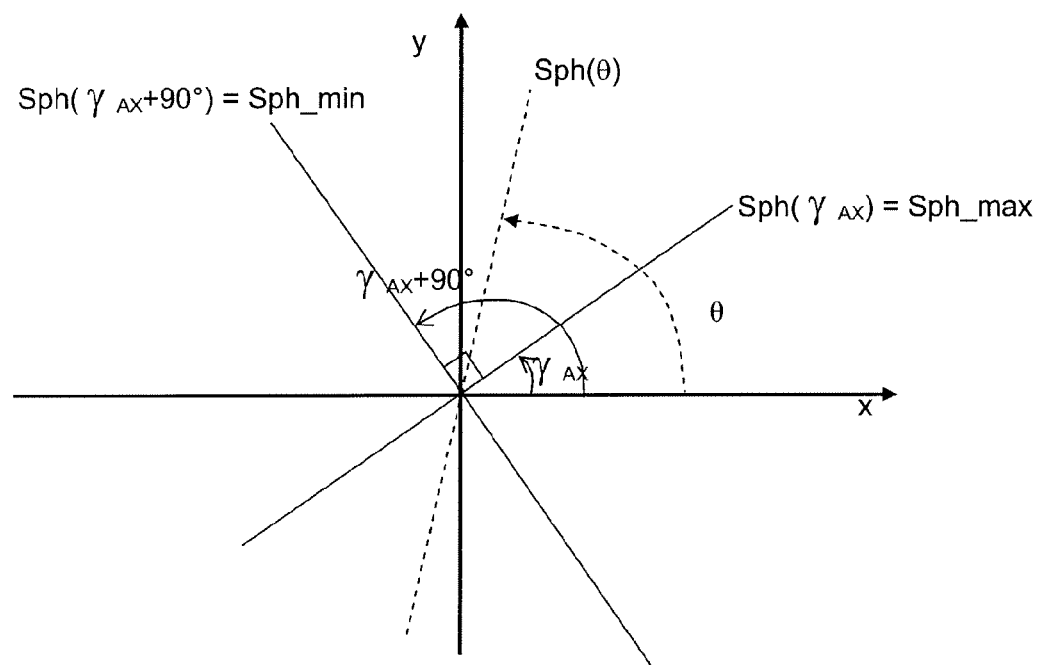
FIG. 4 illustrates the local sphere along any axis.

In addition, based on the knowledge of the value of the local cylinder axis $\gamma_{AX}$, Gauss formula enables to express the local sphere SPH along any axis θ, θ being a given angle in the referential defined in FIG. 3. The axis θ is shown in FIG. 4.

$$SPH(\theta)=SPH_{max}\cos^2(\theta-\gamma_{AX})+SPH_{min}\sin^2(\theta-\gamma_{AX})$$

As expected, when using the Gauss formula, SPH ($\gamma_{AX}$)=SPH$_{max}$ and SPH ($\gamma_{AX}$+90°)=SPH$_{min}$.

Figure 5:
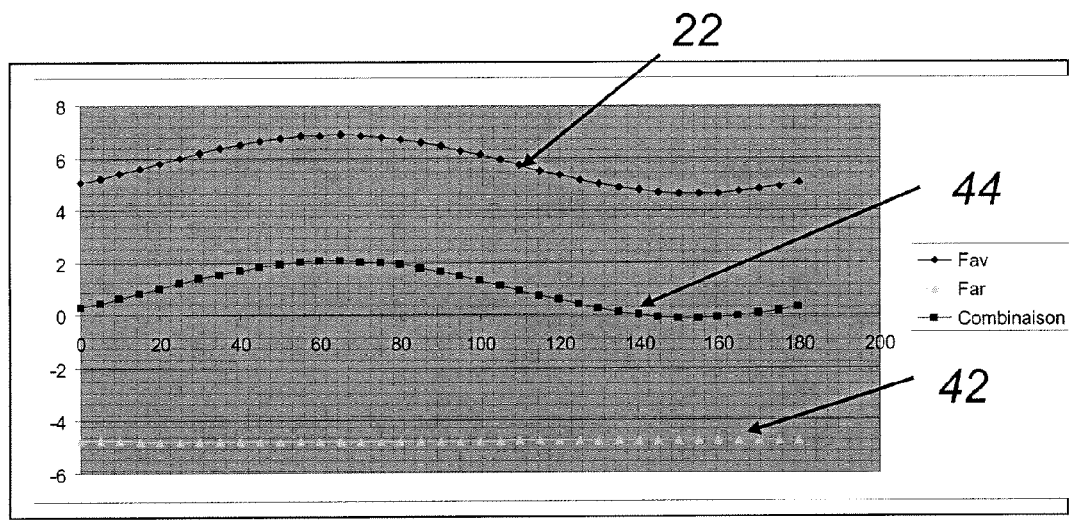
FIG. 5 is an illustration of the variation of a local sphere value in accordance with Gauss Formula.

The FIG. 5 is an illustration of such variation for an example of a point of the object surface. This is the curve 22. In this particular case, the maximum sphere is 7.0 δ, the minimum sphere is 5.0 δ and $\gamma_{AX}$=65°.

The Gauss formula can also be expressed in term of curvature so that the curvature CURV along each axis forming an angle θ with the horizontal axis by:

$$CURV(\theta)=CURV_{max}\cos^2(\theta-\gamma_{AX})+CURV_{min}\sin^2(\theta-\gamma_{AX})$$

A surface may thus be locally defined by a triplet constituted by the maximum sphere SPH$_{max}$, the minimum sphere SPH$_{min}$ and the cylinder axis $\gamma_{AX}$. Alternatively, the triplet may be constituted by the mean sphere SPH$_{mean}$, the cylinder CYL and the cylinder axis $\gamma_{AX}$.

Figure 6:
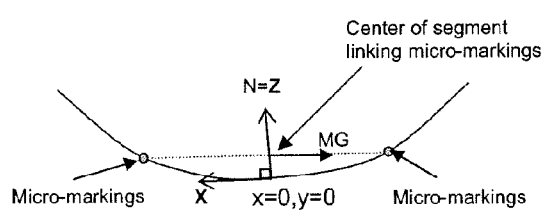
FIGS. 6 and 7 show referential defined with respect to micro-markings, for a surface bearing micro-markings and for a surface not bearing the micro-markings respectively.
Figure 7:
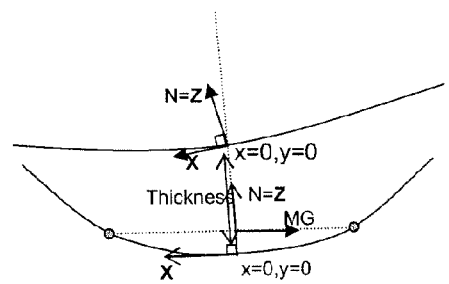

Whenever a lens is characterized by reference to one of its aspherical surfaces, a referential is defined with respect to micro-markings as illustrated in FIGS. 6 and 7, for a surface bearing micro-markings and for a surface not bearing the micro-markings respectively.

Progressive lenses comprise micro-markings that have been made mandatory by a harmonized standard ISO 8990-2. Temporary markings may also be applied on the surface of the lens, indicating positions of control points on the lens, such as a control point for far vision, a control point for near vision, a prism reference point and a fitting cross for instance. If the temporary markings are absents or have been erased, it is always possible to a skilled person to position the control points on the lens by using a mounting chart and the permanent micro-markings.

The micro-markings also make it possible to define referential for both surfaces of the lens.

FIG. 6 shows the referential for the surface bearing the micro-markings. The center of the surface (x=0, y=0) is the point of the surface at which the normal N to the surface intersect the center of the segment linking the two micro-markings. MG is the collinear unitary vector defined by the two micro-markings. Vector Z of the referential is equal to the unitary normal (Z=N); vector Y of the referential is equal to the vector product of Z by MG; vector X of the referential is equal to the vector product of Y by Z. {X, Y, Z} thereby form a direct orthonormal trihedral. The center of the referential is the center of the surface x=0 mm, y=0 mm. The X axis is the horizontal axis and the Y axis is the vertical axis as it shown in FIG. 3.

FIG. 7 shows the referential for the surface opposite to the surface bearing the micro-markings. The center of this second surface (x=0, y=0) is the point at which the normal N intersecting the center of the segment linking the two micro-markings on the first surface intersects the second surface. Referential of the second surface is constructed the same way as the referential of the first surface, i.e. vector Z is equal to the unitary normal of the second surface; vector Y is equal to the vector product of Z by MG; vector X is equal to the vector product of Y by Z. As for the first surface, the X axis is the horizontal axis and the Y axis is the vertical axis as it shown in FIG. 3. The center of the referential of the surface is also x=0 mm, y=0 mm.

Similarly, on a semi-finished lens blank, standard ISO 10322-2 requires micro-markings to be applied. The center of the aspherical surface of a semi-finished lens blank can therefore be determined as well as a referential as described above.

Moreover, a progressive multifocal lens may also be defined by optical characteristics, taking into consideration the situation of the person wearing the lenses.

Figure 8:
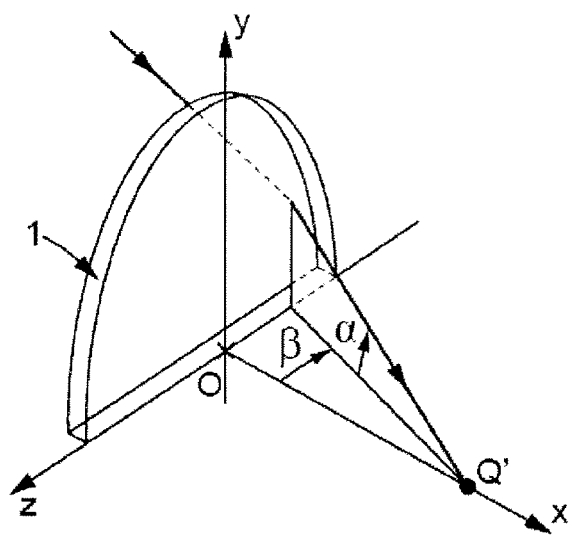
FIGS. 8 and 9 show, diagrammatically, optical systems of eye and lens.
Figure 9:
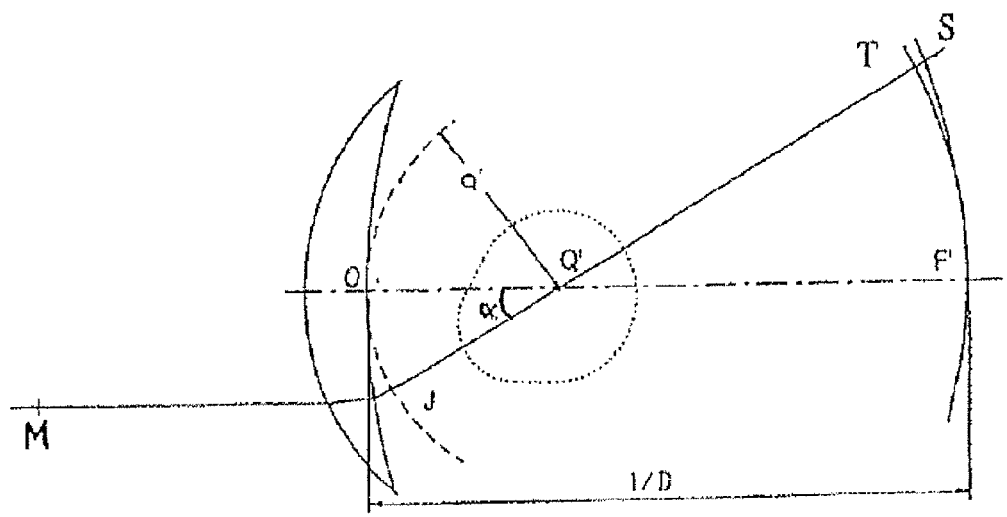

FIGS. 8 and 9 are diagrammatic illustrations of optical systems of eye and lens, thus showing the definitions used in the description. More precisely, FIG. 8 represents a perspective view of such a system illustrating parameters α and β used to define a gaze direction. FIG. 9 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 9 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', which is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 8—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 8. The angle α is the angle formed between the axis Q'J and the projection of the straight line Q'J on the horizontal plane comprising the axis Q'F'; this angle appears on the scheme on FIGS. 8 and 9. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value towards the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance given by the ergorama is considered for a gaze direction (α,β). An object proximity ProxO is defined for the point M on the corresponding light ray in the object space as the inverse of the distance MJ between point M and point J of the apex sphere:

$$ProxO = 1/MJ$$

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity Prox I is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui = ProxO + ProxI$$

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame $\{Q', x_m, y_m, z_m\}$ linked to the eye. It corresponds to the angle with which the image S or T is formed depending on the convention used with relation to the direction $z_m$ in the plane $\{Q', z_m, y_m\}$.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng. Standard wearing conditions are to be understood as the position of the lens with relation to the eye of a standard wearer, notably defined by a pantoscopic angle of −8°, a lens-pupil distance of 12 mm, a pupil-eye rotation center of 13.5 mm and a wrap angle of 0°. The pantoscopic angle is the angle in the vertical plane between the optical axis of the spectacle lens and the visual axis of the eye in the primary position, usually taken to be the horizontal. The wrap angle is the angle in the horizontal plane between the optical axis of the spectacle lens and the visual axis of the eye in the primary position, usually taken to be the horizontal. Other conditions may be used. Wearing conditions may be calculated from a ray-tracing program, for a given lens. Further, the optical power and the astigmatism may be calculated so that the prescription is either fulfilled at the reference points (i.e control points in far vision) and for a wearer wearing his spectacles in the wearing conditions or measured by a frontofocometer.

Figure 10:
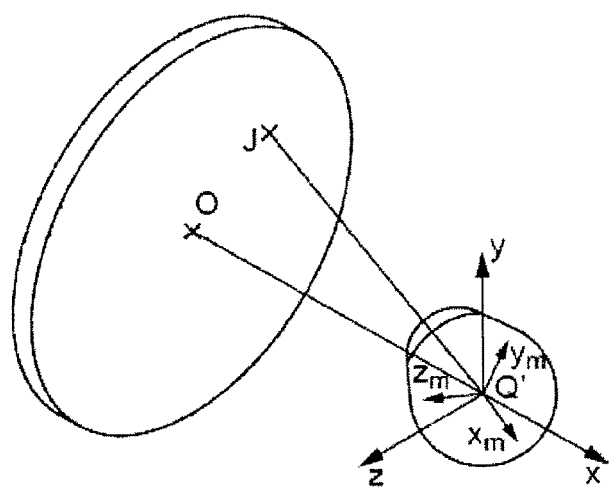
FIG. 10 shows a ray tracing from the center of rotation of the eye.

FIG. 10 represents a perspective view of a configuration wherein the parameters α and β are non zero. The effect of rotation of the eye can thus be illustrated by showing a fixed frame {x, y, z} and a frame $\{x_m, y_m, z_m\}$ linked to the eye. Frame {x, y, z} has its origin at the point Q'. The axis x is the axis Q'O and it is orientated from the lens towards the eye. The y axis is vertical and orientated upwardly. The z axis is such that the frame {x, y, z} be orthonormal and direct. The frame $\{x_m, y_m, z_m\}$ is linked to the eye and its center is the point Q'. The $x_m$ axis corresponds to the gaze direction JQ'. Thus, for a primary gaze direction, the two frames {x, y, z} and $\{x_m, y_m, z_m\}$ are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'. The value in surface terms can be expressed with relation to points. The points are located with the help of abscissa or ordinate in a frame as defined above with respect to FIGS. 3, 6 and 7.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle $\alpha$ of 0° and an azimuth angle $\beta$ of 0° whatever surface of the lens the fitting cross is positioned—rear surface or front surface.

The above description made with reference to FIGS. 8-10 was given for central vision. In peripheral vision, as the gaze direction is fixed, the center of the pupil is considered instead of center of rotation of the eye and peripheral ray directions are considered instead of gaze directions. When peripheral vision is considered, angle $\alpha$ and angle $\beta$ correspond to ray directions instead of gaze directions.

In the remainder of the description, terms like <<up>>, <<bottom>>, <<horizontal>>, <<vertical>>, <<above>>, <<below>>, or other words indicating relative position may be used. These terms are to be understood in the wearing conditions of the lens. Notably, the "upper" part of the lens corresponds to a negative lowering angle $\alpha<0°$ and the "lower" part of the lens corresponds to a positive lowering angle $\alpha>0°$. Similarly, the "upper" part of the surface of a lens—or of a semi-finished lens blank—corresponds to a positive value along the y axis, and preferably to a value along the y axis superior to the y_value at the fitting cross and the "lower" part of the surface of a lens—or of a semi-finished lens blank—corresponds to a negative value along the y axis in the frame as defined above with respect to FIGS. 3, 6 and 7, and preferably to a value along the y axis inferior to the y_value at the fitting cross.

Figure 14:
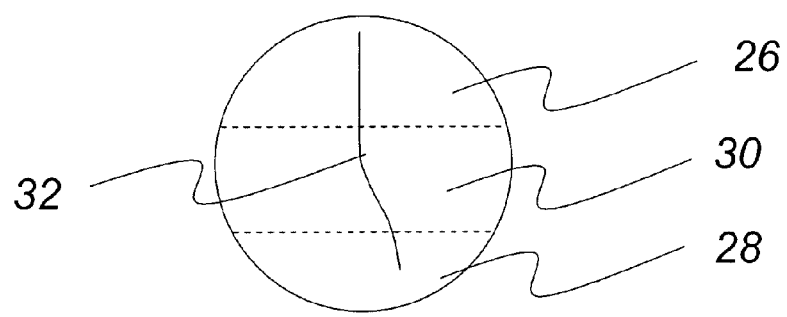
FIGS. 14 and 15 show field vision zones of a lens.
Figure 15:
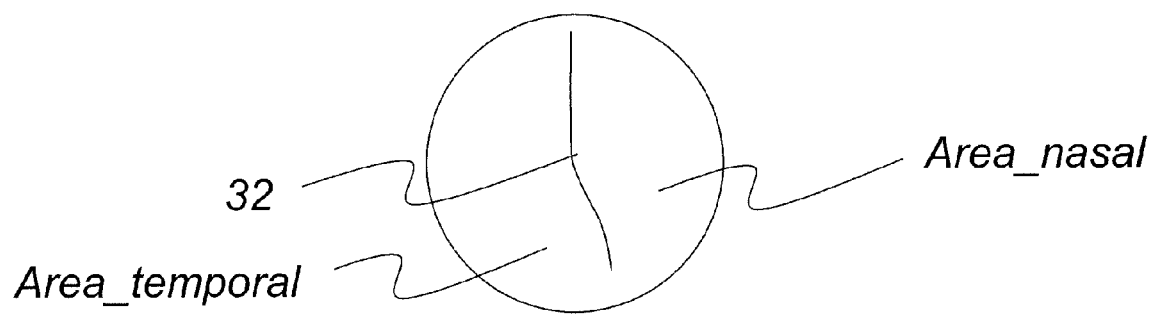

The visual field zones seen through a lens are schematically illustrated in FIGS. 14 and 15. The lens comprises a far vision zone 26 located in the upper part of the lens, a near vision zone 28 located in the lower part of the lens and an intermediate zone 30 situated in the lower part of the lens between the far vision zone 26 and the near vision zone 28. The lens also has a main meridian 32 passing through the three zones and defining a nasal side and a temporal side.

For the purpose of the invention, the meridian line 32 of a progressive lens is defined as follow: for each lowering of the view of an angle $\alpha=\alpha_1$ between the gaze direction corresponding to the fitting cross and a gaze direction being in the near vision zone, the gaze direction $(\alpha_1, \beta_1)$ is searched for which the local residual astigmatism is minimum. Thus, all the gaze directions defined in that way form the meridian line of the ergorama-eye-lens system. The meridian line of the lens represents the locus of mean gaze directions of a wearer when he is looking from far to near visions. The meridian line 32 of a surface of the lens is defined as follow: each gaze direction $(\alpha, \beta)$ belonging to the optical meridian line of the lens intersects the surface in a point $(x, y)$. The meridian line of the surface is the set of points corresponding to the gaze directions of the meridian line of the lens.

As shown in FIG. 15, the meridian 32 separates the lens in a nasal area and a temporal area. As expected, the nasal area is the area of the lens which is between the meridian and the nose of the wearer whereas the temporal area is the area which is between the meridian and the temple of the wearer. The nasal area is labeled Area_nasal and the temporal area is labeled Area_temporal, as it will in the remainder of the description.

The invention relies on a study by the applicant of the distortion. Distortion is a defect which is not related to the resolution of images impacting the sharpness or the contrast of the image formed by the periphery of the visual field of the lens but merely to their shape. In ophthalmic optics, "barrel" distortion occurs with minus lenses whereas "pincushion" distortion occurs with plus lenses; these are inherent in the optical characteristics of simple plus or minus lenses. Distortion can be evaluated in different situations of use of the lens.

Figure 11:
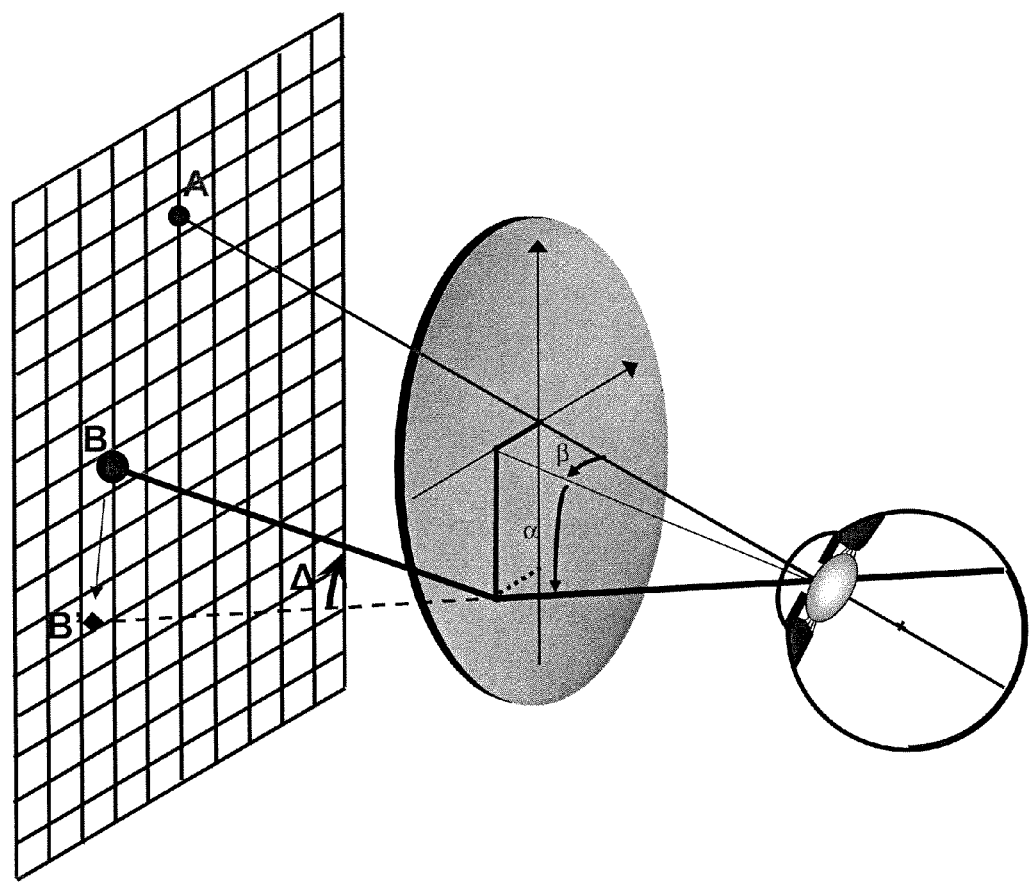
FIGS. 11, 12 and 13 show the effect of distortion in static vision and ways to quantify this phenomenon.
Figure 12:
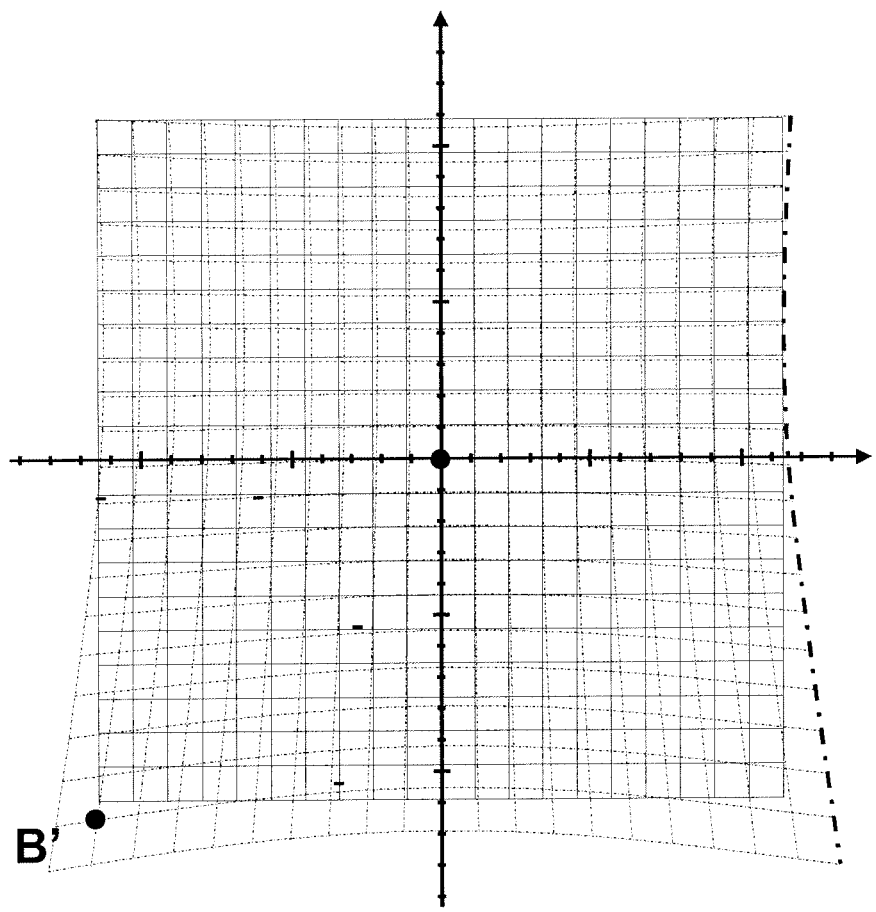
Figure 13:
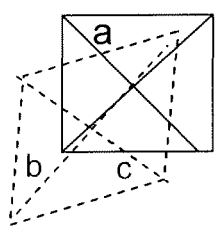

First, a fixation point is imposed to the wearer so that he keeps his eye immobile (thus the gaze direction is fixed). In this case, the distortion which is evaluated is called static distortion and it is evaluated in peripheral vision (named also indirect vision). FIG. 11 illustrates the effect of distortion along a ray seen by a viewer in his peripheral field of vision after passing through a lens. Thus, while the wearer is looking at a point A in central vision, some peripheral points as point B are also seen. Due to prismatic deviation, the wearer has the feeling that the object point is in B' and not in point B. The angle $\Delta$ is a quantitative way of expressing the prismatic deviation which gives to the wearer the illusion that point B is located at point B'. Several quantities can be calculated to evaluate distortion. For instance, we can quantify how a vertical and/or a horizontal line of an object grid seen in the peripheral vision is being curved as it can be seen in FIG. 12. In this figure, the grid seen without the lens which is not deformed is superimposed with the distorted grid seen through the lens. Therefore, it becomes apparent that the distortion has an impact on peripheral vision. Moreover, it also appears that the distortion can be quantified by calculating how a peripheral square is deformed. For this calculation, FIG. 13 is an enlarged view of one square of the grid seen without the lens over which is superimposed the deformed square of the deformed grid seen through the lens. The square has two diagonals whose lengths are labeled a. Thus, the division of the length of each diagonal is a/a=1 in the case of the square of the grid seen without the lens. The corresponding deformed square has two diagonals whose lengths are different and are respectively labeled b and c, b corresponding to a diagonal longer than c. For this deformed square b/c is different from 1. The more this ratio is different from 1 and the more the distortion is important in this area of the lens. Calculating the ratio of the diagonal is thus a way of quantifying distortion.

Distortion can also be evaluated considering that the eye is moving behind the lens and this kind of distortion is named dynamic distortion. It appears in the periphery of the central visual field and it is evaluated in central vision (named also direct vision).

Thus distortion can be evaluated in static vision, i.e. the direction of gaze is fixed and distortion is analyzed in peripheral vision. Distortion can also be evaluated in dynamic vision, i.e. the direction of gaze is free and distortion is analyzed in central vision. Evaluation in static or dynamic vision is made depending on the intended use of the lens. Reference can be made to publication <<La distortion en optique de lunetterie>> by Yves LE GRAND Annales d'Optique Oculaire 5ème annëe N° 1 Janvier 1956.

FIG. 11 illustrates distortion in static vision. In dynamic vision, the quantities analyzed would be different—magnification in peripheral or central vision respectively—but the conclusions remain the same, i.e. magnification variations must be mastered.

So as to reduce distortion, the phenomena which trigger distortion should be pointed out. Concerning progressive multifocal lenses, two phenomena are involved. First, in the periphery of the field of view, the optical mean power in central vision (and consequently the optical mean power in peripheral vision) increases when lowering the gaze direction (or for when lowering the peripheral ray direction) from the upper part of the lens to the lower part of the lens. This effect is due to the fact that to suit the presbyopic wearer needs, the optical power between the far and near visions of the multifocal lens is increasing. In the following, the expression 'upper/lower parts of the lens' means the upper/lower parts of the central or peripheral field of view depending on whether static vision or dynamic vision is considered. This implies that the mean central or peripheral magnifications of the eye-lens system also increases when lowering the gaze or peripheral ray direction from the central or peripheral far vision zone to the central or peripheral near vision zone since mean magnification is, at least at first order, proportional to mean power. A way of reducing distortion is thus to minimize the difference in mean central or peripheral magnification between the far vision zone and the near vision zone.

Figure 16:
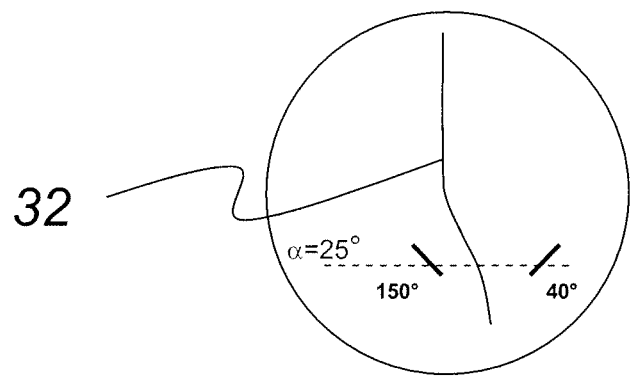
FIGS. 16 and 17 show the phenomena responsible for the distortion.
Figure 17:
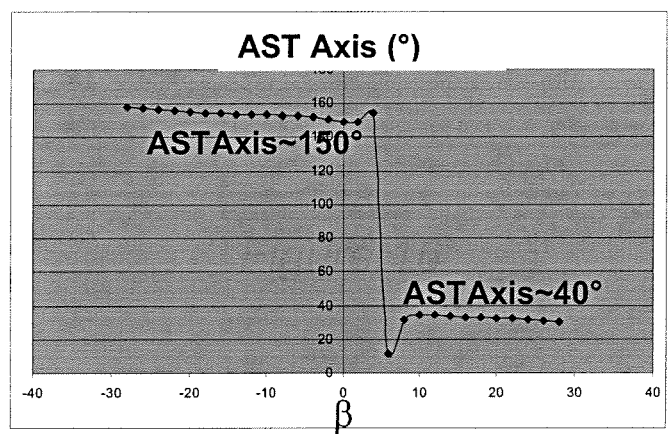

Second, the power progression also generates residual astigmatism on both sides of the meridian line. This observation can be shown by commenting FIGS. 16 and 17 which represent a part of the characteristics of a lens suitable for a wearer whose prescription is a spherical prescription (no astigmatism in the prescription). FIG. 16 is a schematic view of the mean orientation of the astigmatism axis of the lens, the mean value being calculated in the lower part of the lens for a lowering gaze direction equal to 25°. FIG. 17 corresponds to the variation of the axis of the resulting astigmatism evaluated in central vision as a function of azimuth angle $\beta$ for a given fixed lowering angle $\alpha_1$ as it is shown in FIG. 16. It can be observed that on each side of the meridian 32, for a given fixed angle $\alpha_1$, the residual astigmatism axes are nearly constant for all given gaze direction $(\alpha_1,\beta)$. For example, for the selected lens, and for $\alpha_1$, on the temporal side, the axis of resulting astigmatism is about 150° and on the nasal side, it is about 40°. These indications are reported schematically on FIG. 16. Residual astigmatism can be evaluated, such as mean power, in peripheral vision or in central vision. Residual astigmatism is the astigmatism defect that means the astigmatism that is not required to correct the wearer's vision.

Astigmatism has an impact on distortion. Indeed, for each gaze direction, the astigmatism value is the difference between the minimal optical power (optical power along the axis of astigmatism) and the maximal optical power (optical power along the counter axis of astigmatism, the counter axis being defined as equal to the axis of astigmatism+90°), thereby resulting in difference in magnification between the two axes (the axis and the counter axis). Another way of reducing distortion is thus to minimize the difference in central or peripheral magnification between these two axes for each gaze direction Minimizing the difference in magnification between these two axes for each gaze direction while maintaining optical criteria, for example of power and astigmatism, thus enables to improve the performance of the lens relative to distortion while guaranteeing a good sharpness of the image for the wearer.

Figure 18:
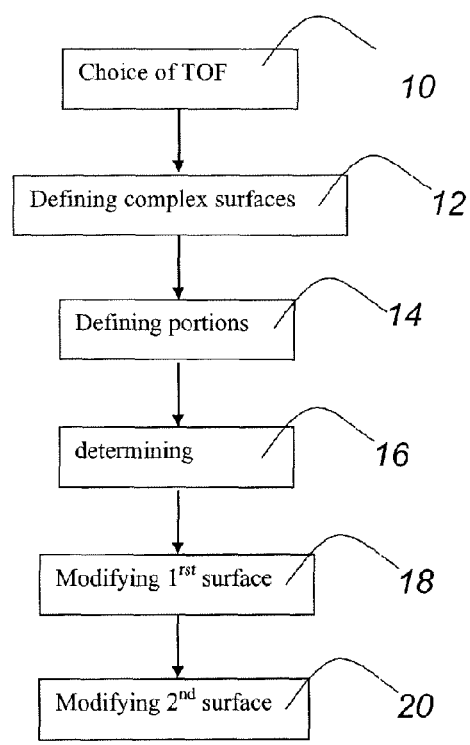
FIG. 18 is a schematic flowchart of the steps of the method for determining a progressive lens according to the invention.

FIG. 18 illustrates a flowchart of an example of the method according to the invention for determining a progressive ophthalmic lens. In this embodiment, the method comprises the step 10 of choosing a target optical function suited to the wearer. As known, to improve the optical performances of an ophthalmic lens, methods for optimizing the parameters of the ophthalmic lens are thus used. Such optimization methods are designed so as to get the optical function of the ophthalmic lens as close as possible to a predetermined target optical function.

The target optical function represents the optical characteristics the ophthalmic lens should have. In the context of the present invention and in the remainder of the description, the term "target optical function of the lens" is used for convenience. This use is not strictly correct in so far as a target optical function has only a sense for a wearer—ophthalmic lens and ergorama system. Indeed, the optical target function of such system is a set of optical criteria defined for given gaze directions. This means that an evaluation of an optical criterion for one gaze direction gives an optical criterion value. The set of optical criteria values obtained is the target optical function. The target optical function then represents the performance to be reached. In the simplest case, there will only be one optical criterion such as optical power or astigmatism; however, more elaborate criteria may be used such as mean power which is a linear combination of optical power and astigmatism. Optical criteria involving aberrations of higher order may be considered. The number of criteria N considered depends on the precision desired. Indeed, the more criteria considered, the more the lens obtained is likely to satisfy the wearer's needs. However, increasing the number N of criteria may result in increasing the time taken for calculation and the complexity to the optimization problem to be solved. The choice of the number N of criteria considered will then be a trade-off between these two requirements. More details about target optical functions, optical criteria definition and optical criteria evaluation can be found in patent application EP-A-2 207 118.

The method also comprises a step 12 of defining a first aspherical surface of the lens and a second aspherical surface of the lens. For instance, the first surface is an object side surface and the second surface is an eyeball side surface. Each surface has in each point a mean sphere value $SPH_{mean}$, a cylinder value CYL and a cylinder axis $\gamma_{AX}$.

The method further encompasses a step 14 of defining at least one first portion Portion1 in the temporal area and at least one second portion Portion2 in the nasal area. Therefore, Portion1 is included in Area_temporal and Portion2 is included in Area$_{\_nasal}$.

Figure 19:
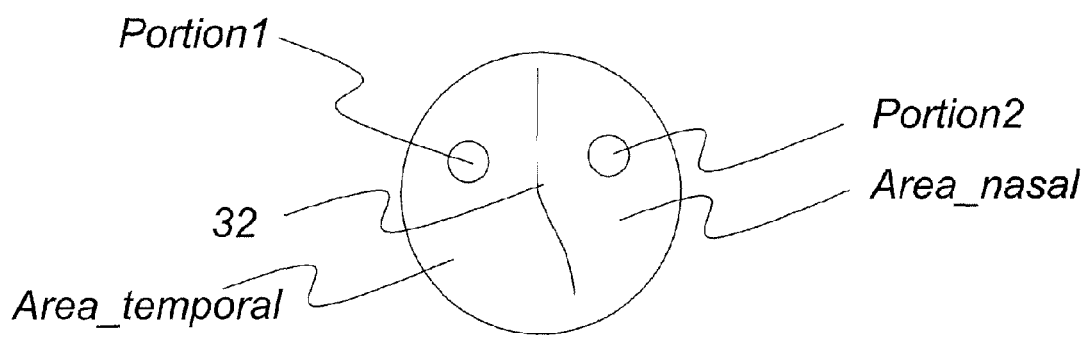
FIG. 19 shows elements of the lens.

Examples of choice of these portions Portion1 and Portion2 are illustrated in FIG. 19. In the example of FIG. 19, the portions are discs which are symmetrical with respect to the meridian 32 of the lens. Those optical zones Portion1 and Portion2 have corresponding portions on the front surface of the lens. Each gaze direction delimiting the optical portions intersects the first aspherical surface (the front surface) so as to define corresponding portions on the front surface Portion1_Front_Surface and Portion2_Front$_{\_Surface}$.

According to embodiments, portions Portion1 and Portion2 in the temporal area and in the nasal area may be defined on the lens as follow: When central vision is considered, Portion1 in the temporal area may be delimited by gaze directions of $0°<\alpha<30°$ and $-40°<\beta<-5°$ and such that resulting astigmatism in the portion considered is more than 0.50 diopters. Portion2 in the nasal area may be delimited by gaze directions of 0°<α<30° and 5°<β<40° and such that resulting astigmatism in the portion considered is more than 0.50 diopters.

When central vision is considered, Portion1 in the temporal area may be further delimited by gaze directions of 5°<α<30° and −30°<β<−10° and such that resulting astigmatism in the portion considered is more than 0.50 diopters. Portion2 in the nasal area may be further delimited by gaze directions of 5°<α<30° and 10°<β<30° and such that resulting astigmatism in the portion considered is more than 0.50 diopters.

When peripheral vision is considered, for a fixed gaze direction in primary gaze direction, Portion1 in the temporal area may be delimited by ray directions of 0°<α<50° and −50°<β<−10° and such that resulting astigmatism in the portion considered is more than 0.50 diopters. Portion2 in the nasal area may be delimited by ray directions of 0°<α<50° and 10°<β<50° and such that resulting astigmatism in the portion considered is more than 0.50 diopters.

When peripheral vision is considered, Portion1 in the temporal area may be further delimited by ray directions of 10°<α<50° and −40°<β<−20° and such that resulting astigmatism in the portion considered is more than 0.50 diopters. Portion2 in the nasal area may be further delimited by ray directions of 10°<α<50° and 20°<β<40° and such that resulting astigmatism in the portion considered is more than 0.50 diopters.

When peripheral vision is considered, for a fixed gaze direction in the intermediate or near visions, Portion1 in the temporal area may be delimited by ray directions of −20°<α<20° and −50°<β<−10° and such that resulting astigmatism in the portion considered is more than 0.50 diopters. Portion2 in the nasal area may be delimited by ray directions of −20°<α<20° and 10°<β<50° and such that resulting astigmatism in the portion considered is more than 0.50 diopters.

When peripheral vision is considered, for a fixed gaze direction in the intermediate or near visions, Portion1 in the temporal area may be further delimited by ray directions of −20°<α<20 and −40°<β<−20° and such that resulting astigmatism in the portion considered is more than 0.50 diopters. Portion2 in the nasal area may be further delimited by ray directions of −20°<α<20 and 20°<β<40° and such that resulting astigmatism in the portion considered is more than 0.50 diopters.

When the lens is mounted, portions Portion1 and Portion2 may be further reduced.

When a surface of the lens is considered, portions Portion1 and Portion2 are defined as the projection of the above defined portions on the surface. In an embodiment, Portion1 could be delimited on the front surface by −20 mm<x<−2.5 mm and 4>y>−11 mm and Portion2 could be delimited on the front surface by 2.5 mm<x<20 mm and 4>y>−11 mm. In an embodiment, Portion1 could be further delimited on the front surface by −15 mm<x<−5 mm and 0>y>−11 mm and Portion2 could be further delimited on the front surface by 5 mm<x<15 mm and 0>y>−11 mm.

The method also comprises a determining step 16. During this step, for the first portion of the first surface Portion1_Front_Surface, a first reference axis $\Gamma_1$ is determined based on the mean axis of astigmatism $\gamma_T$ of the target optical function for gaze directions belonging to Portion1. The value of the angle $\Gamma_1$ is expressed with relation to the horizontal axis by using convention as described earlier. $\gamma_T$ corresponds to a mean value of the different axis of astigmatism $\gamma_{\alpha,\beta}$ for gaze directions intersecting the first surface in the first portion Portion1. Mathematically, this means that $\gamma_T = <\gamma_{\alpha,\beta}>_{Portion1}$. For the second portion of the first surface Portion2_Front_Surface, a second reference axis $\Gamma_2$ is also determined based on the mean axis of astigmatism $\gamma_N$ of the target optical function for gaze directions belonging to Portion2. Similarly, the value of the angle $\Gamma_2$ is expressed with relation to the horizontal axis by using the convention described earlier and $\gamma_N$ corresponds to a mean value of the different axis of astigmatism $\gamma_{\alpha,\beta}$ for gaze directions intersecting the first surface in the second portion Portion2. Mathematically, this means that $\gamma_N = <\gamma_{\alpha,\beta}>_{Portion2}$.

Alternatively, during the determining step 16, only one of the first or the second reference axis $\Gamma_1$, $\Gamma_2$ may be determined.

Notably, during the determining step 16, only the first reference axis $\Gamma_1$ is determined based on the mean axis of astigmatism $\gamma_T$ of the target optical function for gaze directions belonging to the first portion Portion1 of the first surface, i.e. on the temporal side where distortion may bother the most the peripheral vision of the wearer.

Alternatively, during the determining step 16, only the second reference axis $\Gamma_2$ is determined based on the mean axis of astigmatism $\gamma_N$ of the target optical function for gaze directions belonging to the second portion Portion2 of the first surface, i.e. on the nasal side where distortion sometimes bothers the wearer in a reading position.

The method further comprises a step 18 of modifying the first surface. The first surface is modified so that over the first portion Portion1_Front_Surface, the sphere value along the first reference axis $\Gamma_1$ is superior to the sphere value along a perpendicular axis to the first reference axis $\Gamma_1$ (condition 1) and over the second portion Portion2_Front_Surface, the sphere value along the second reference axis $\Gamma_2$ superior to the sphere value along a perpendicular axis to the second reference axis $\Gamma_2$ (condition 2). These conditions can be expressed mathematically as:

condition 1: over the first portion, SPH($\Gamma_1$)>SPH($\perp\Gamma_1$) and condition 2: over the second portion, SPH($\Gamma_2$)>SPH($\perp\Gamma_2$)

where SPH ($\Gamma_1$) is the sphere value along the first reference axis $\Gamma_1$, SPH($\perp\gamma_1$) the sphere value along a perpendicular axis to the first reference axis $\Gamma_1$, SPH($\Gamma_2$) is the sphere value along the second reference axis $\Gamma_2$ and SPH ($\perp\Gamma_2$) the sphere value along a perpendicular axis to the second reference axis $\Gamma_2$.

In term of curvature, the first surface being the object side surface, the conditions 1 and 2 can be expressed as:

condition 1: over the first portion, CURV($\Gamma_1$)>CURV ($\perp\beta_1$) and condition 2: over the second portion, CURV ($\Gamma_2$)>CURV ($\perp\Gamma_2$)

where CURV($\Gamma_1$) is the curvature value along the first reference axis $\Gamma_1$, CURV($\perp\Gamma_1$) the curvature value along a perpendicular axis to the first reference axis $\Gamma_1$, CURV($\Gamma_2$) is the curvature value along the second reference axis $\Gamma_2$ and CURV($\perp\Gamma_2$) the curvature value along a perpendicular axis to the second reference axis $\Gamma_2$.

When only one of the first or the second reference axis $\Gamma_1$, $\Gamma_2$ is determined during the determination step 16, the modifying step 18 comprises modifying the first surface so that either over the first portion Portion1_Front_Surface or over the second portion Portion2_Front_Surface, the sphere value along the determined reference axis $\Gamma_1$ or $\Gamma_2$ is superior to the sphere value along a perpendicular axis to the said reference axis $\Gamma_1$ or $\Gamma_2$. These conditions can be expressed mathematically as:

condition 1: over the first portion, $SPH(\Gamma_1) > SPH(\perp\Gamma_1)$ or
condition 2: over the second portion, $SPH(\Gamma_2) > SPH(\perp\Gamma_2)$.

When only one of the first or the second reference axis $\Gamma_1$, $\Gamma_2$ is determined during the determination step 16, the modifying step 18 may apply condition 1 over the first portion and let the second portion free of condition 2 or may apply condition 2 over the second portion and let the first portion free of condition 1.

Alternatively, when only the first reference axis $\Gamma_1$ is determined during the determination step 16, the modifying step 18 may comprise modifying the first surface so that over the first portion Portion1_Front_Surface, the sphere value along the first reference axis $\Gamma_1$ is superior to the sphere value along a perpendicular axis to the first reference axis $\Gamma_1$ (condition 1) and over the second portion Portion2_Front_Surface, the sphere value along the first reference axis $\Gamma_1$ superior to the sphere value along a perpendicular axis to the first reference axis $\Gamma_1$ (condition 1'). These conditions can be expressed mathematically as:
condition 1: over the first portion, $SPH(\Gamma_1) > SPH(\perp\Gamma_1)$
and
condition 1': over the second portion, $SPH(\Gamma_1) > SPH(\perp\Gamma_1)$ Alternatively, when only the second reference axis $\Gamma_2$ is determined during the determination step 16, the modifying step 18 may comprise modifying the first surface so that over the first portion Portion1_Front_Surface, the sphere value along the second reference axis $\Gamma_2$ is superior to the sphere value along a perpendicular axis to the second reference axis $\Gamma_2$ (condition 2') and over the second portion Portion2_Front_Surface, the sphere value along the second reference axis $\Gamma_2$ superior to the sphere value along a perpendicular axis to the second reference axis $\Gamma_2$ (condition 2). These conditions can be expressed mathematically as:
condition 2': over the first portion, $SPH(\Gamma_2) > SPH(\perp\Gamma_2)$
and
condition 2: over the second portion, $SPH(\Gamma_2) > SPH(\perp\Gamma_2)$ According to one embodiment, when only one of the first or the second reference axis $\Gamma_1$, $\Gamma_2$ is determined during the determination step 16, the first surface can be modified during step 18 to be a toric surface with the torus orientated so that the cylinder axis $\gamma_{AX}$ at each point is set to the determined reference axis $\Gamma_1$ or $\Gamma_2$. Such a toric first surface will provide good performances in distortion whenever the cylinder axis $\gamma_{AX}$ is aligned with the reference axis $\Gamma_1$ or $\Gamma_2$ determined based on the mean axis of astigmatism $\gamma$ of the target optical function. This embodiment allows providing a first surface personalized to the wearer, notably when the torus first surface is orientated with a cylinder axis $\gamma_{AX}$ based on the wearer's prescription.

Figure 20A:
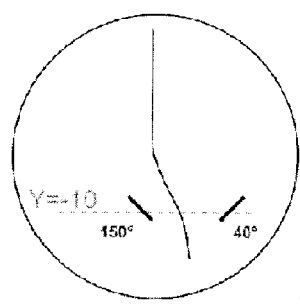
FIG. 20a shows schematically a front surface of a lens obtained by the method for determining a progressive lens according to a first embodiment of the invention.
Figures 21, 22:
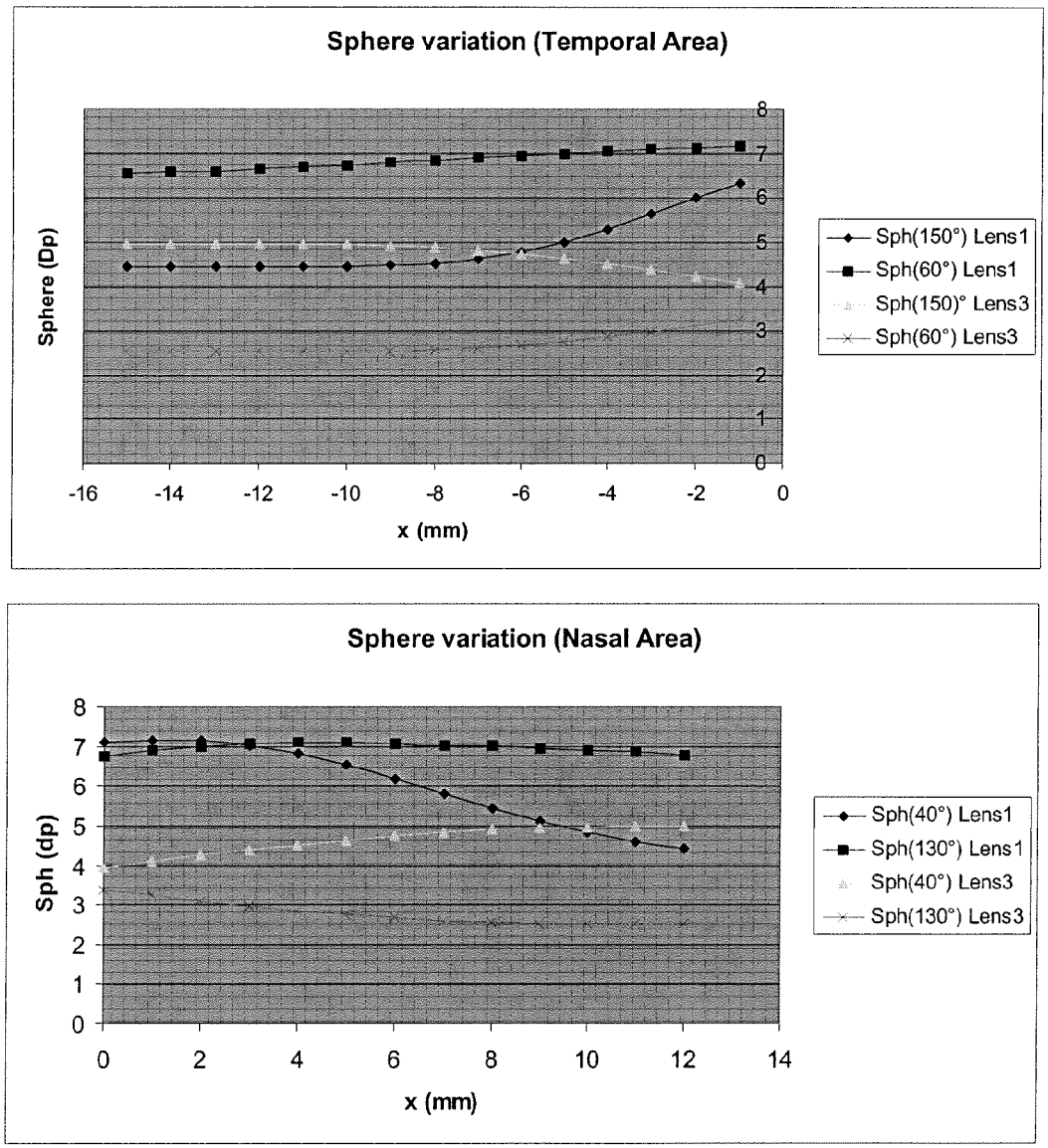
FIGS. 21 and 22 illustrate the evolution of the sphere value of the front surfaces of lenses obtained by the method for determining a progressive lens according to the invention.

Examples of variations of the sphere value obtained when conditions 1 and 2 are taken into account are illustrated by FIGS. 20a, 21 and 22. FIG. 20a corresponds for instance to the front surface of the lens of FIG. 16, wherein the reference axis considered are indicated for a given ordinate (y=−10 mm). For the temporal side, $\Gamma_1=\gamma_T=150°$ and for the nasal side, $\Gamma_2=\gamma_N=40°$.

FIG. 21 represents the evolution with the abscissa of the sphere value along the first reference axis $\Gamma_1$ and along the axis perpendicular to the first reference axis $\Gamma_1$ in the first portion—temporal area—for a traditional lens (Lens 1) when the front surface is a classical progressive surface and for a lens obtained according to the above-described method (Lens 3). The condition 1 is fulfilled by the lens obtained by the above-described method (lens 3) since the curve of the sphere along $\Gamma_1$ is located above the curve of the sphere along the perpendicular to $\Gamma_1$. In contrast, the traditional lens (lens 1) does not fulfill the condition 1 since curves of sphere along $\Gamma_1$ is below the curve of sphere along the perpendicular to $\Gamma_1$.

FIG. 22 represents the evolution with the abscissa of the curvature value along the second reference axis $\Gamma_2$ and along the axis perpendicular to the second reference axis $\Gamma_2$ in the second portion—nasal area for a traditional lens (Lens 1) and a lens obtained according to the above-described method (Lens 3). The condition 2 is fulfilled by the lens obtained by the above-described method (Lens 3) since the curve of the sphere along $\Gamma_2$ is located above the curve of the sphere along the perpendicular to $\Gamma_2$. In contrast, the traditional lens (Lens 1) does not fulfill the condition 2 since the curve of sphere along $\Gamma_2$ is located below the curve of the sphere along the perpendicular to $\Gamma_2$.

Figure 20B:
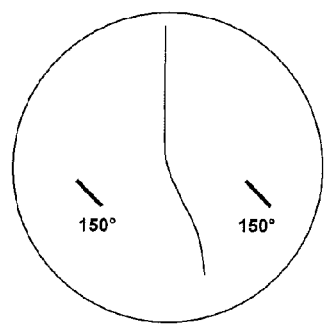
FIG. 20b shows schematically a front surface of a lens obtained by the method for determining a progressive lens according to a second embodiment of the invention.

FIG. 20b illustrates an example where condition 1 and condition 1' are applied during the modifying step with a reference axis determined only on the temporal side, $\Gamma_1=\gamma_T=150°$. Even though no illustration is given, the person skilled in the art can readily understand that the front surface of the lens could alternatively be modified by applying condition 2 and condition 2' during the modifying step with a reference axis determined only on the nasal side, $\Gamma_2=\gamma_N=40°$.

Figure 20C:
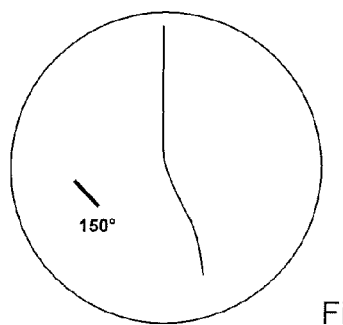
FIG. 20c shows schematically a front surface of a lens obtained by the method for determining a progressive lens according to a third embodiment of the invention.
Figure 20D:
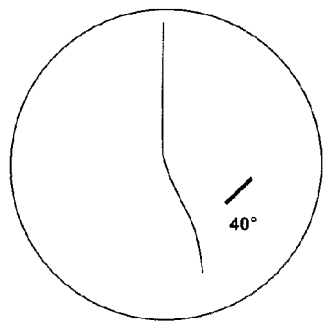
FIG. 20d shows schematically a front surface of a lens obtained by the method for determining a progressive lens according to a fourth embodiment of the invention.

FIGS. 20c and 20d illustrate examples where only condition 1 or condition 2 is applied during the modifying step with a reference axis determined only on the temporal side, $\Gamma_1=\gamma_T=150°$ or only on the nasal side, $\Gamma_2=\gamma_N=40°$, the other side remaining free of any such conditions. A toric surface is one possible solution fulfilling said conditions.

The method further comprises a step 20 of modifying the second aspherical surface so as to reach the target optical function for the lens and guarantee an optimum sharpness for the lens. The modifying of the second surface is carried out by optical optimization for minimizing the difference between a current optical function and the target optical function with a cost function. A cost function is a mathematical quantity expressing the distance between two optical functions. It can be expressed in different ways according to the optical criteria favored in the optimization. In the sense of the invention, "carrying out an optimization" should preferably be understood as "minimizing" the cost function. Of course, the person skilled in the art will understand that the invention is not limited to a minimization per se. The optimization could also be a maximization of a real function, according to the expression of the cost function which is considered by the person skilled in the art. Namely "maximizing" a real function is equivalent to "minimizing" its opposite. With such conditions 1 and 2, the lens obtained (such as the one of FIGS. 20, 21 and 22) thus exhibits reduced distortion properties while guaranteeing the target optical function, the target optical function being defined to provide an optimal sharpness of the image to the wearer. Such effect can be qualitatively understood by the fact that the orientations of the curvatures for the first surface are modified which implies that the impact on the magnification of the lens is modified, resulting in a reduced distortion. In other words, the geometry of the first surface is chosen so that the distortion of the lens is reduced. The second surface is determined to ensure optimal optical performances impacting the sharpness of the image.

Steps 18 and 20 of modifying the first and second surfaces can be carried out by toggling between first and second surfaces with a first target optical function associated to the front surface dedicated to minimizing distortion and a second target optical function associated to the rear surface dedicated to ensuring sharpness of the lens. Such toggling between first and second surfaces optimization is described for instance in EP-A-2 207 118.

The determining step 16 of the method can be carried out in different ways.

For instance, the first and/or second reference axes $\Gamma_1$ and $\Gamma_2$ may further be determined based on the prescribed astigmatism. The first and/or second reference axes $\Gamma_1$ and $\Gamma_2$ are therefore more relevantly determined, since they are suited to the wearer. Notably, when prescribed astigmatism is high, the axis of total astigmatism is equal to about the axis of prescribed astigmatism.

In the determining step 16, instead of considering mean values of the astigmatism axis for gaze directions belonging to Portion1 and to Portion2 to determine reference axes $\Gamma_1$ and/or $\Gamma_2$, one can consider the local value of astigmatism axis for each direction of gaze intersecting the first surface. Conditions 1 and/or 2 or conditions 1 and 1' or conditions 2 and 2' described above would apply for each point of Portion1 and/or Portion2 when modifying the first surface, each point being the intersection point between the said surface and the gaze direction.

In the determining step 16, the first and/or second reference axes $\Gamma_1$ and $\Gamma_2$ may also be set to a value comprised between [$\gamma-20°$, $\gamma+20°$], where $\gamma$ is the axis of astigmatism in the portions (Portion1, Portion2) considered. $\gamma_T$ is the average axis of astigmatism over the first temporal portion Portion1. $\gamma_N$ is the average axis of astigmatism over the second nasal portion Portion2.

Then, for the first portion Portion1_Front_Surface, the value of the first reference axis $\Gamma_1$ is comprised in the range [$\gamma_T-20°$; $\gamma_T+20°$], $\gamma_T$ being the mean axis of astigmatism in the first portion ($\Gamma_1$ and $\gamma_T$ are expressed in degrees). Similarly, for the second portion Portion2_Front_Surface, the value of the second reference axis $\Gamma_2$ is comprised in the range [$\gamma_N-20°$; $\gamma_N+20°$], $\gamma_N$ being the mean axis of astigmatism in the second portion ($\Gamma_2$ and $\gamma_N$ are expressed in degrees). According to an embodiment, the reference axes $\Gamma_1$ and/or $\Gamma_2$ can be set to a value equal to $\gamma_T$ and/or $\gamma_N$ respectively.

According to another embodiment, each respective reference axis $\Gamma_1$ and/or $\Gamma_2$ may also be defined by optical optimization that minimizes the distortion over the respective portion Portion1 and Portion2. The optimization could also be a maximization of a real function. According to this embodiment, modifying the first and second surfaces can be carried out by toggling between first and second surfaces with a first target optical function that minimizes the distortion over the respective portion Portion1 and Portion2 and a second target optical function ensuring sharpness of the lens. Such toggling between first and second surfaces optimization is described in EP-A-2 207 118 previously mentioned.

Such embodiment with an optimization minimizing the distortion over the respective portions Portion1 and Portion2 enables to determine the reference axes $\Gamma_1$ and/or $\Gamma_2$ that give a lens with the most reduced distortion. In the following, we will detail a way to carry out such optimization by using approximated analytical formulas.

The optical power $P_{\alpha,\beta}(\theta)$ of the lens in a given gaze direction $(\alpha,\beta)$, along an axis forming an angle $\theta$ with the horizontal axis, is the combination of the spheres along this axis of the rear surface and the front surface. If SPH_front$_{x,y}$ ($\theta$) is the sphere of the front face at the intersection point of the gaze direction $(\alpha,\beta)$ with the front surface, along the axis $\theta$, and SPH_rear$_{x',y'}$($\theta$) is the sphere of the rear surface at the intersection point of the gaze direction $(\alpha,\beta)$ with the rear surface, the optical power along the axis $\theta$ is about the sum of these two quantities which means that $$P_{\alpha,\beta}(\theta)=\text{SPH\_front}_{x,y}(\theta)+\text{SPH\_rear}_{x',y'}(\theta).$$

FIG. 5 is an illustration of this formula for a point of a front surface with a maximum sphere of 7.0 $\delta$, a minimum sphere of 5.0 $\delta$ and a cylinder axis $\gamma_{AX}$ of 65° (curve 22 commented before) and a spherical rear surface (curve 42). As expected, the optical power $P_{\alpha,\beta}(\theta)$ (curve 44) of the lens for the gaze direction $(\alpha,\beta)$ along the axis is equal to the sum of the sphere of the front surface along the same axis in the corresponding point (x,y) and the sphere of the back surface along the same axis in the corresponding point (x',y'), the corresponding points are the intersection points between the gaze direction $(\alpha,\beta)$ and the surfaces. In this example, for simplicity, the thickness of the lens is considered to be equal to 0 mm so that x=x' and y=y'.

Then, approximation formulas enable to give an estimation of the magnification along a given axis forming an angle $\theta$ with the horizontal axis as a function of optical power along this axis and the sphere of the front surface along the same axis:

$$G_{\alpha,\beta}(\theta) = \frac{1}{1-L\cdot P_{\alpha,\beta}(\theta)} \frac{1}{1-\frac{t}{n}\text{SPH\_front}_{x,y}(\theta)}$$

where $G_{\alpha,\beta}$ (A) is the magnification along the axis forming an angle $\theta$ with the horizontal axis, L is the distance from the eyeball side surface of the lens to the eye rotation center if central vision is considered or L is the distance from the eyeball side surface of the lens to pupil if peripheral vision is considered, t the thickness of the lens and n the refractive index of the lens.

Figure 23:
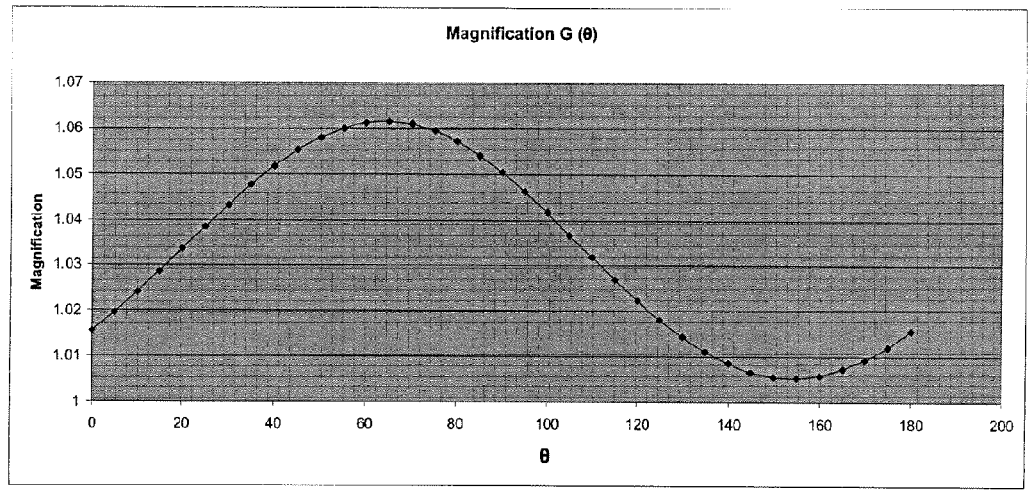
FIG. 23 shows the evolution of magnification value as a function of θ.

With the Gauss formula given before, the evolution of magnification $G_{\alpha,\beta}$ as a function of the angle $\theta$ is thus known. FIG. 23 is a representation of such variation for a gaze direction belonging to Portion1 (Temporal Area)

The axis of astigmatism is $\gamma$ as explained before. For any gaze direction, the axis of astigmatism is the axis along which the optical power is minimal. The maximum optical power is thus along the axis $\gamma+90°$. Accordingly, the minimum magnification is $G_{\alpha,\beta}(\gamma)$ and the maximum magnification is $G_{\alpha,\beta}(\gamma+90°)$. The quantity $DG_{\alpha,\beta}(\gamma)=G_{\alpha,\beta}(\gamma+90°)-G_{\alpha,\beta}(\gamma)$ is thus an evaluation of the difference of principal magnifications, which is the quantity that is searched to be minimized for each gaze direction $(\alpha,\beta)$. Indeed, the presence of this difference generates distortion.

With the above formula, the quantity $DG_{\alpha,\beta}(\gamma)=G_{\alpha,\beta}(\gamma+90°)-G_{\alpha,\beta}(\gamma)$ may be expressed. The minimum $G_{\alpha,\beta}(\gamma)$ magnification can thus be calculated:

$$G_{\alpha,\beta}(\gamma) = \frac{1}{1-L*P(\gamma)} \frac{1}{1-\frac{t}{n}\text{SPH\_front}_{x,y}(\gamma)} = \frac{1}{1-L*P_{min}} \frac{1}{1-\frac{t}{n}\text{SPH\_front}_{x,y}(\gamma)}.$$

Similarly, the maximum magnification $G(\gamma+90°)$ can also be calculated:

$$G_{\alpha,\beta}(\gamma+90°) = \frac{1}{1-L*P(\gamma+90°)} \frac{1}{1-\frac{t}{n}\text{SPH\_front}_{x,y}(\gamma+90°)} =$$

-continued $$\frac{1}{1-L*P_{max}}\frac{1}{1-\frac{t}{n}\text{SPH\_front}_{x,y}(\gamma+90°)}.$$

In fact, as the target optical function has already been defined, the values of minimal optical power $P_{min}$ and maximal optical power $P_{max}$ are imposed for any gaze direction. They should therefore be considered as constant in the formulas for the quantity $DG_{\alpha,\beta}(\gamma)$.

However, the value of the sphere of the front surface along the axis $\gamma$ and the value of the sphere of the front surface along the axis $\gamma+90°$ given by the Gauss formula depends on the cylinder axis. This implies that the value of $DG_{\alpha,\beta}(\gamma)$ depends on the chosen cylinder axis. In other words, $DG_{\alpha,\beta}(\gamma)$ is a function of $\gamma_{AX}$. This function when represented enables to obtain FIG. 24. The example was carried out with a value of L of 25 mm for the distance from the eyeball side surface of the lens to the eyeball, a value t of 1.4 mm for the thickness of the lens and a value n of 1.665 for the refractive index.

Figure 24:
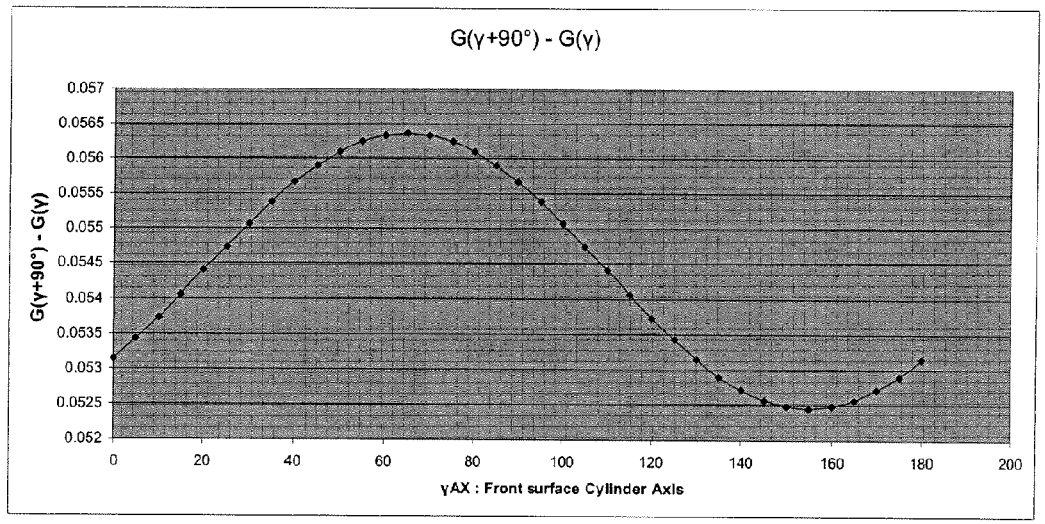
FIG. 24 shows the evolution for one gaze direction of the difference between the magnification along the axis of astigmatism of the lens and the magnification along the axis perpendicular to the axis of astigmatism of the lens as a function of the cylinder axis of the front surface.

The graphic of FIG. 24 shows that the quantity $DG_{\alpha,\beta}(\gamma)$ is minimal for a value of the cylinder axis. In case of the temporal area, the value obtained is 155°. A similar calculation made for the nasal area would lead to a value of 40°. By choosing the reference axes $\Gamma_1$ and $\Gamma_2$ as being equal to these values ($\Gamma_1$=155° and $\Gamma_2$=40°), the quantity $DG_{\alpha,\beta}(\gamma)$ will be minimized, resulting in a reduced distortion. An example of carrying out of an optimization for the step 16 of the method according to the flowchart of FIG. 18 has thus been described.

In addition, or in replacement, to conditions 1 and 2, other conditions may be further imposed in step 18 of modifying the first surface. For instance, conditions 3 and 4 may also be taken into account at the step 18 of modifying the first surface. The condition 3 requires that over the first portion, the mean sphere value decreases along any line parallel to the vertical axis from the upper part to the lower part and condition 4 requires in a similar way that over the second portion, the mean sphere value decreases along any line parallel to the vertical axis from the upper part to the lower part. As defined above, the "upper" part of the lens corresponds to a negative lowering angle $\alpha<0°$ and the "lower" part of the lens corresponds to a positive lowering angle $\alpha>0°$. Thus, on the first surface, the "upper" part corresponds to a positive value along the y axis and the "lower" part corresponds to a negative value along the y axis in the frame as defined above with respect to FIGS. 3, 6 and 7. The upper part of the first surface can be spherical, although the first surface as a whole is aspherical.

Adding these conditions enable to locally reduce the local curvature of the lens. Therefore, the difference of mean magnification between the upper part of the lens and the lower part of the lens are reduced. As this is a cause of distortion, imposing conditions at step 18 enables a lens with reduced distortion to be obtained. Mean magnification of the lens can be estimate by calculating the product of the magnification along the axis of astigmatism and the magnification along the counter axis.

Figure 25:
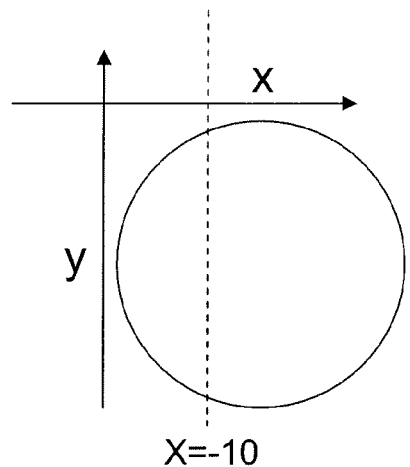
FIGS. 25 and 26 illustrate the evolution of the curvatures of lenses obtained by a method for determining a progressive lens according to the invention.
Figure 26:
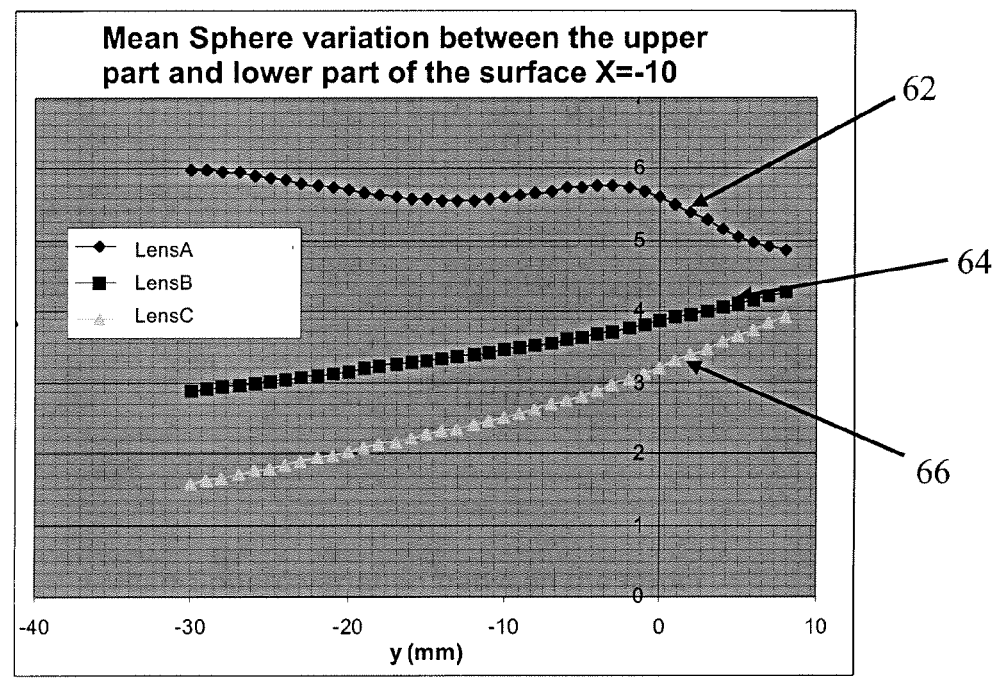
Figure 27:
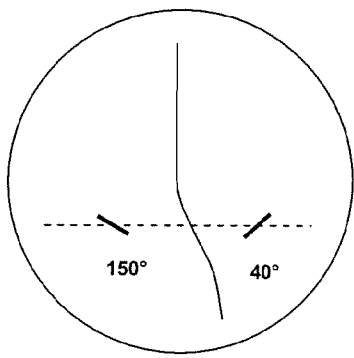
FIGS. 27 to 30 illustrate examples of target optical function of lenses according to the invention for wearer with prescribed addition of 1 diopter and astigmatism (value (diopters), axis (°)) of (0;0), (2,40), (1,20) and (3,120) respectively.

FIGS. 25 and 26 illustrate a lens for which the four conditions 1, 2, 3 and 4 have been imposed at step 18. FIG. 25 is a representation similar to the representation of FIG. 19. A vertical line along which the variation of sphere is represented in FIG. 27 is the line whose abscissa is constant, fixed to −10 mm. The variation of sphere is indeed represented on FIG. 26 along the line for a traditional progressive lens (curve 62) and two lenses obtained by the method of the flowchart of FIG. 18 (curves 64 and 66). The curve 62 is rising when passing from the upper part of the lens to the lower part of the lens whereas the curves 64 and 66 are decreasing when passing from the upper part of the lens to the lower part of the lens.

Preferably, the mean sphere value is not increasing from the upper part of the lens to the lower part of the lens.

Further conditions, notably on the meridian as will be shown later in the description, may also be used either in combination with conditions 1 and 2 or in combination with conditions 1 to 4.

As explained before, the method for determining a progressive ophthalmic lens enables a progressive ophthalmic lens to be obtained.

Examples of lenses suitable for a wearer with astigmatism are given on FIGS. 27 to 30. The representations of FIGS. 27 to 30 are similar representations to the one of FIG. 19; the corresponding parts of description are not repeated there but it should be understood that all the properties described in reference to these figures are included here. FIGS. 27 to 30 correspond respectively to the axis of the total astigmatism of the target optical function when a prescribed astigmatism is taken into account. The prescribed addition is 1 diopter and the prescribed power is 0 diopter for the 4 figures but prescribed astigmatism is different. It is equal respectively to 0 diopters for FIG. 27, 2 diopters and the axis 40° for FIG. 28, 1 diopter and the axis 20° for FIG. 29 and 3 diopters and the axis 120° for FIG. 30. For each gaze direction, the axis of the total astigmatism is equal to the combination of the axis of the residual astigmatism and the axis of the prescribed astigmatism. The axis of the residual astigmatism is given by the optical function suitable for a spherical prescription. The values of the mean axis of total astigmatism of target optical functions over optical Portion1 and Portion2 are indicated in the figures. For each prescription, reference axes $\Gamma_1$ and $\Gamma_2$ of the front surface that allow the best performances in distortion to the wearer are equal about to the total astigmatism axes indicated in the figures.

So as to characterize the lens with reduced distortion previously described, several alternative features may be used. These different ways of characterizing the lens are all linked by the fact that they improve the comfort of wearing for the wearer for whom the lens is intended by improving the performance of the lens relative to distortion while guaranteeing an optimal sharpness of the image perceived by the wearer. Notably, using this feature may be a way to characterize a lens obtained by any one of the methods previously described.

The lens may exhibit a property labeled P1. According to this property P1, the first surface of such lens has in at least the first portion Portion1_Front_Surface of the temporal area Area_temporal, the cylinder axis $\gamma_{AX\_T}$ comprised between 90° and 180°. If the first surface fulfils the requirement of the property P1, this surface also has in at least the second portion Portion2_Front_Surface of the nasal area, a cylinder axis $\gamma_{AX\_N}$ such that the difference of angle in absolute value between the cylinder axis $\gamma_{AX\_T}$ in the first portion Portion1_Front_Surface and the cylinder axis $\gamma_{AX\_N}$ in the second portion Portion2_Front_Surface is superior to 20°. This can be expressed mathematically as $|\gamma_{AX\_T}-\gamma_{AN\_N}|>20°$, with the cylinder axes $\gamma_{AX\_N}$ and $\gamma_{AX\_T}$ expressed in degrees. This notably implies that the values of cylinder axis $\gamma_{AX\_T}$ in the temporal area and $\gamma_{AX\_N}$ in the nasal area are different.

A lens which fulfils such property P1 exhibits improved properties relative to the distortion while guaranteeing an optimal sharpness of the image perceived by the wearer. The comfort of the wearer with such kind of lens is thus increased.

Figure 29:
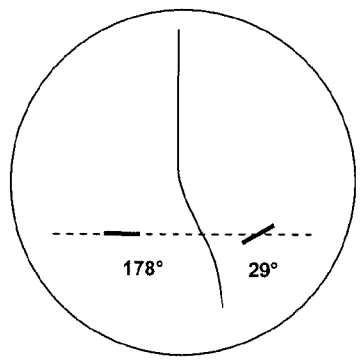

The optimum front surface for the lenses of examples of FIGS. 27 and 29 verify this property P1, i.e. for FIG. 27 a cylinder axis $\gamma_{AX\_T}$ in the first portion Portion1 of the temporal area is equal to 150° and a cylinder axis $\gamma_{AX\_N}$ in the second portion Portion2 of the nasal area is equal to 40°. Thus, the cylinder axis $\gamma_{AX\_T}$ is comprised between 90° and 180° and $|\gamma_{AX\_T}-\gamma_{AX\_N}|=|150°-40°|=110°$, which is superior to 20°. The property P1 is therefore fulfilled by the surface of the example of FIG. 27.

Similarly, in FIG. 29, the cylinder axis $\gamma_{AX\_T}$ in the first portion Portion1 of the temporal area is equal to 178° and the cylinder axis $\gamma_{AX\_N}$ in the second portion Portion2 of the nasal area is equal to 29°. Thus, the cylinder axis $\gamma_{AX\_T}$ is comprised between 90° and 180° and $|\gamma_{AX\_T}-\gamma_{AX\_N}|=|178°-29°|=149°$, which is superior to 20°. The property P1 is therefore fulfilled by the surfaces of the examples of FIG. 29.

The lens having the surface illustrated on FIGS. 27 and 29 will therefore exhibit improved properties relative to the distortion while guaranteeing an optimal sharpness of the image perceived by the wearer.

According to a preferred embodiment for property P1, in at least one first portion of the temporal area, the cylinder axis $\gamma_{AX\_T}$ may be comprised between 110° and 180° and, in at least one second portion of the nasal area, the cylinder axis $\gamma_{AX\_N}$ may comprised between 0° and 70°. These values correspond to mean values for which the difference of magnification is reduced as explained in reference to FIGS. 23 and 24. According to another way of characterizing such lens, the lens may exhibit a property labeled P2. According to this property P2, the first surface of such lens has in at least the first portion Portion1_Front_Surface of the temporal area Area_temporal, the cylinder axis $\gamma_{AX\_T}$ comprised between 0° and 90° and in at least the second portion Portion2_Front_Surface of the nasal area Area_nasal, the cylinder axis $\gamma_{AX\_N}$ is comprised between 0° and 90°. If the first surface fulfils the requirement of the property P2, this surface also has in at least the second portion Portion2_Front_Surface of the nasal area, a cylinder axis $\gamma_{AX\_N}$ such that the difference of angle in absolute value between the cylinder axis $\gamma_{AX\_T}$ in the first portion Portion1_Front_Surface and the cylinder axis $\gamma_{AX\_N}$ in the second portion Portion2 is superior to 20°. This can be expressed mathematically as $|\gamma_{AX\_T}-\gamma_{AX\_N}|>20°$, with the cylinder axes $\gamma_{AX\_N}$ and $\gamma_{AX\_T}$ expressed in degrees. This notably implies that the values of cylinder axis $\gamma_{AX\_T}$ and $\gamma_{AX\_N}$ and in the temporal and nasal area are different.

A lens which fulfils such property P2 exhibits improved properties relative to the distortion while guaranteeing a good compensation for the "optical" phenomenon. The comfort of the wearer with such kind of lens is thus increased.

According to another way of characterizing such lens, the lens may exhibit a property labeled P3. In this case, the first surface has the far vision zone situated in an upper part of the lens and the near vision zone situated in a lower part of the lens and a portion of the meridian in the far vision zone defines a vertical axis. In addition, in the first portion Portion1 of the temporal area, the mean sphere value decreases along any line parallel to the vertical axis from the upper part to the lower part. Similarly, in the second portion Portion2 of the nasal area, the mean sphere value decreases along any line parallel to the vertical axis from the upper part to the lower part.

A lens which fulfils such property P3 exhibits improved properties relative to the distortion while guaranteeing an optimal sharpness to the image perceived by the wearer. The comfort of the wearer with such kind of lens is thus increased.

According to another way of characterizing such lens, the lens may exhibit a property labeled P4. The first surface has in at least the first portion Portion1 of the temporal area, a cylinder axis $\gamma_{AX\_T}$ equal to the axis of astigmatism in the portion considered plus or minus 20°; preferentially plus or minus 10°. If the axis of astigmatism in the first portion is labeled $\gamma_T$, the cylinder axis $\gamma_{AX\_T}$ in Portion1 is in the range [$\gamma_T-20°$; $\gamma_T+20°$], where $\gamma_{AX\_T}$ and $\gamma_T$ are expressed in degrees. In addition or alternatively, in at least the second portion of the nasal area, the cylinder axis $\gamma_{AX\_N}$ is equal to the axis of astigmatism in the portion considered plus or minus 20°; preferentially plus or minus 10°. If the axis of astigmatism in the second portion is labeled $\gamma_N$, the cylinder axis $\gamma_{AX\_N}$ in Portion2 is in the range [$\gamma_N-20°$; $\gamma_N+20°$], where $\gamma_{AX\_N}$ and $\gamma_N$ are expressed in degrees.

A lens which fulfils such property P4 exhibits improved properties relative to the distortion while guaranteeing an optimal sharpness to the image perceived by the wearer. The comfort of the wearer with such kind of lens is thus increased.

The axes of astigmatism $\gamma_N$ and $\gamma_T$ may be the axes of residual astigmatism of the lens in the portion considered. Alternatively, the axes of astigmatism $\gamma_N$ and $\gamma_T$ may be the axes of prescribed astigmatism or total astigmatism of the lens in the portion considered.

According to another way of characterizing such lens, the lens may exhibit a property labeled P5. According to this property P5, the first surface of such lens has in at least the first portion Portion1_Front_Surface of the temporal area Area_temporal, the cylinder axis $\gamma_{AX\_T}$ comprised between 0° and 70° and in at least the second portion Portion2_Front_Surface of the nasal area Area_nasal, the cylinder axis $\gamma_{AX\_N}$ is comprised between 0° and 70°.

A lens which fulfils such property P5 exhibits improved properties relative to the distortion while guaranteeing a good compensation for the "optical" phenomenon. The comfort of the wearer with such kind of lens is thus increased.

Figure 28:
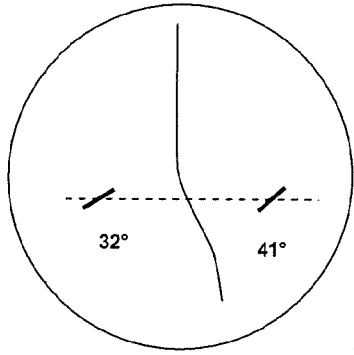

The optimum front surface for the lens of example of FIG. 28 verifies this property P5. Indeed, in FIG. 28, the cylinder axis $\gamma_{AX\_T}$ in the first portion Portion1 of the temporal area is equal to 32° and the cylinder axis $\gamma_{AX\_N}$ in the second portion Portion2 of the nasal area is equal to 41°. Thus, both cylinder axis $\gamma_{AX\_T}$ and $\gamma_{AX\_N}$ are comprised between 0° and 70°. The property P5 is therefore fulfilled by the surface of the example of FIG. 28.

The lens having the surface illustrated on FIG. 28 will therefore exhibit improved properties relative to the distortion while guaranteeing an optimal sharpness to the image perceived by the wearer.

According to another way of characterizing such lens, the lens may exhibit a property labeled P6. According to this property P6, the first surface of such lens has in at least the first portion Portion1_Front_Surface of the temporal area Area_temporal, the cylinder axis $\gamma_{AX\_T}$ comprised between 110° and 180° and in at least the second portion Portion2_Front_Surface of the nasal area Area_nasal, the cylinder axis $\gamma_{AX\_N}$ is comprised between 110° and 180°.

A lens which fulfils such property P6 exhibits improved properties relative to the distortion while guaranteeing a good compensation for the "optical" phenomenon. The comfort of the wearer with such kind of lens is thus increased.

Figure 30:
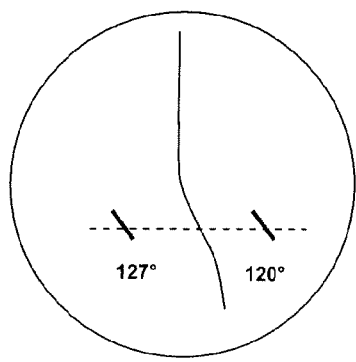

The optimum front surface for the lens of example of FIG. 30 verifies this property P6. Indeed, in FIG. 30, the cylinder axis $\gamma_{AX\_T}$ in the first portion Portion1 of the temporal area is equal to 127° and the cylinder axis $\gamma_{AX\_N}$ in the second portion Portion2 of the nasal area is equal to 120°. Thus, both cylinder axis $\gamma_{AX\_T}$ and $\gamma_{AX\_N}$ are comprised between 110° and 180°. The property P6 is therefore fulfilled by the surface of the example of FIG. 30.

The lens having the surface illustrated on FIG. 30 will therefore exhibit improved properties relative to the distortion while guaranteeing an optimal sharpness to the image perceived by the wearer.

The lens according to the invention may thus be characterized by any one of property P1 to P6. It should further be understood that for each property, this implies that condition 1 and condition 2 are fulfilled for this lens.

In addition, the lens may exhibit several properties Pi when relevant. Notably, the lens may present the combination of properties P1 and P3 or the combination of properties P2 and P3 or the combination of properties P4 and P3 or the combination of properties P5 and P3 or the combination of properties P6 and P3.

Figure 31:
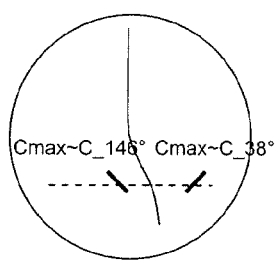
FIGS. 31 and 32 show a first example of a lens according to the invention.
Figure 32:
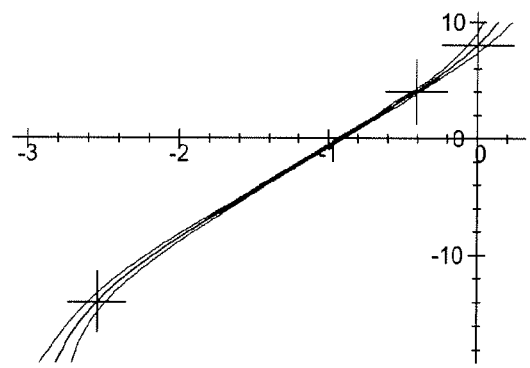

Further to the properties Pi already described, the lens may have further features. For instance, the first surface may have a substantially umbilic meridian. This case is illustrated by FIGS. 31 and 32. FIG. 31 indicates a cylinder axis on the temporal area which is 146° and a cylinder axis on the nasal area which is 38°. FIG. 32 is a figure representing the variation of the mean sphere of the front surface along the meridian (the center curve of the 3 curves) with respect to the mean sphere value of the point corresponding to the far vision prescription point. The vertical axis is Y. FIG. 32 shows that the meridian is indeed substantially umbilic since the cylinder is close to zero. Imposing such a meridian at step 18 of the method according to the flowchart of FIG. 18 is thus a condition which may be advantageous since it enables after step 20 to provide a lens to the wearer in which there is no deformation of the central vision along the optical meridian for a spherical prescription. The surface is defined for the prescription whose optical characteristic of the lens is defined in FIG. 27. This surface meets conditions 1, 2, 3, 4. In order to obtain a maximal performance in distortion the absolute value of the mean sphere which is negative has to be very high inducing manufacturing problem.

Figure 33:
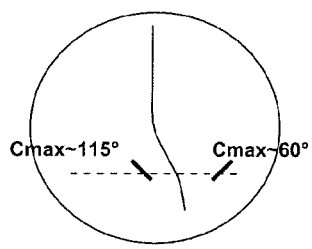
FIGS. 33 and 34 show a second example of a lens according to the invention.
Figure 34:
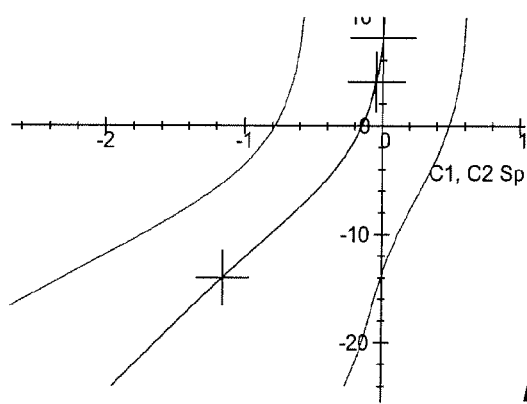

The FIGS. 33 and 34 illustrate an example of a surface which also meets conditions 1, 2, 3, 4. These FIGS. 33 and 34 corresponds respectively to FIGS. 31 and 32. FIG. 33 indicates that a cylinder axis on the temporal area which is 115° and a cylinder axis on the nasal area which is 60°. FIG. 34 shows that the meridian of the lens is not umbilic. This surface exhibits more cylinder value in the periphery than the surface illustrated in FIGS. 31 and 32 without imposing that the absolute value of the mean sphere which is negative to be very high. This can be advantageous for manufacturing process. In order to reach the prescribed addition, more the absolute value of the mean sphere at the corresponding point to the near gaze direction on the front surface and more the mean sphere on the back surface at the corresponding point will be high. So it is advantageous to reduce this value.

Figure 35:
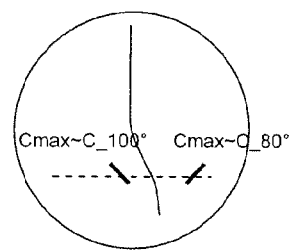
FIGS. 35 and 36 show a third example of a lens according to the invention.
Figure 36:
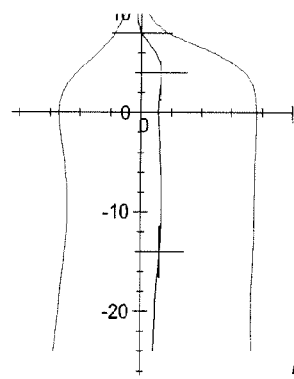

The FIGS. 35 and 36, which correspond respectively to FIGS. 31 and 32 illustrates a surface which only meet conditions 1 and 2. FIG. 35 indicates that a cylinder axis on the temporal area is 100° and a cylinder axis on the nasal area is 80°. Based on FIG. 36, it can be noticed that the first surface of the lens has a mean sphere value that remains substantially constant along the meridian. This surface can be advantageous for the manufacturing process.

Figure 37:
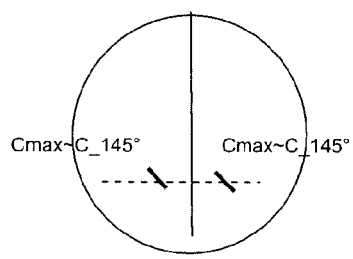
FIGS. 37 and 38 show a fourth example of a lens according to the invention.
Figure 38:
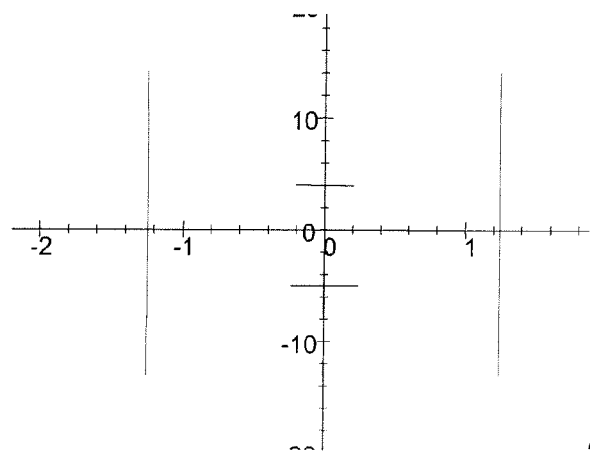

The FIGS. 37 and 38 illustrate another example of a lens having a toric front face. These FIGS. 37 and 38 corresponds respectively to FIGS. 31 and 32. FIG. 37 indicates that a cylinder axis on the temporal area which is 145° and a cylinder axis on the nasal area which is 145°. Based on FIG. 38, it can be noticed that the first surface of the lens has a mean sphere value that remains substantially constant along the meridian. When the prescribed astigmatism is high compared to the value of the residual astigmatism, the axis of the total astigmatism is equal about to the prescribed astigmatism. A toric surface such as the surface illustrated in FIGS. 37 and 38 will provide good performance in distortion for a prescribed axis about 145° when the value of prescribed astigmatism is high. For instance if the lens has to exhibit an addition value of about 1 diopter, then the residual astigmatism in the periphery will be about 1 diopter. Then for a prescribed astigmatism of about 2 diopters, the surface will provide good performance in distortion. This surface is also advantageous for manufacturing process.

Such a toric front surface will also provide better performances in distortion that traditional front surface for wearers whose prescribed astigmatism is low when a reference axis of about 145° is determined either on the temporal area or on the nasal area and a cylinder axis is set to 145° over both the temporal area and the nasal area. Thus, performances are partially improved since only the temporal side or the nasal side is improved in distortion.

A toric surface will also provide good performance in distortion whatever the prescription, so whatever the total, residual or prescribed astigmatism.

For instance, the front surface of the lens may have a cylinder axis $\gamma_{AX\_T}$ in the first portion Portion1 of the temporal area equal to the axis of astigmatism $\gamma_T$ in said first portion, and a cylinder axis $\gamma_{AX\_N}$ in the second portion Portion2 of the nasal area also equal to $\gamma_T$. Alternatively, the front surface of the lens may have a cylinder axis $\gamma_{Ax\_N}$ in the second portion Portion2 of the nasal area equal to the axis of astigmatism $\gamma_N$ in said second portion, and a cylinder axis $\gamma_{AX\_T}$ in the first portion Portion1 of the temporal area also equal to $\gamma_N$.

Each one of the lens previously described may be obtained by the method of determining a progressive ophthalmic lens previously described. This method can be implemented on a computer. In this context, unless specifically stated otherwise, it is appreciated that throughout this specification discussions utilizing terms such as "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

A computer program product comprising one or more stored sequence of instruction that is accessible to a processor and which, when executed by the processor, causes the processor to carry out the steps of the method is also proposed.

Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. A computer-readable medium carrying one or more sequences of instructions of the computer program product is thus proposed. This enables to carry out the method in any location.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Many apparatuses or processes may be used to obtain the pair of lenses using a first surface of a lens determined according to the method previously described. The processes often imply an exchange of a set of data. For instance, this set of data may comprise only the first surface of a lens determined according to the method. This set of data may preferably further comprise data relating to the eyes of the wearer such that with this set, the progressive ophthalmic lens can be manufactured.

Figure 39:
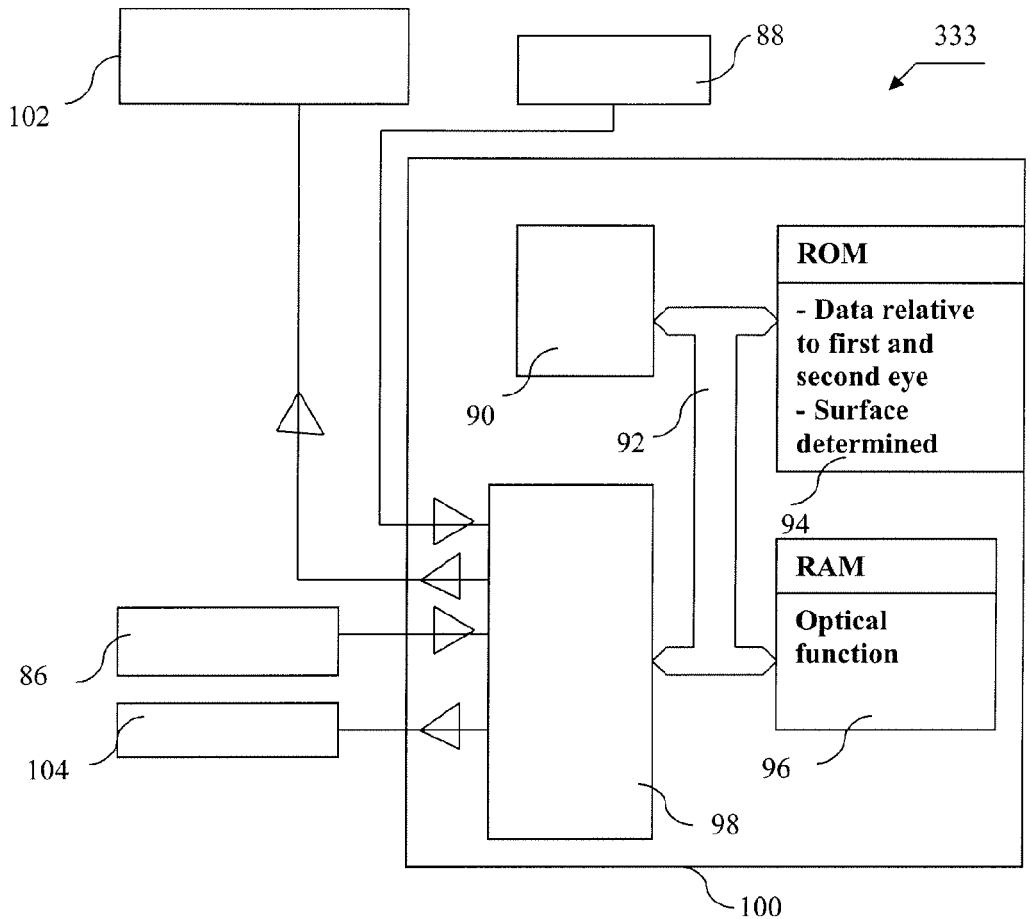
FIG. 39 illustrates an apparatus for processing the method of the invention.

This exchange of data may be schematically understood by the apparatus of FIG. 39 which represents an apparatus 333 for receiving numerical data. It comprises a keyboard 88, a display 104, an external information center 86, a receiver of data 102, linked to an input/output device 98 of an apparatus for data processing 100 which is realized there as a logic unit.

The apparatus for data processing 100 comprises, linked between them by a data and address bus 92:
 a central processing unit 90;
 a RAM memory 96,
 a ROM memory 94, and
 said input/output device 98.

Said elements illustrated in FIG. 39 are well known for the person skilled in the art. Those elements are not described any further.

To obtain a progressive ophthalmic lens corresponding to a wearer prescription, semi-finished ophthalmic lens blanks can be provided by a lens manufacturer to the prescription labs. Generally, a semi-finished ophthalmic lens blank comprises a first surface corresponding to an optical reference surface, for example a progressive surface in the case of progressive addition lenses, and a second unfinished surface. A semi-finished lens blank having suitable optical characteristics, is selected based on the wearer prescription. The unfinished surface is finally machined and polished by the prescription lab so as to obtain a surface complying with the prescription. An ophthalmic lens complying with the prescription is thus obtained.

Notably, according to the invention, semi-finished lens blanks can be provided with a first surface meeting the conditions previously described with reference to the first surface of a progressive ophthalmic lens.

To provide such semi-finished lens blanks, a target optical function must be chosen for each set of prescriptions (similarly to step 10 in FIG. 18). A first aspherical surface and a second unfinished surface are defined (similarly to step 12 in FIG. 18). At least one reference axis $\Gamma_1$ or $\Gamma_2$ is determined not only based on the mean axis of astigmatism $\gamma_T$ and $\gamma_N$ of the target optical function for gaze directions belonging to Portion1 and Portion2 but also on mean axis of astigmatism for lenses of the set of prescriptions. The first aspherical surface of the semi-finished lens blank is then modified to meet the conditions 1 and 2 or 1 and 1' or 2 and 2' and/or 3 and 4 defined above.

Figure 40:
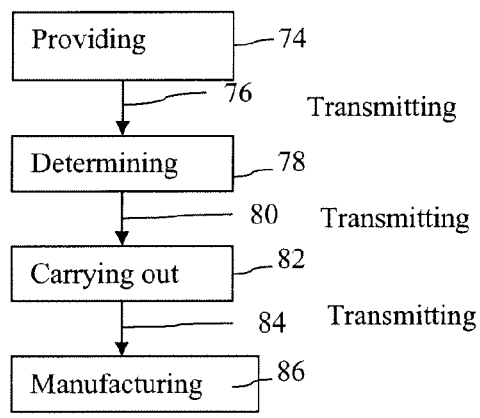
FIG. 40 is a flow chart of a method for manufacturing a lens according to the invention.

However, other method for manufacturing may be used. The method according to FIG. 40 is an example. The method for manufacturing comprises a step 74 of providing data relating to the eyes of the wearer at a first location. The data are transmitted from the first location to a second location at the step 76 of the method. The progressive ophthalmic lens is then determined at step 78 at the second location according to the method for determining previously described. The method for manufacturing further comprises a step 80 of transmitting relative to the first surface to the first location. The method also comprises a step 82 of carrying out an optical optimization based on the data relative to the first surface transmitted. The method further encompasses a step of transmitting 84 the result of the optical optimization to a third location. The method further encompasses a step of manufacturing 86 the progressive ophthalmic lens according to the result of the optical optimization.

Such method of manufacturing makes it possible to obtain a progressive ophthalmic lens with a reduced distortion without degrading the other optical performances of the lens.

The transmitting steps 76 and 80 can be achieved electronically. This enables to accelerate the method. The progressive ophthalmic lens is manufactured more rapidly.

To improve this effect, the first location, the second location and the third location may just be three different systems, one devoted to the collecting of data, one to calculation and the other to manufacturing, the three systems being situated in the same building. However, the three locations may also be three different companies, for instance one being a spectacle seller (optician), one being a laboratory and the other one a lens designer.

A set of apparatuses for manufacturing a progressive ophthalmic lens, wherein the apparatuses are adapted to carry out the method for manufacturing is also disclosed.

The invention shall be further illustrated by the use of the following examples.

GENERAL DESCRIPTION OF THE FIGURES OF THE EXAMPLES

As explained before, a surface may thus be locally defined by a triplet constituted by the maximum sphere $SPH_{max}$, the minimum sphere $SPH_{min}$ and the cylinder axis $\gamma_{AX}$.

Surface characterizations of the examples are thus given by giving map of the maximum sphere, the minimum sphere and the cylinder axis for each surface considered.

FIGS. 41, 48, 55, 62, 69, 86 and 95 are minimum sphere maps. The vertical and horizontal axis of the maps are the values of the abscissa X (in mm) and of the ordinate Y (in mm). The iso-value curves indicated in these maps connect points which correspond to a same minimum sphere value. The respective minimum sphere values for the curves are incremented by 0.10 diopter between neighboring curves, and are indicated on some of these curves.

FIGS. 42, 49, 56, 63, 70, 87 and 96 are maximum sphere maps. The vertical and horizontal axis of the maps are the values of the abscissa X (in mm) and of the ordinate Y (in mm). The iso-value curves indicated in these maps connect points which correspond to a same maximum sphere value. The respective maximum sphere values for the curves are incremented by 0.10 diopter between neighboring curves, and are indicated on some of these curves.

FIGS. 43, 50, 57, 64, 71, 88 and 97 are cylinder axis maps. The vertical and horizontal axis of the maps are the values of the abscissa X (in mm) and of the ordinate Y (in mm). The isometric curves indicated in these maps connect points which correspond to a same cylinder axis value. The respective cylinder axis values for the curves are incremented by 5° between neighboring curves, and are indicated on some of these curves. The front surfaces of exemplified lenses have a mean cylinder of at least 0.25 diopter on the portions considered, preferentially of at least 1 diopter, and preferentially 2 diopters. The more the cylinder is high and well oriented, the lowest would be the distortion and the least sensible is the distortion to the axis orientation over the front surface.

Figure 102:
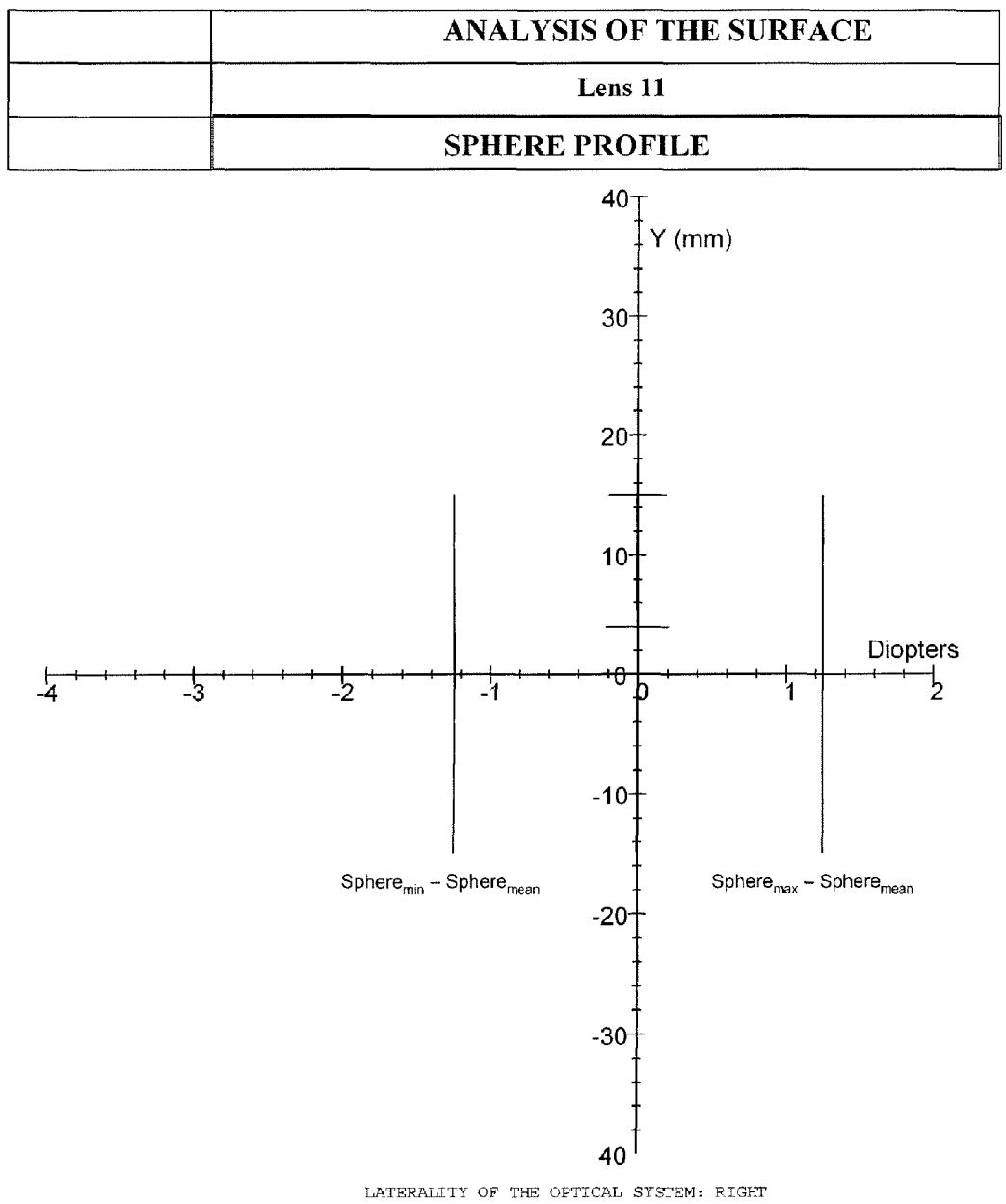
Figure 105:
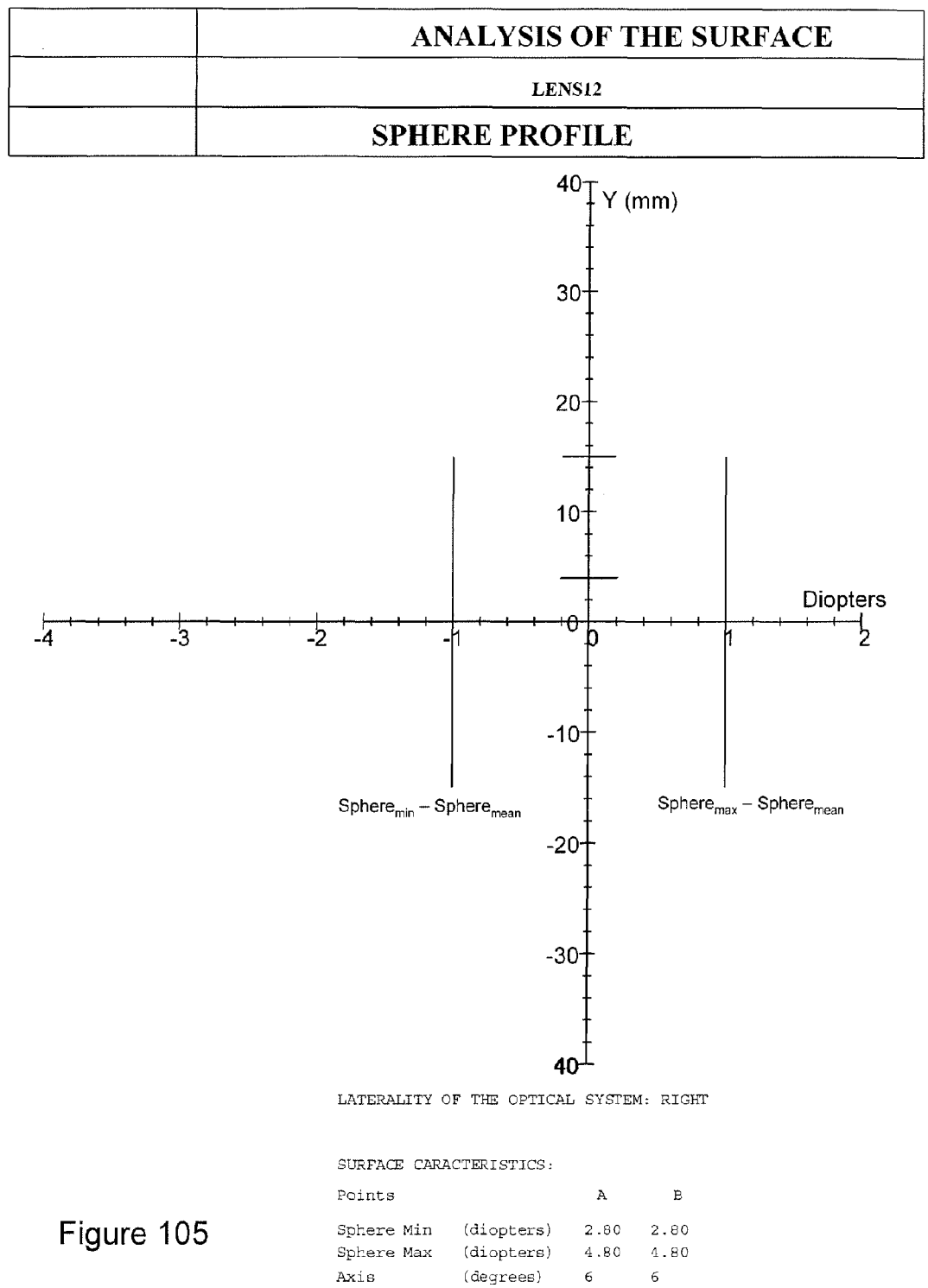

FIGS. 102 and 105 give maximum and minimum sphere profiles for toric front surfaces.

FIGS. 44, 45, 46, 47, 51, 52, 53, 54, 58, 59, 60, 61, 65, 66, 67, 68, 72, 73, 74, 75, 80, 81, 82, 83, 84, 85, 89, 90, 93, 94, 98, 99, 103, 104, 106, 107, 108 give optical analyses of the performance of the lenses considered.

FIGS. 46, 53, 60, 67, 74, 80, 83, 89, 93, 98, 103 and 106 are optical power maps. The vertical and horizontal axis of the maps are the values of the eye declination angle α and the eye azimuth angle β. The isometric curves indicated in these maps connect gaze directions which correspond to a same optical power value. The respective optical power values for the curves are incremented by 0.25 diopter between neighboring curves, and are indicated on some of these curves.

FIGS. 47, 54, 61, 68, 75, 81, 84 and 107 are residual astigmatism contour plots, with axis similar to those of the optical power maps. The isometric curves indicated connect gaze directions corresponding to a same residual astigmatism value.

FIGS. 82, 85, 90, 94, 99, 104 and 108 are total astigmatism contour plots, with axis similar to those of the optical power maps. The isometric curves indicated connect gaze directions corresponding to a same total astigmatism value.

FIGS. 44, 51, 58, 65, and 72 are peripheral optical power maps. The vertical and horizontal axis of the maps are the values of the peripheral ray directions (α,β). The isometric curves indicated in these maps connect peripheral ray directions which correspond to a same peripheral optical power value. The respective peripheral optical power values for the curves are incremented by 0.25 diopter between neighboring curves, and are indicated on some of these curves.

FIGS. 45, 52, 59, 66 and 73 are peripheral residual astigmatism contour plots, with axis similar to those of the peripheral optical power maps. The curves indicated connect peripheral ray directions corresponding to a same peripheral residual astigmatism value.

FIGS. 76, 77, 78, 79, 91, 92, 100 and 101 give distortion comparisons for the exemplified lenses.

EXAMPLE 1

Prior Art

Example 1 corresponds to a lens LENS1 according to prior art. In this case, the power prescription is 0 δ in far vision and the prescribed addition is 2.5 δ. For this example 1, no astigmatism is prescribed for the wearer.

Figure 41:
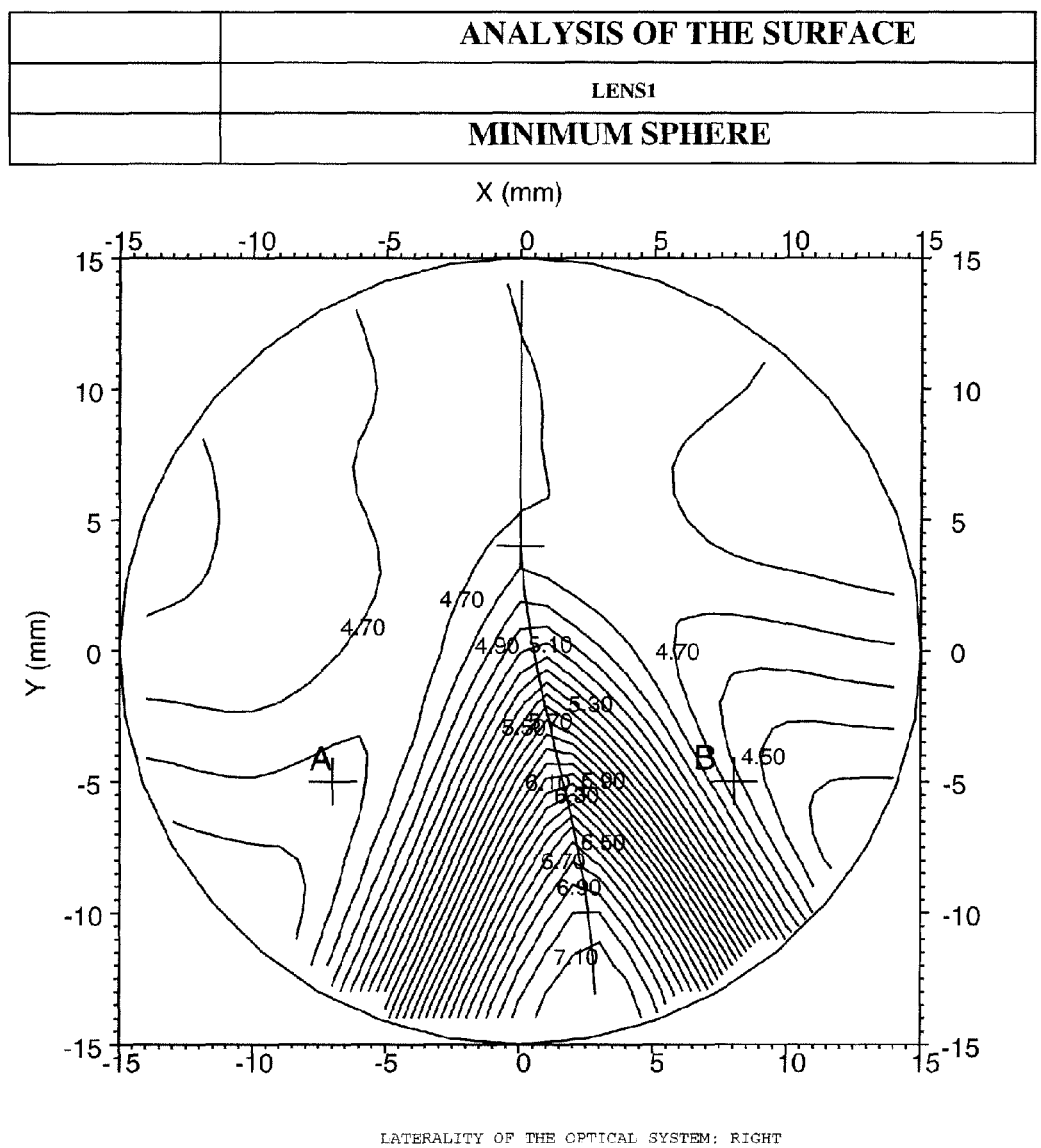
FIGS. 41 to 108 give surface characteristics, optical performances and distortion comparisons for 12 examples of lenses.
Figure 42:
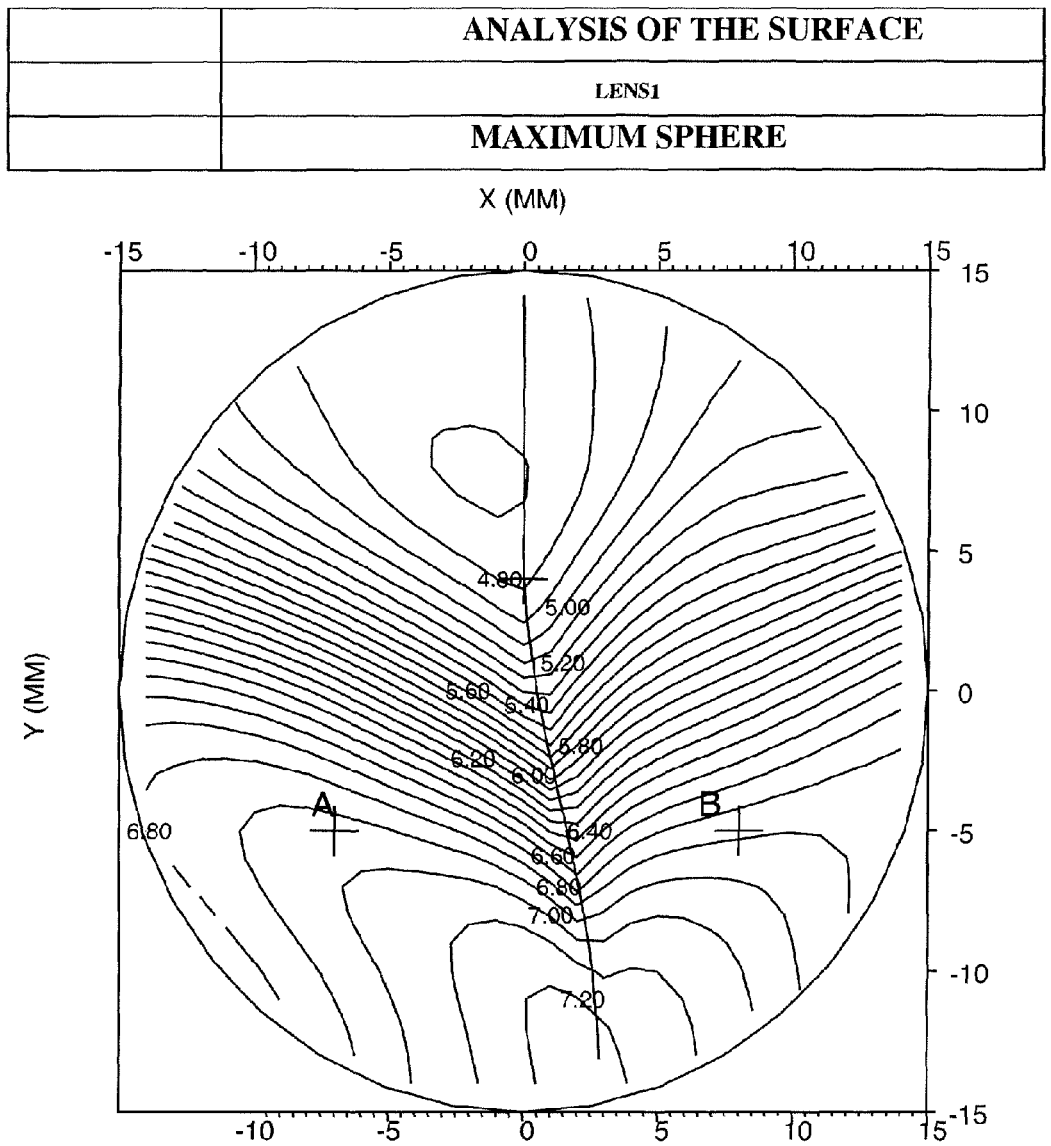
Figure 43:
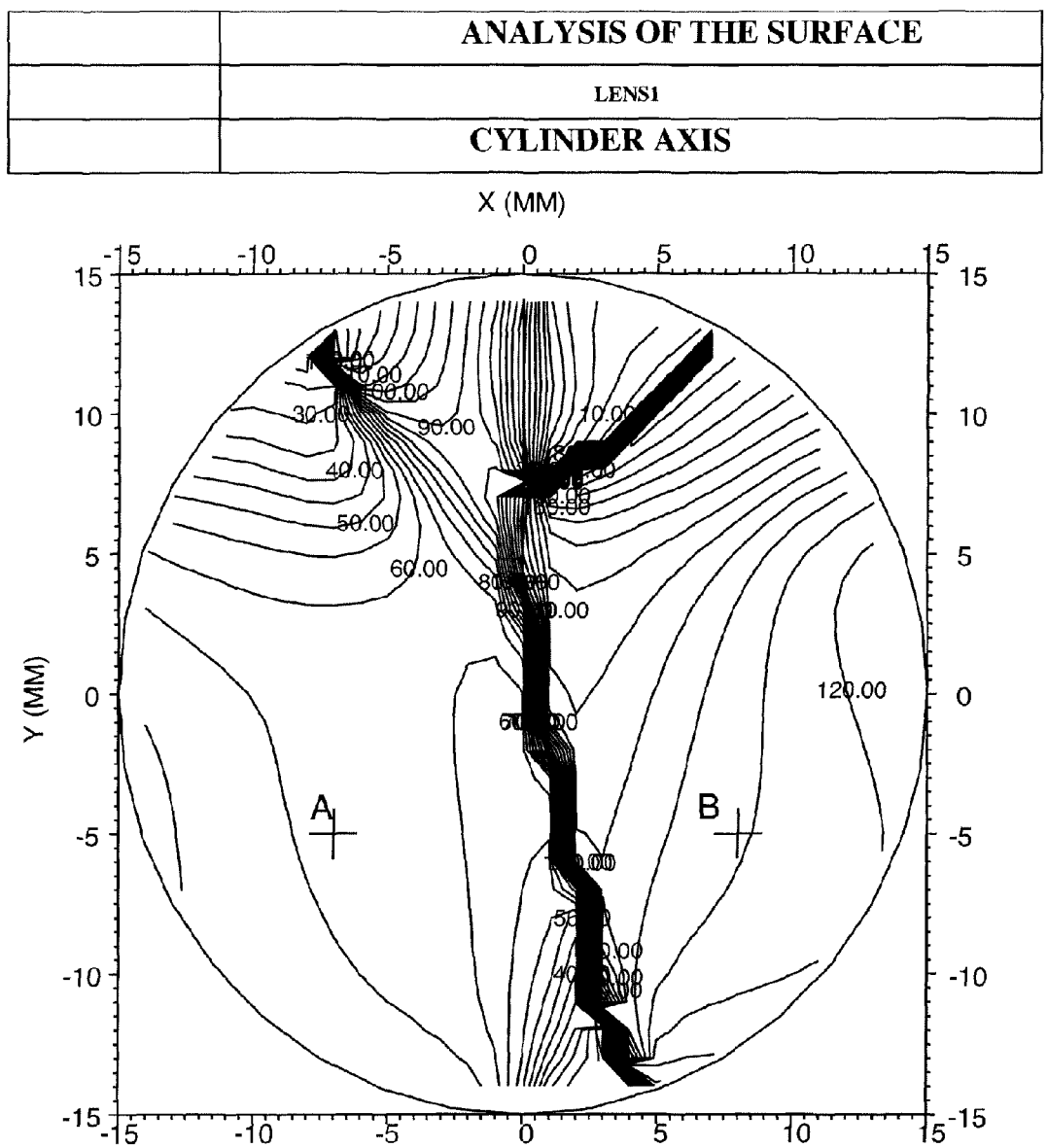

FIGS. 41, 42 and 43 are the surface characteristics of the front surface for LENS1. For the sake of comparison, two specific points A and B are considered. Point A is located on the temporal area whereas point B is located on the nasal area. For point A, the maximum sphere $SPH_{max\_A}$ is equal to 6.90 δ, the minimum sphere $SPH_{min\_A}$ is equal to 4.80 δ and the cylinder axis $\gamma_{AX\_A}=64°$. For point B, the maximum sphere $SPH_{max\_B}$ is equal to 6.90 δ, the minimum sphere $SPH_{min\_B}$ is equal to 4.65 δ and the cylinder axis $\gamma_{AX\_B}=126°$.

Figure 44:
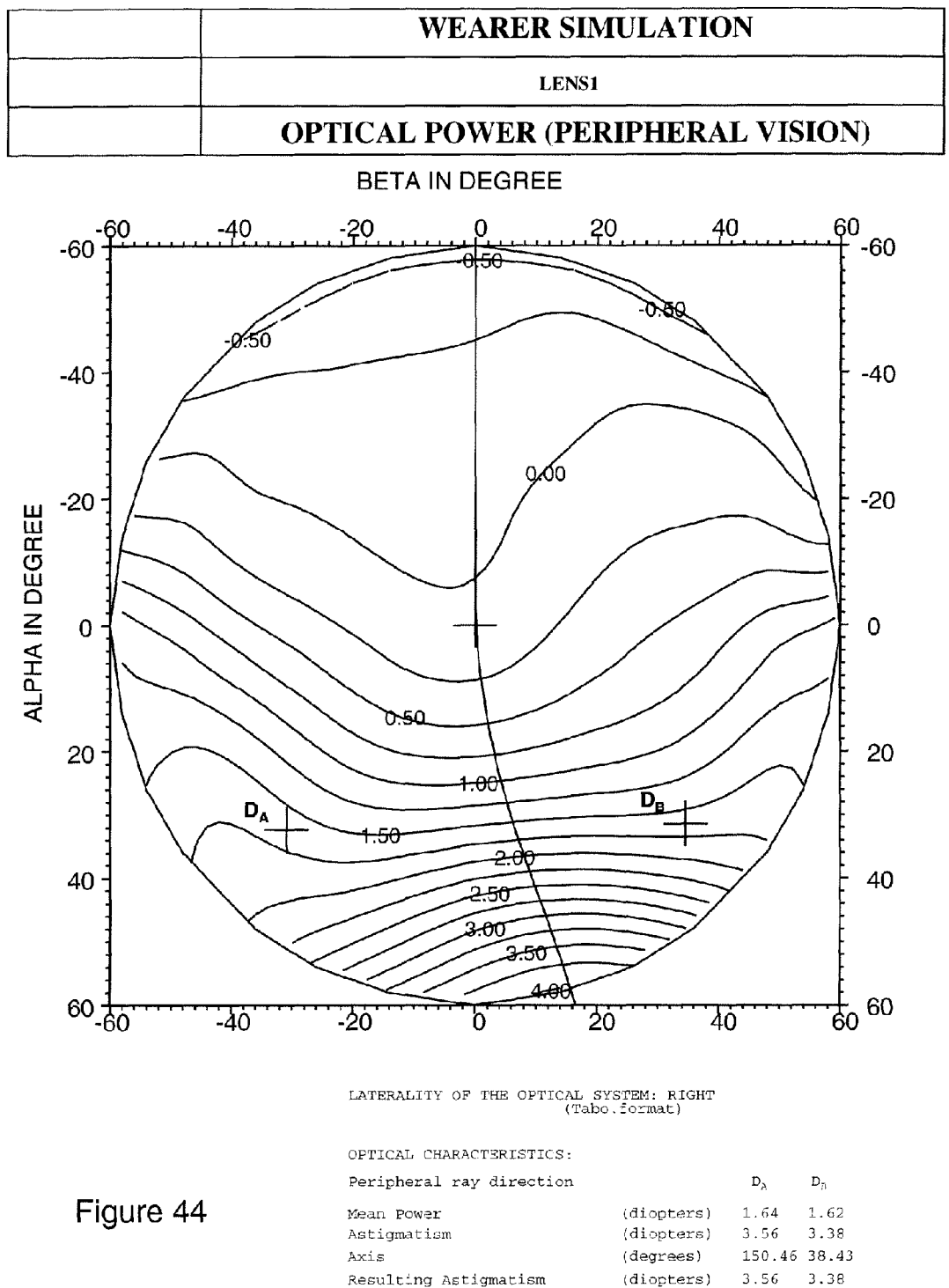
Figure 45:
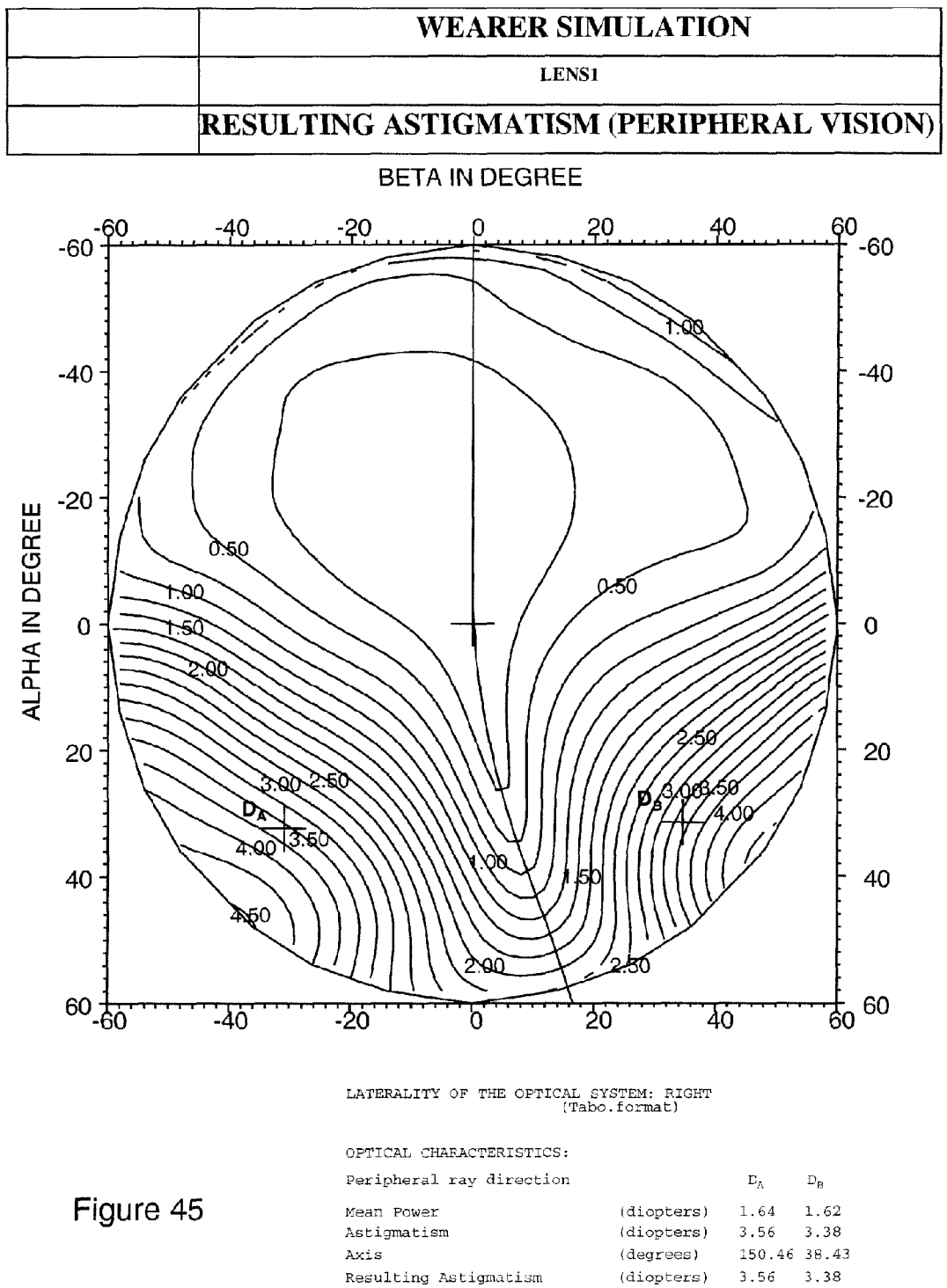

FIGS. 44 and 45 give optical performances of LENS1 for peripheral vision when the gaze direction is fixed in the primary gaze direction. For the sake of comparison, two specific peripheral ray directions $D_A$ and $D_B$ are considered. $D_A$ and $D_B$ intersect the front surface of LENS1 at points A and B.

For direction $D_A$, mean peripheral power is 1.64 δ, peripheral astigmatism is 3.56 δ, axis of the defect astigmatism $\gamma_A$ is 150° and peripheral astigmatism defect is 3.56 δ. The distortion in this direction $D_A$ may be indicated by the value of $G_{DA}(\gamma_A+90°)-G_{DA}(\gamma_A)$ which amounts to 0.05238233. The corresponding value of the mean magnification $G_{DA}(\gamma_A+90°)*G_{DA}(\gamma_A)$ is 1.05670098.

For direction $D_B$, mean peripheral power is 1.62 δ, peripheral astigmatism is 3.38 δ, axis of the defect astigmatism $\gamma_B$ is 38° and astigmatism defect is 3.38 δ. The distortion in this direction $D_B$ may be indicated by the value of $G_{DB}(\gamma_B+90°)-G_{DB}(\gamma_B)$ which amounts to 0.04838258. The corresponding value of the mean magnification $G_{DB}(\gamma_B+90°)*G_{DB}(\gamma_B)$ is 1.05646721.

Further to this local analysis in two peripheral ray directions of the performance of LENS1, a global analysis may also be carried out. Portion1 in the temporal area may be delimited by ray directions of 0°<alpha<50° and −50°<beta<−10° and such that resulting astigmatism in the portion considered is more than 0.50 diopters. Portion2 in the nasal area may be delimited by ray directions of 0°<alpha<50° and 50°>beta>10° and such that resulting astigmatism in the portion considered is more than 0.50 diopters. The mean axis value γ calculated over Portion1 is about 150°. The corresponding value of G(γ+90°)−G(γ) is 0.034529416. The corresponding value of G(γ+90°)*G(γ) is 1.045640351. The mean axis value γ calculated over Portion2 is about 40°. The corresponding value of G(γ+90°)−G(γ) is 0.026984956. The corresponding value of G(γ+90°)*G(γ) is 1.044253906.

Figure 46:
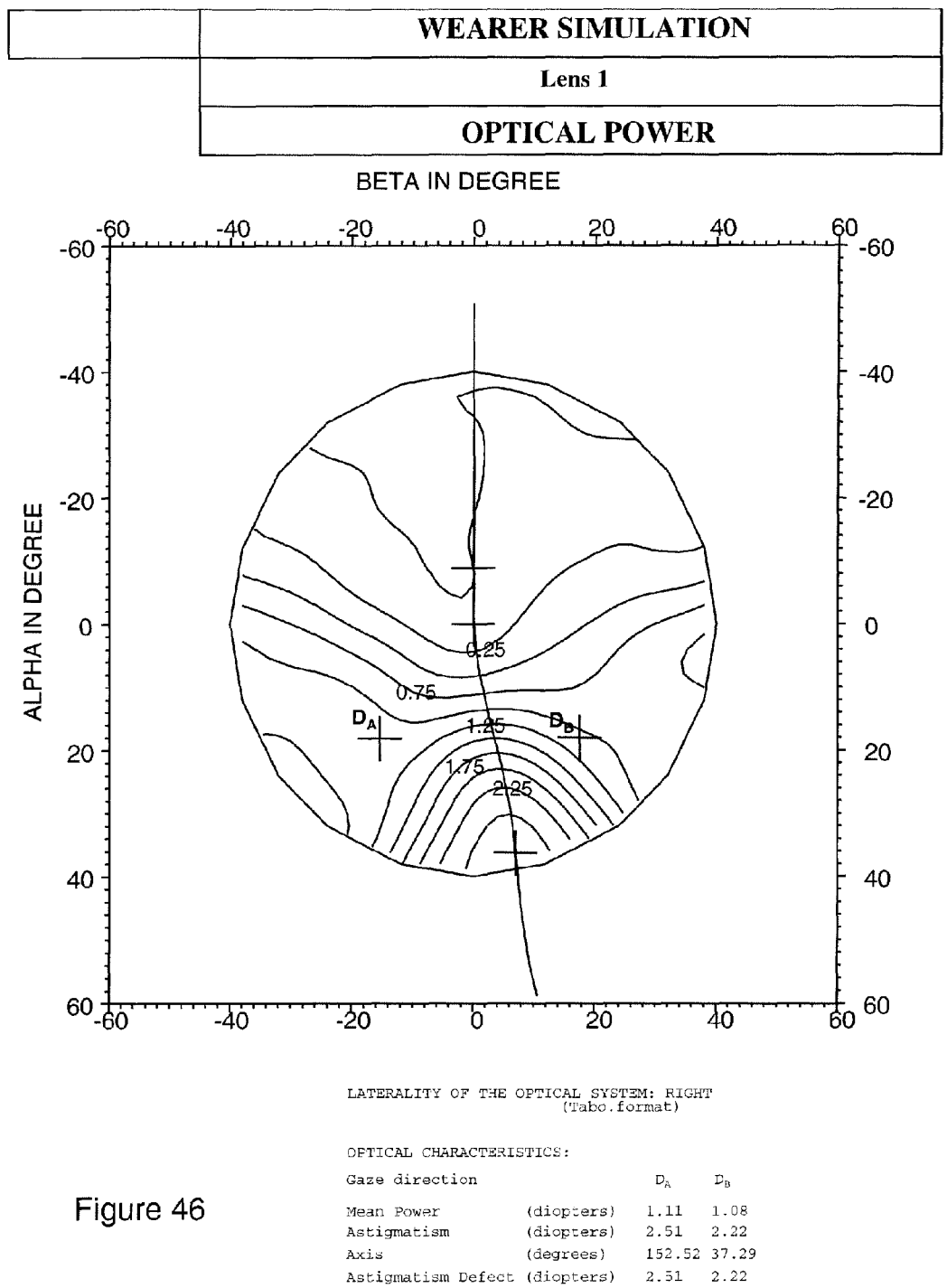
Figure 47:
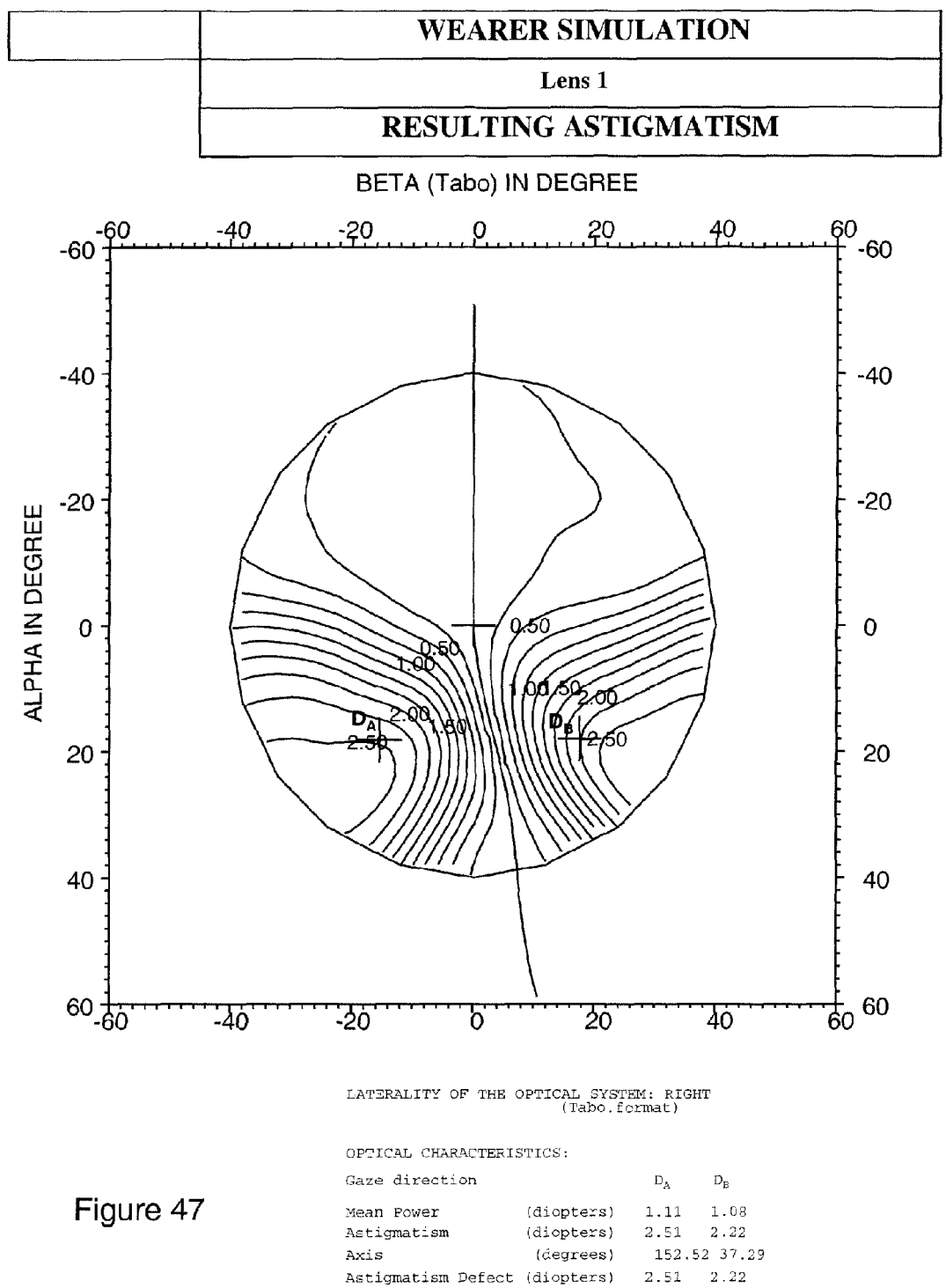

The same evaluation can be done in central vision. FIGS. 46 and 47 give optical performances of LENS1 for central vision. For the gaze direction $D_A$, in central vision, mean power is 1.11 δ, astigmatism is 2.51 δ, axis of the defect astigmatism $\gamma_A$ is 153° and astigmatism defect is 2.51 δ. The distortion in this direction $D_A$ may be indicated by the value of $G_{DA}(\gamma_A+90°)-G_{DA}(\gamma_A)$ which amounts to 0.068361295. The mean magnification value $G_{DA}(\gamma_A+90°)*G_{DA}(\gamma_A)$ is 1.069477041.

For direction $D_B$, mean power is 1.08 δ, astigmatism is 2.22 δ, axis of the defect astigmatism $\gamma_B$ is 37° and astigmatism defect is 2.22 δ. The distortion in this direction $D_B$ may be indicated by the value of G($\gamma_B$+90°)−G($\gamma_B$) which amounts to 0.060693133. The corresponding value of $G_{DB}(\gamma_B+90°)*G_{DB}(\gamma_B)$ is 1.067490878.

These different characterizations will enable a comparison with LENS2, LENS3, LENS4 and LENS5 whose characteristics are developed in examples 2, 3, 4 and 5. These four examples are lenses according to the invention made for the same prescription of the one of LENS1.

The first step of the method (step 10 in FIG. 18) is to define a target optical function. The predetermined target optical function is the same for LENS1, LENS2, LENS3, LENS4 and LENS5.

Thus, for this prescription, reference axes determined at step 16 of the method are $\Gamma_1=150°$ in Portion 1 (Temporal_Area) and $\Gamma_2=40°$ in Portion2 (Nasal Area), Portion 1 and Portion 2 of the front surface being determined from optical Portion1 and Portion 2 defined in this example.

All the steps of the method (step 10, 12, 14, 16, 18, 20) have been carried out for lenses LENS2 to LENS5. LENS2 to LENS5 exhibit different performance in term of distortion but the same performances in power and astigmatism.

EXAMPLE 2

Figure 48:
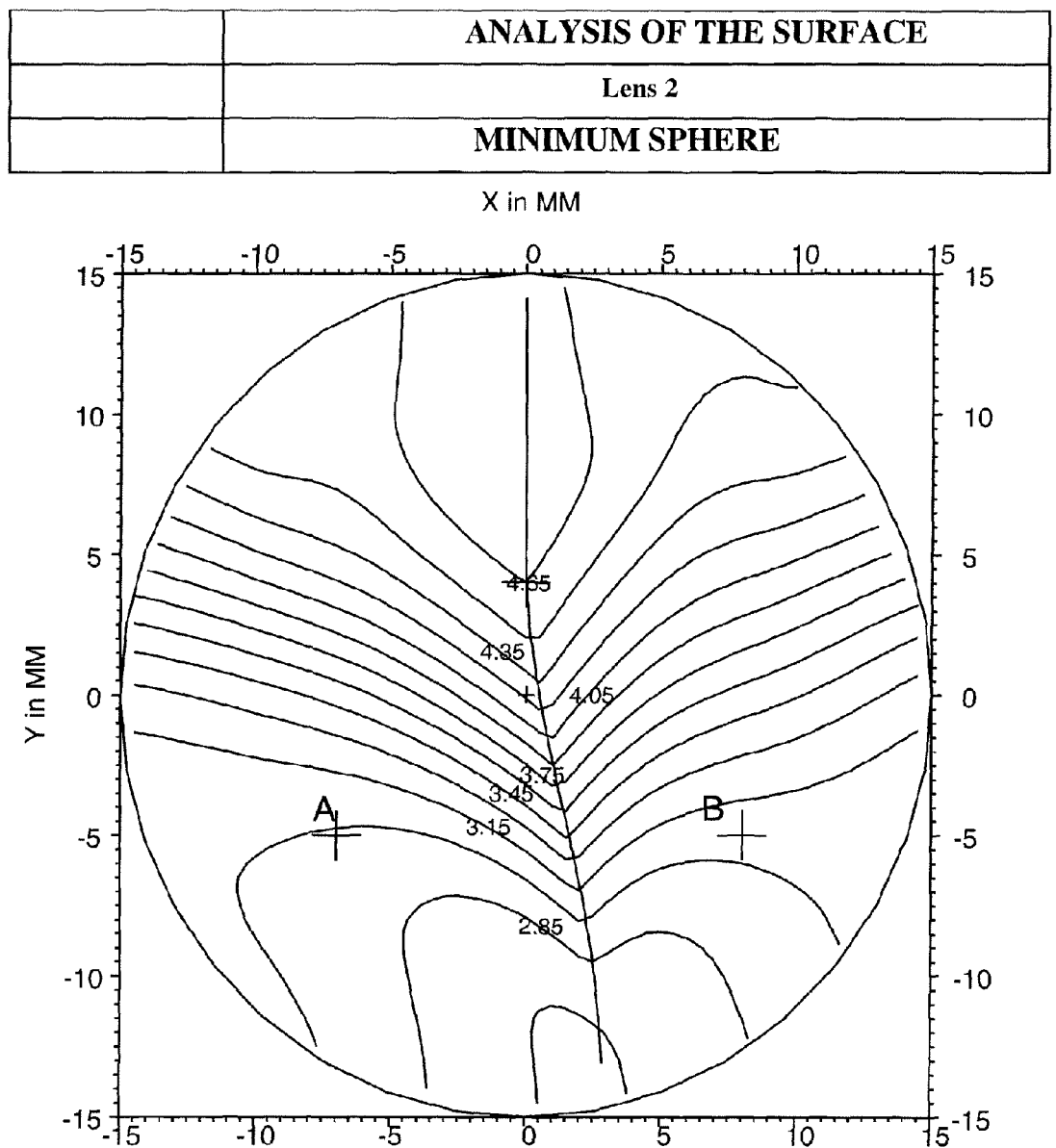
Figure 49:
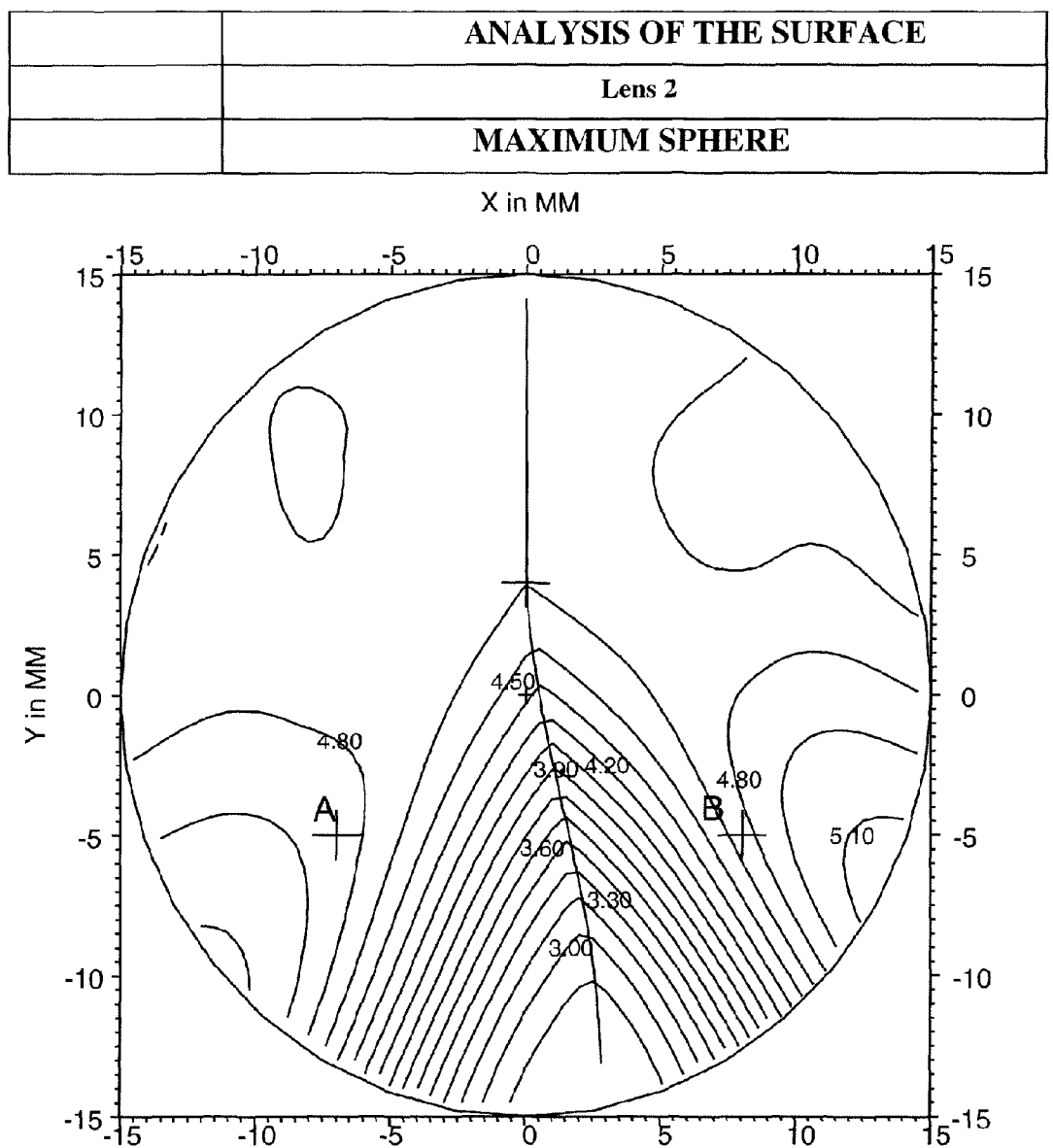
Figure 50:
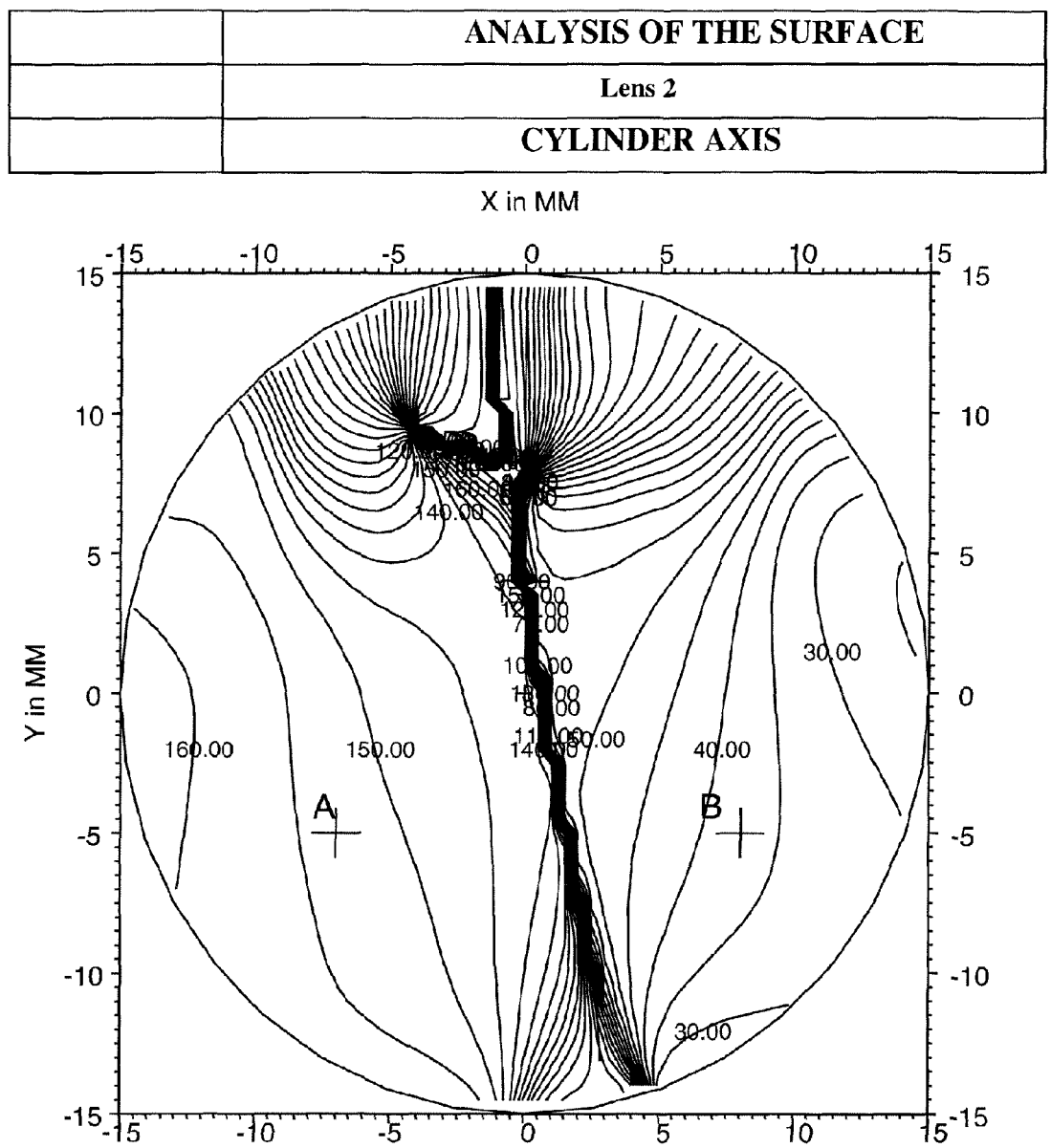

FIGS. 48, 49 and 50 are the surface characteristics of the front surface of LENS2. For point A, the maximum sphere $SPH_{max\_A}$ is equal to 4.88 δ, the minimum sphere $SPH_{min\_A}$ is equal to 3.00 δ and the cylinder axis $\gamma_{AX\_A}=153°$, then the mean sphere value is 3.94 δ. For point B, the maximum sphere $SPH_{max\_B}$ is equal to 4.72 δ, the minimum sphere $SPH_{min\_B}$ is equal to 3.05 δ and the cylinder axis $\gamma_{AX\_B}=37$, then the mean sphere is 3.89 δ.

Figure 51:
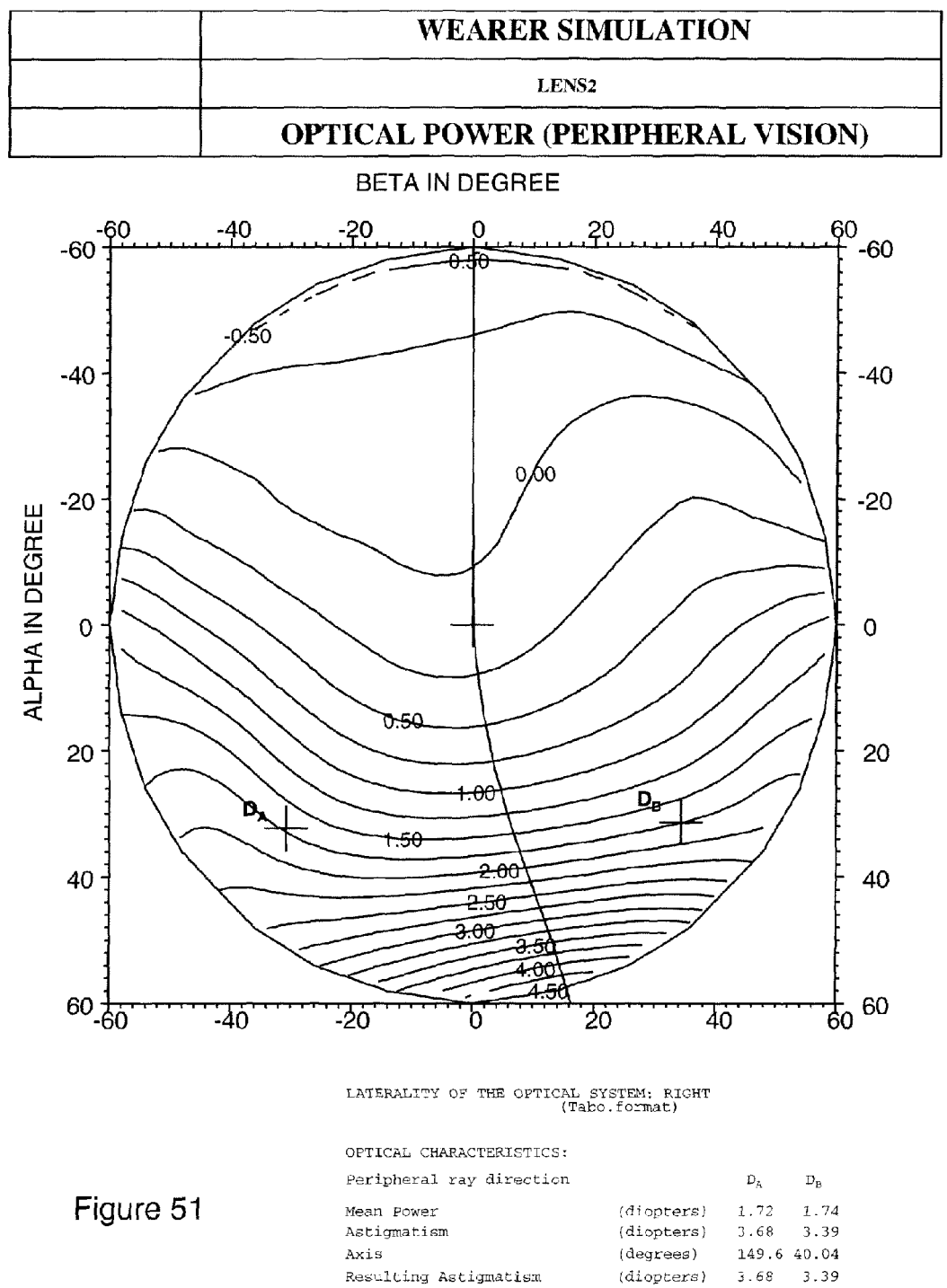
Figure 52:
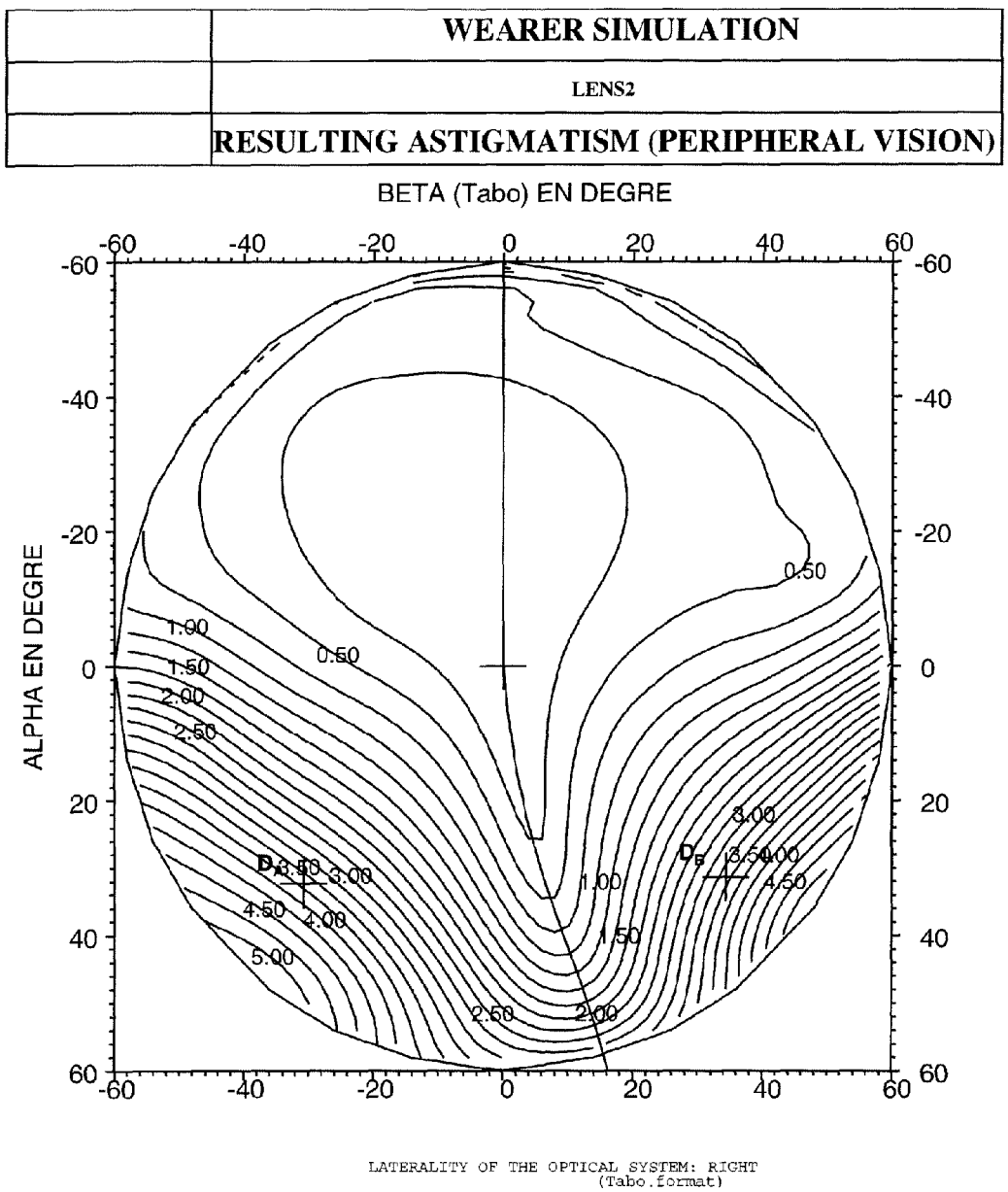

FIGS. 51 and 52 give optical analyzes of the peripheral performance of LENS2. For the sake of comparison, the same two specific directions $D_A$ and $D_B$ are considered. For direction $D_A$, mean peripheral power is 1.72 δ, peripheral astigmatism is 3.68 δ, axis of the peripheral defect astigmatism $\gamma_A$ is 150° and peripheral astigmatism defect is 3.68 δ. For direction $D_B$, mean peripheral power is 1.74 δ, peripheral astigmatism is 3.39 δ, axis of the peripheral defect astigmatism $\gamma_B$ is 40° and peripheral astigmatism defect is 3.39 δ. The peripheral optical performances of LENS2 in $D_A$ and $D_B$ are substantially the same as the peripheral optical performances of LENS1 with regards to power and astigmatism values.

However, despite similar peripheral optical performances in terms of optical power and astigmatism, the distortion of LENS2 is reduced regarding LENS1. Indeed, $G_{DA}(\gamma_A+90°)-G_{DA}(\gamma_A)=0.04887881$. Compared to the value of LENS1, there is a reduction of 6.7%. Furthermore, $G(\gamma_A+90°)*G(\gamma_A)= 1.05330224$. Compared to the value of LENS1, there is a reduction of 0.3%. Similarly, the distortion in the direction $D_B$ may be indicated by the value of $G(\gamma_B+90°)-G(\gamma_B)$ which amounts to 0.04492625. Compared to the value of LENS1, there is a reduction of 7.1%. The corresponding value of $G(\gamma_B+90°)*G(\gamma_B)$ is 1.05310467. Compared to the value of example 1, there is a reduction of 0.3%.

Further to this local analysis, a global analysis may also be carried out. The portions are the same as for LENS1. The mean axis γ for the temporal area is 150°. The corresponding value of $G(\gamma+90°)-G(\gamma)$ is 0.034307044. Compared to the value of LENS1, there is a reduction of 0.6%. The corresponding value of $G(\gamma+90°)*G(\gamma)$ is 1.045072749. Compared to the value of LENS1, there is a reduction of 0.05%. The mean axis for the nasal area is 40°. The corresponding value of $G(\gamma+90°)-G(\gamma)$ is 0.026948119. Compared to the value of LENS1, there is a reduction of 0.1%. The corresponding value of $G(\gamma+90°)*G(\gamma)$ is 1.042590305. Compared to the value of LENS1, there is a reduction of 0.16%.

Figure 53:
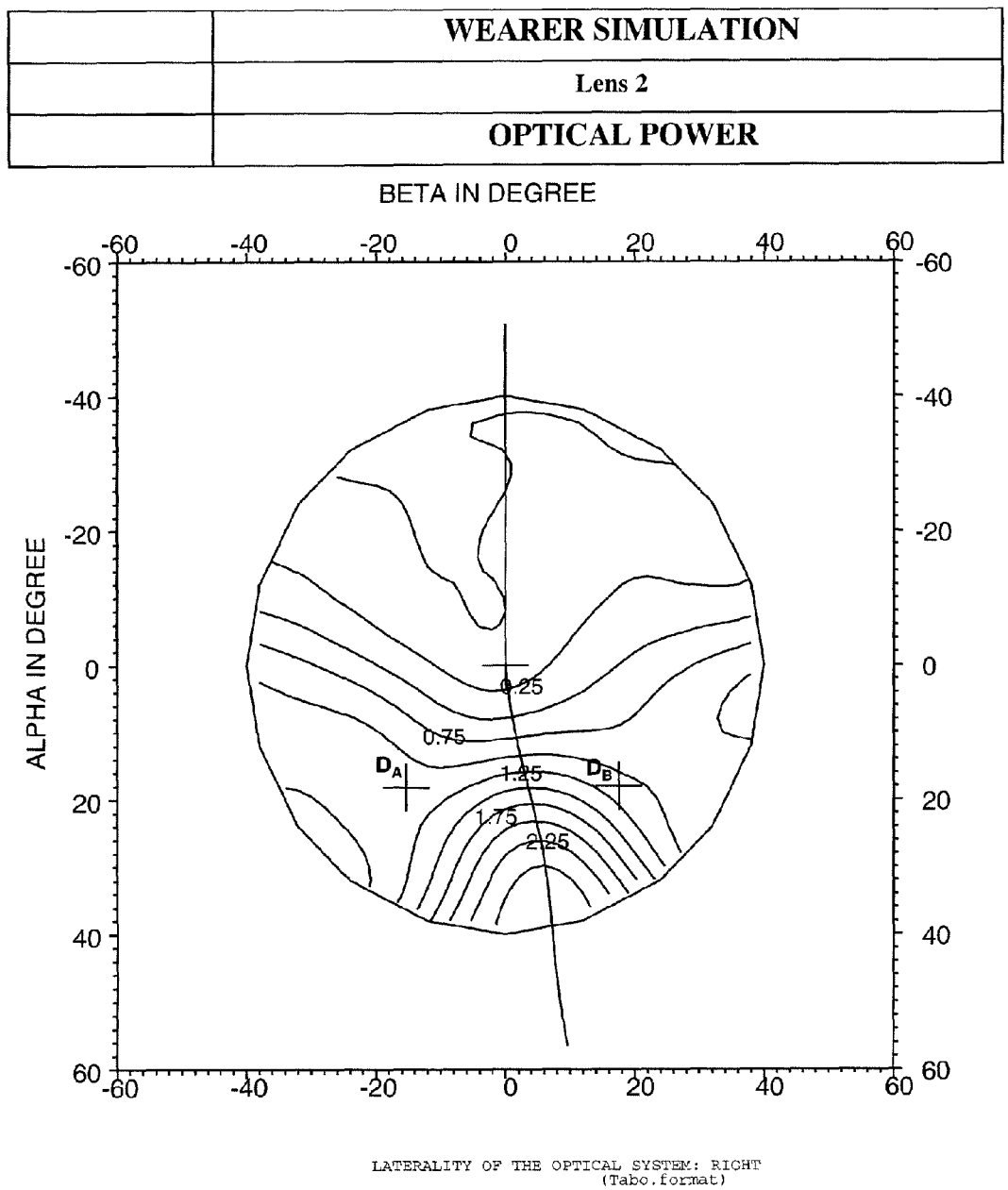
Figure 54:
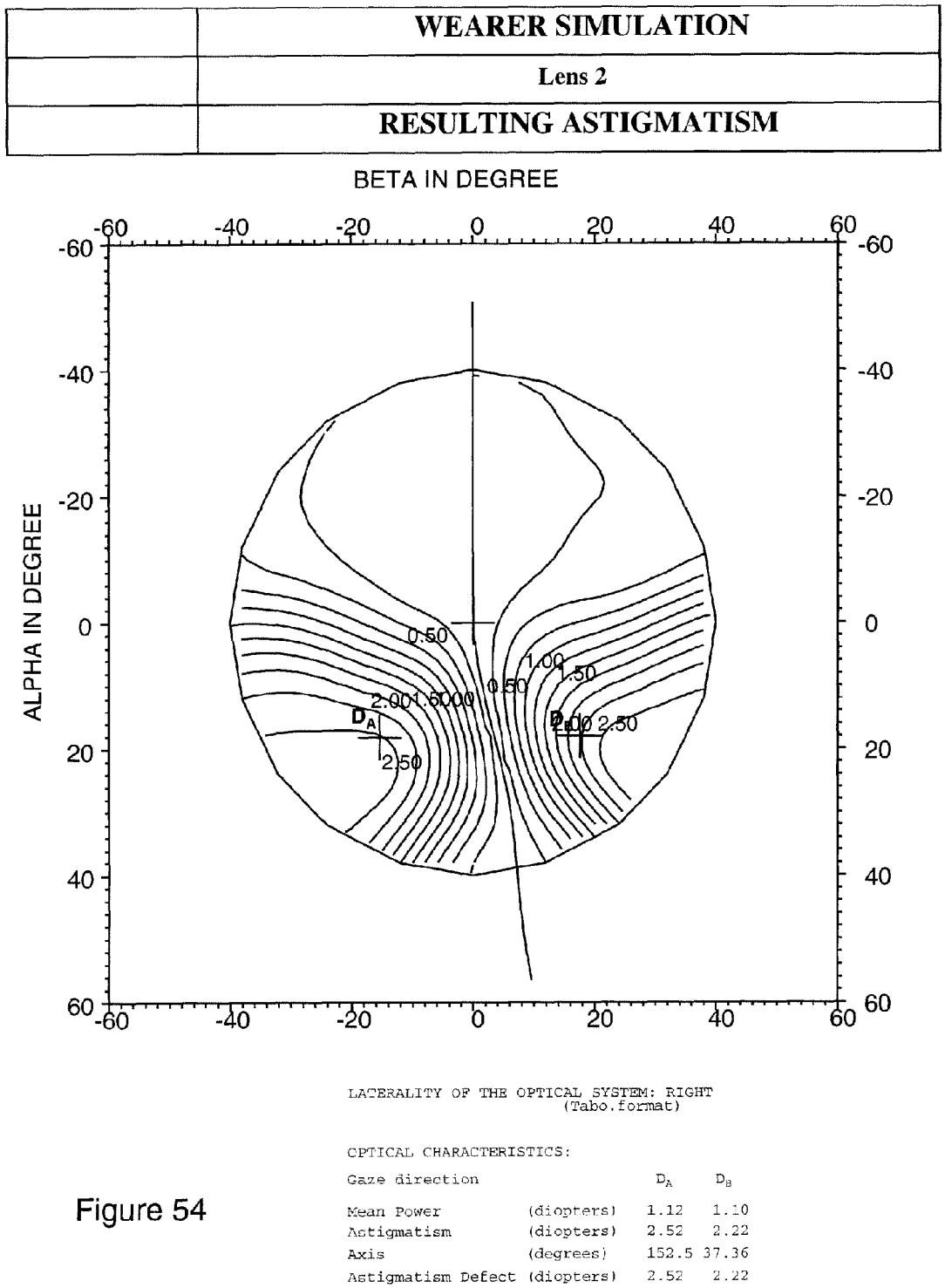

The same evaluation can be done in central vision. FIGS. 53 and 54 give optical performances of LENS2 for central vision.

For direction $D_A$, in central vision, mean power is 1.12 δ, astigmatism is 2.52 δ, axis of the defect astigmatism $\gamma_A$ is 153° and astigmatism defect is 2.52 δ. For direction $D_B$, mean power is 1.10 δ, astigmatism is 2.22 δ, axis of the defect astigmatism $\gamma_B$ is 37° and astigmatism defect is 2.22 δ. This means that the optical performances of LENS2 in $D_A$ and $D_B$ are substantially the same as the optical performances of LENS1 with regards to power and astigmatism values in central vision.

The distortion in the direction $D_A$ may be indicated by the value of $G_{DA}(\gamma_A+90°)-G_{DA}(\gamma_A)$ which amounts to 0.064786606. Compared to the value of LENS1, there is a reduction of 5.2%. The corresponding value of $G_{DA}(\gamma_A+90°)*G_{DA}(\gamma_A)$ is 1.066037202. Compared to the value of LENS1, there is a reduction of 0.3%. The distortion in the direction $D_B$ may be indicated by the value of $G(\gamma_B+90°)-G(\gamma_B)$ which amounts to 0.057186898. Compared to the value of LENS1, there is a reduction of 5.8%. The corresponding value of $G_{DB}(\gamma_B+90°)*G_{DB}(\gamma_B)$ is 1.064093242. Compared to the value of LENS1, there is a reduction of 0.3%.

Then, the performance of the LENS2 relative to distortion is improved compared to LENS1 while guaranteeing the same sharpness of the image for the wearer.

EXAMPLE 3

Figure 55:
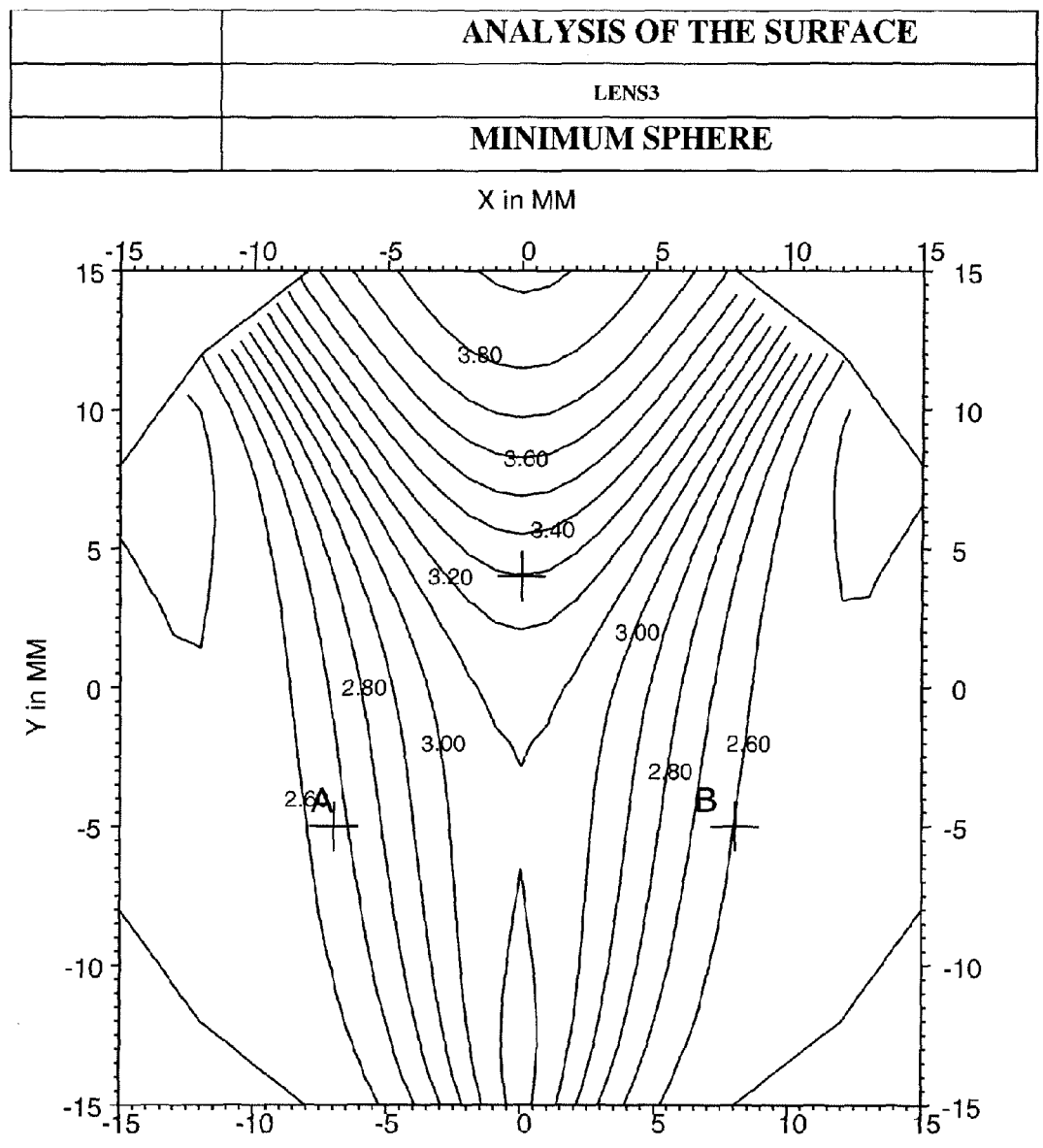
Figure 56:
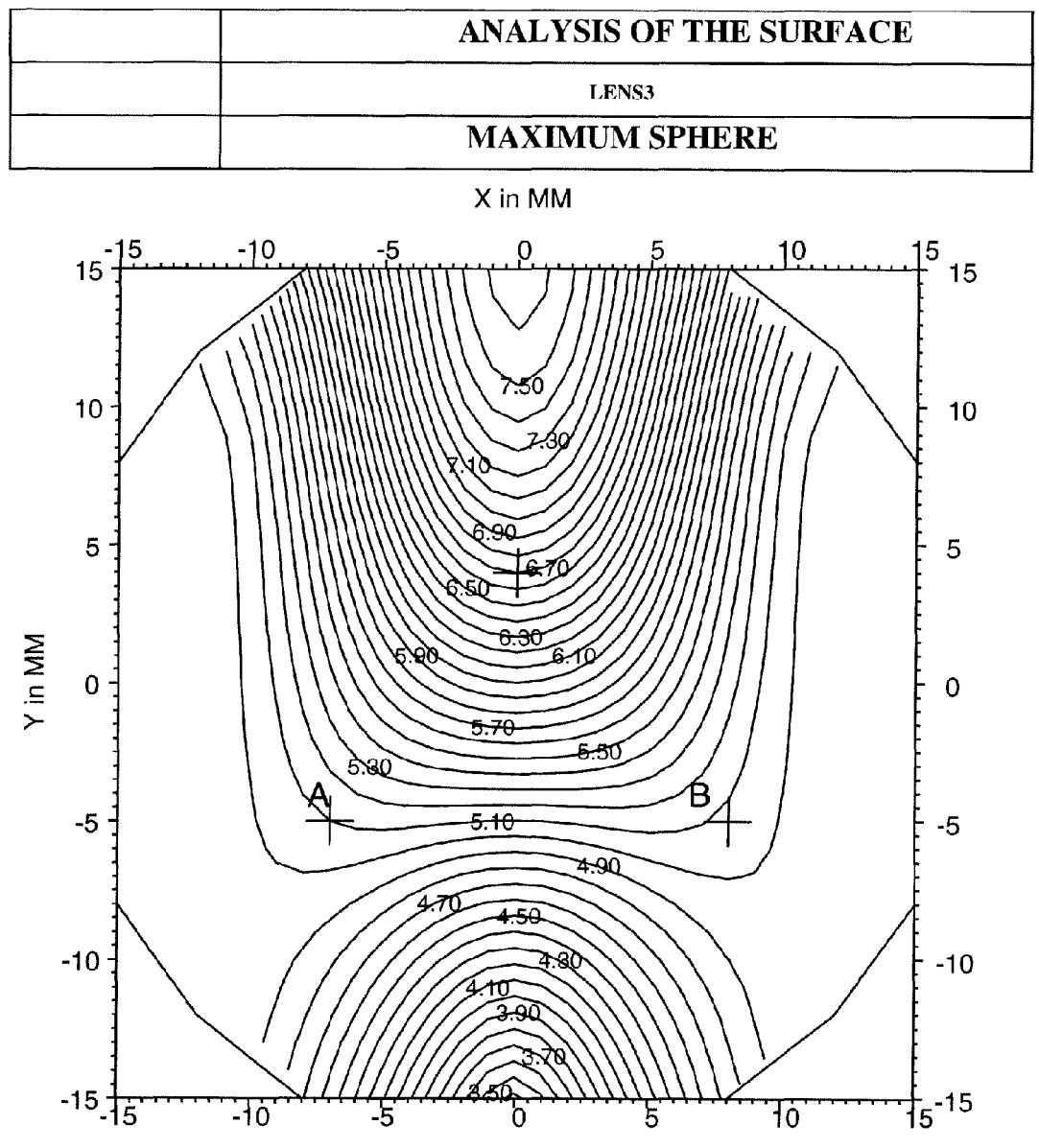
Figure 57:
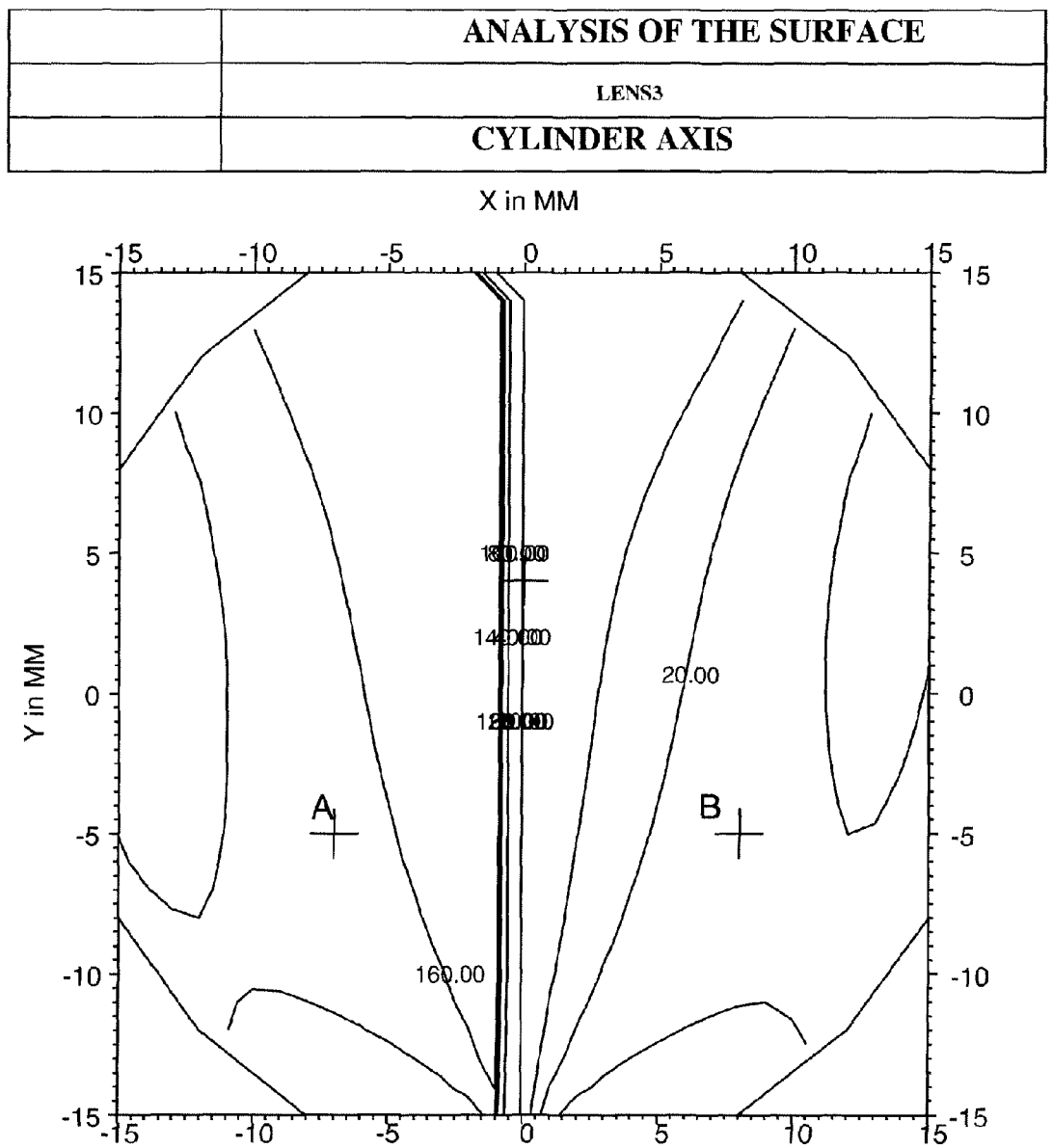

FIGS. 55, 56 and 57 are the surface characteristics of the front surface of LENS3. For point A, the maximum sphere $SPH_{max\_A}$ is equal to 5.10 δ, the minimum sphere $SPH_{min\_A}$ is equal to 2.66 δ and the cylinder axis $\gamma_{AX\_A}=154°$, then the mean sphere value is 3.38 δ. For point B, the maximum sphere $SPH_{max\_B}$ is equal to 5.07 δ, the minimum sphere $SPH_{min\_B}$ is equal to 2.60 δ and the cylinder axis $\gamma_{AX\_B}=27°$, then the mean sphere value is 3.83 δ.

Figure 58:
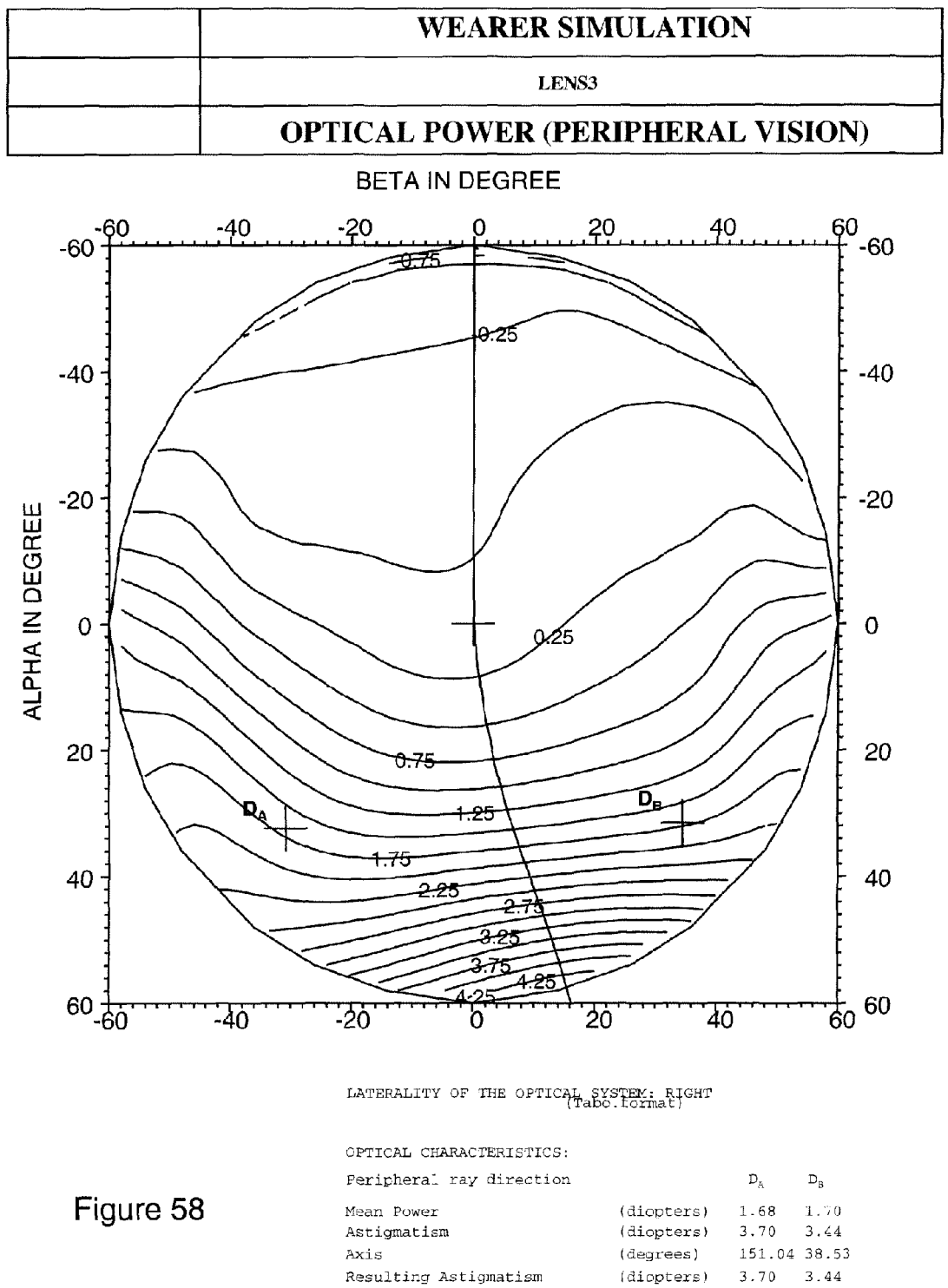
Figure 59:
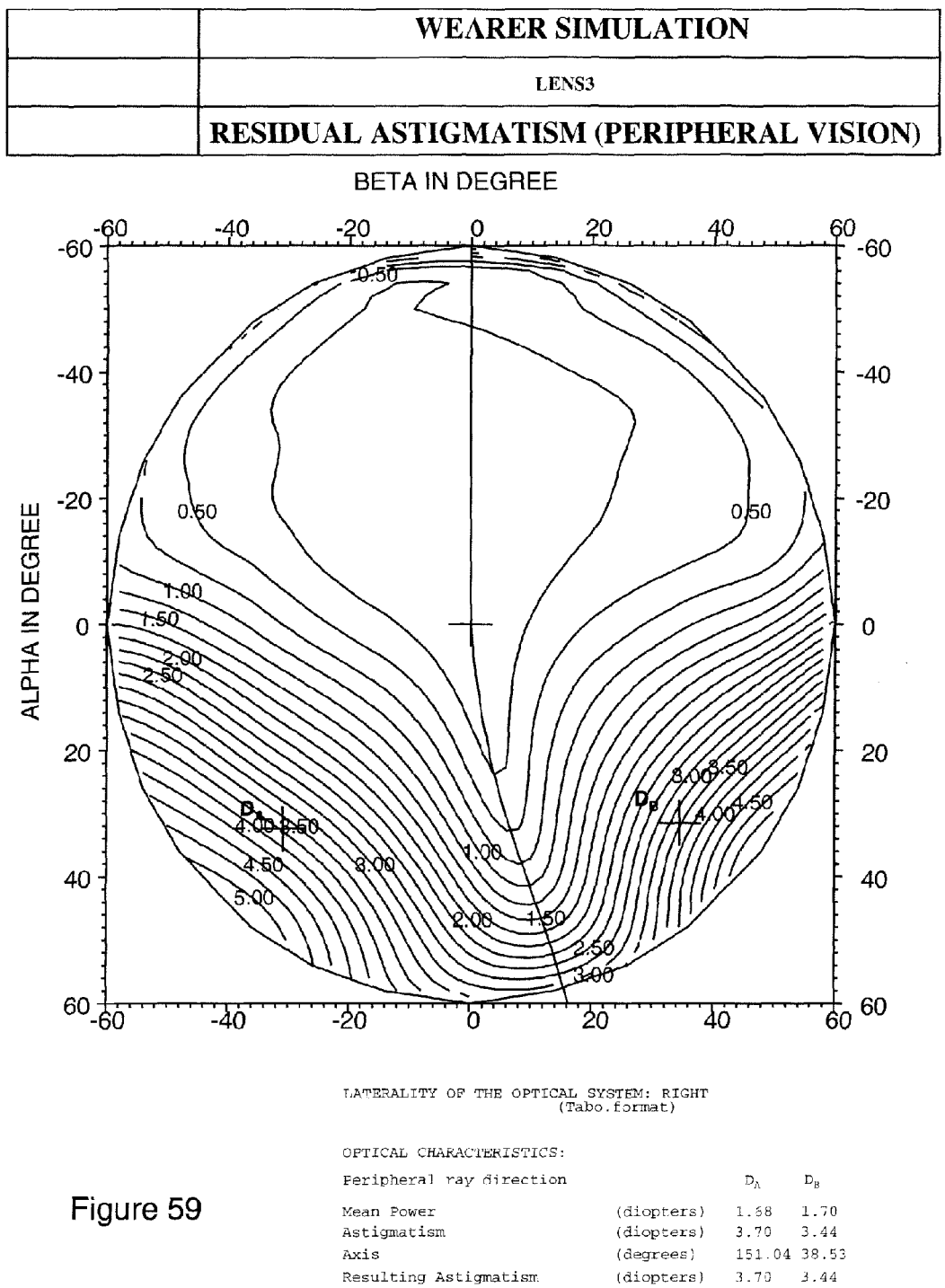

FIGS. 58 and 59 give optical analyses of the peripheral performance of LENS3. For the sake of comparison, the same two specific directions $D_A$ and $D_B$ are considered. For direction $D_A$, mean peripheral power is 1.68 δ, peripheral astigmatism is 3.70 δ, axis of the peripheral defect of astigmatism $\gamma_A$ is 151° and peripheral astigmatism defect is 3.70 δ. For direction $D_B$, mean peripheral power is 1.70 δ, peripheral astigmatism is 3.44 δ, axis of the peripheral defect of astigmatism $\gamma_B$ is 39° and astigmatism defect is 3.44 δ. This means that the peripheral optical performance of LENS3 in $D_A$ and $D_B$ are substantially the same as the optical performances of LENS1 with regards to peripheral power and peripheral astigmatism values.

However, despite similar performances in terms of peripheral optical power and peripheral astigmatism, the distortion of LENS3 is reduced regarding LENS1. Indeed, the distortion in this direction $D_A$ may be indicated by the value of $G(\gamma_A+90°)-G(\gamma_A)$ which amounts to 0.0484037. Compared to the value of LENS1, there is a reduction of 7.6%. The corresponding value of $G(\gamma_A+90°)*G(\gamma_A)$ is 1.05319618. Compared to the value of example 1, there is a reduction of 0.3%.

Similarly, the distortion in this direction $D_B$ may be indicated by the value of $G(\gamma_B+90°)-G(\gamma_B)$ which amounts to 0.04441357. Compared to the value of LENS1, there is a reduction of 8.2%. The corresponding value of $G(\gamma_A+90°)*G(\gamma_A)$ is 1.0530075. Compared to the value of LENS1, there is a reduction of 0.3%.

A global analysis may also be carried out. The mean axis γ for the temporal area is 150°. The corresponding value of $G(\gamma+90°)-G(\gamma)$ is 0.033326186. Compared to the value of LENS1, there is a reduction of 3.5%. The corresponding value of $G(\gamma+90°)*G(\gamma)$ is 1.044583748. Compared to the value of LENS1, there is a reduction of 0.10. The global axis β for the nasal area is 40°. The corresponding value of $G(\gamma+90°)-G(\gamma)$ is 0.025899471. Compared to the value of LENS1, there is a reduction of 4.0%. The corresponding value of G(γ+90°)*G(γ) is 1.042440926. Compared to the value of example 1, there is a reduction of 0.17%.

Figure 60:
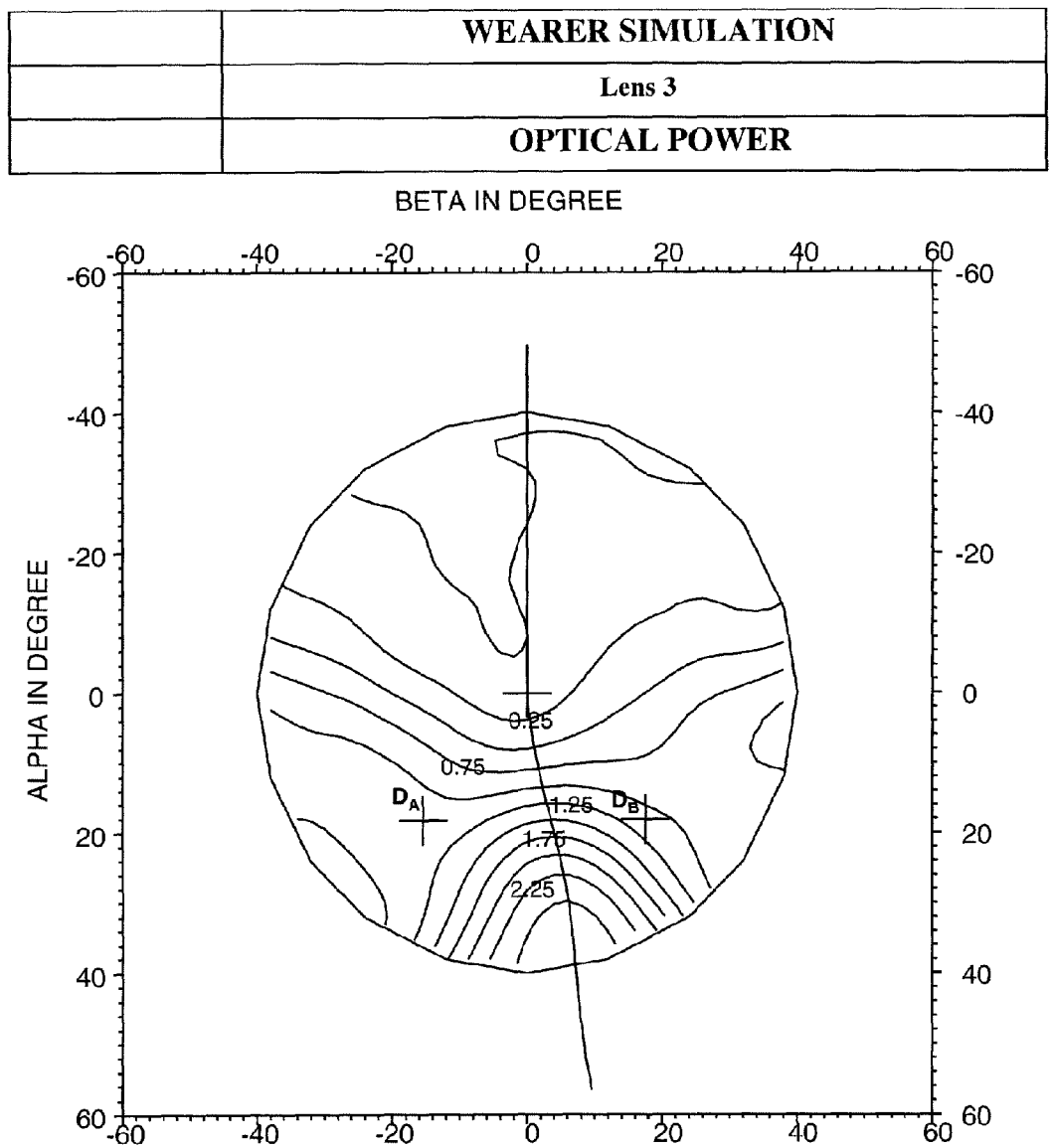
Figure 61:
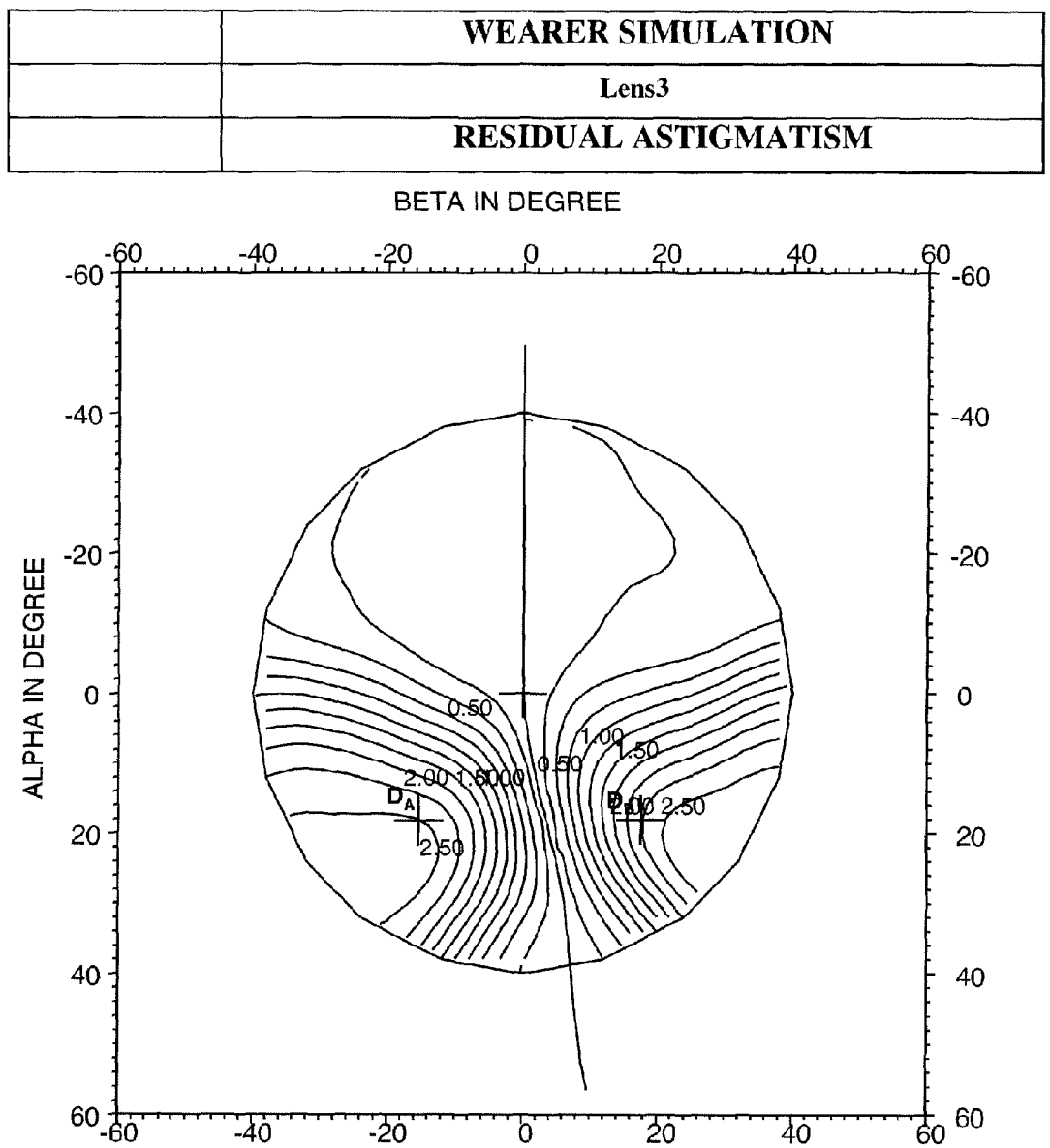

The same evaluation can be done in central vision. FIGS. 60 and 61 give optical performances of LENS3 for central vision.

For direction $D_A$, in central vision, mean power is 1.12 δ, astigmatism is 2.51 δ, axis of the defect astigmatism $\gamma_A$ is 153° and astigmatism defect is 2.51 δ. For direction $D_B$, mean power is 1.09 δ, astigmatism is 2.23 δ, axis of the defect astigmatism $\gamma_B$ is 37° and astigmatism defect is 2.23 δ. This means that the optical performances of LENS3 in $D_A$ and $D_B$ are substantially the same as the optical performances of LENS1 regarding power and astigmatism values in central vision.

The distortion in the direction $D_A$ may be indicated by the value of $G_{DA}(\gamma_A+90°)-G_{DA}(\gamma_A)$ which amounts to 0.06429864. Compared to the value of LENS1, there is a reduction of 5.94%. The corresponding value of $G_{DA}(\gamma_A+90°)*G_{DA}(\gamma_A)$ is 1.06592987. Compared to the value of LENS1, there is a reduction of 0.33%. As expected, the reduction is higher than for LENS2. The distortion in this direction $D_B$ may be indicated by the value of $G(\gamma_B+90°)-G(\gamma_B)$ which amounts to 0.05662577. Compared to the value of LENS1, there is a reduction of 6.7%. The corresponding value of $G_{DB}(\gamma_B+90°)*G_{DB}(\gamma_B)$ is 1.063995107. Compared to the value of LENS1, there is a reduction of 0.33%.

Then, the performance of the LENS3 relative to distortion is improved compared to LENS1 while guaranteeing the same sharpness of the image for the wearer. Furthermore, the performance of the LENS3 relative to distortion is improved compared to LENS2 while guaranteeing the same sharpness of the image for the wearer.

EXAMPLE 4

Figure 62:
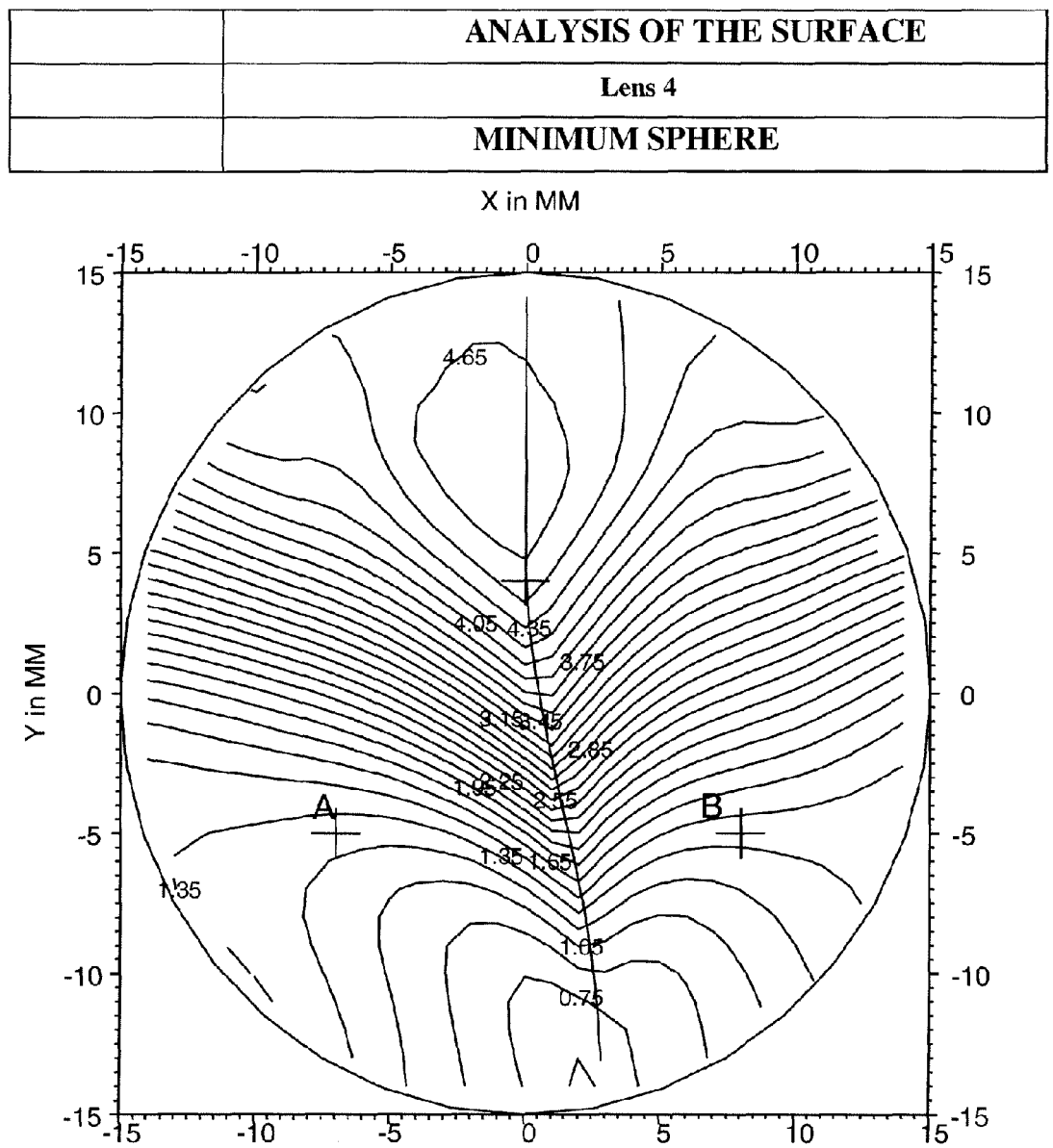
Figure 63:
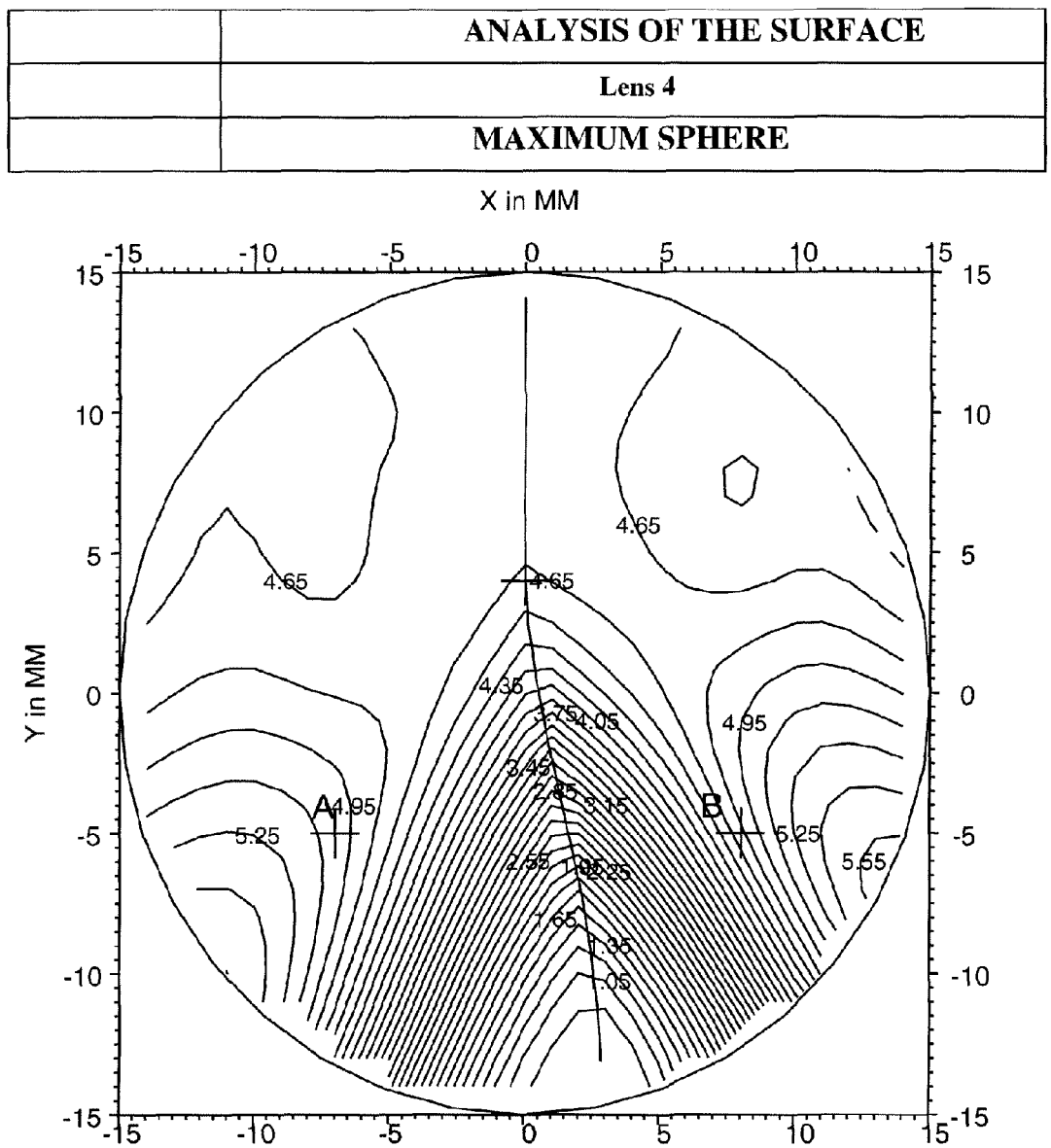
Figure 64:
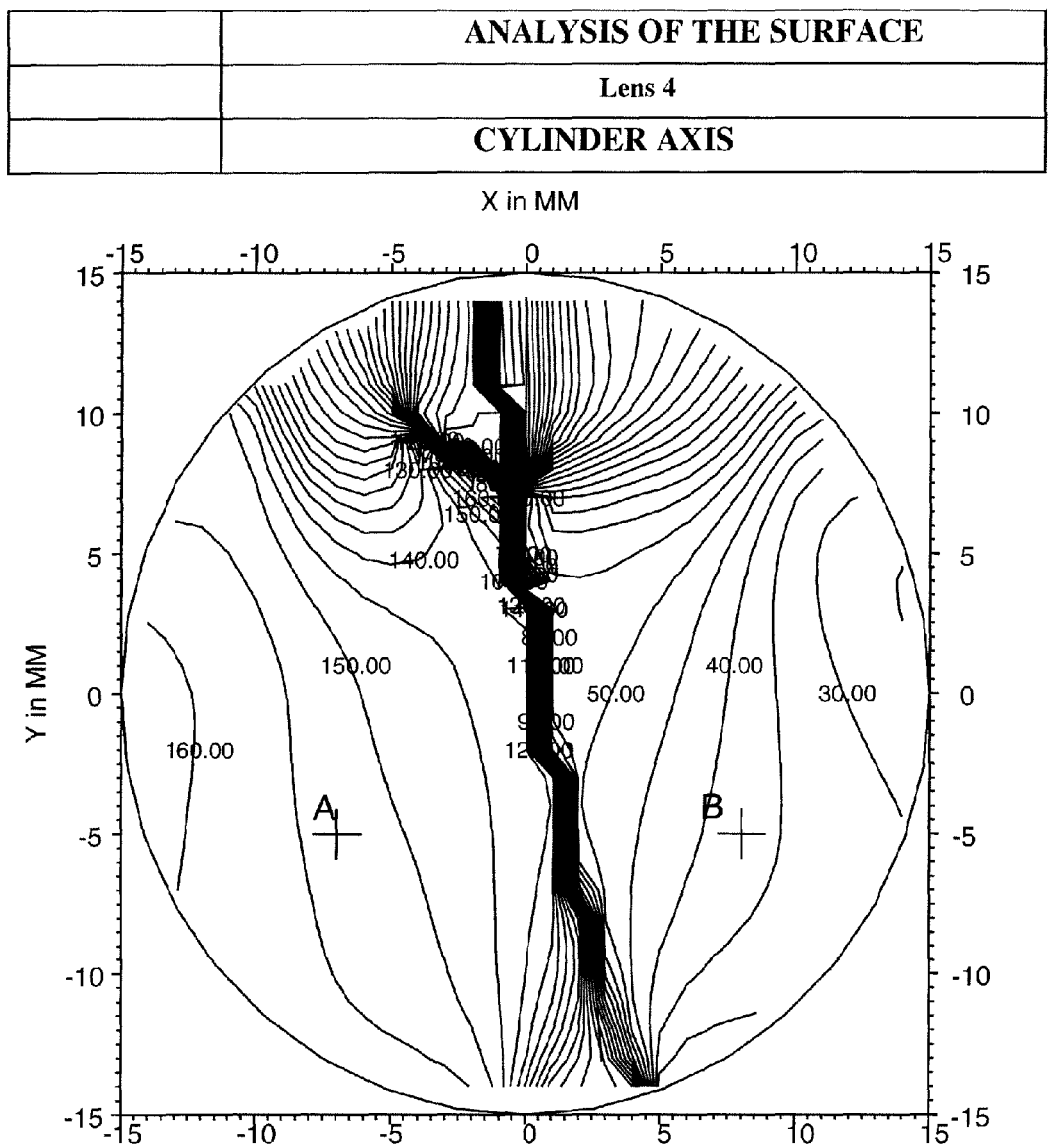

FIGS. 62, 63 and 64 are the surface characteristics of the front surface of LENS4. For point A, the maximum sphere $SPH_{max\_A}$ is equal to 5.02 δ, the minimum sphere $SPH_{min\_A}$ is equal to 1.27 δ and the cylinder axis $\gamma_{AX\_A}=153°$. For point B, the maximum sphere $SPH_{max\_B}$ is equal to 4.80 δ, the minimum sphere $SPH_{min\_B}$ is equal to 1.42 δ and the cylinder axis $\gamma_{AX\_B}=37°$.

Compared to the front surface of LENS2, this surface has approximately the same cylinder axis in points A and B. For this surface, the mean sphere in point A is about 3.15 δ and in point B about 3.11 δ. Since mean sphere values are lower than the ones of LENS2, distortion should be improved for LENS4 compared to LENS2.

Figure 65:
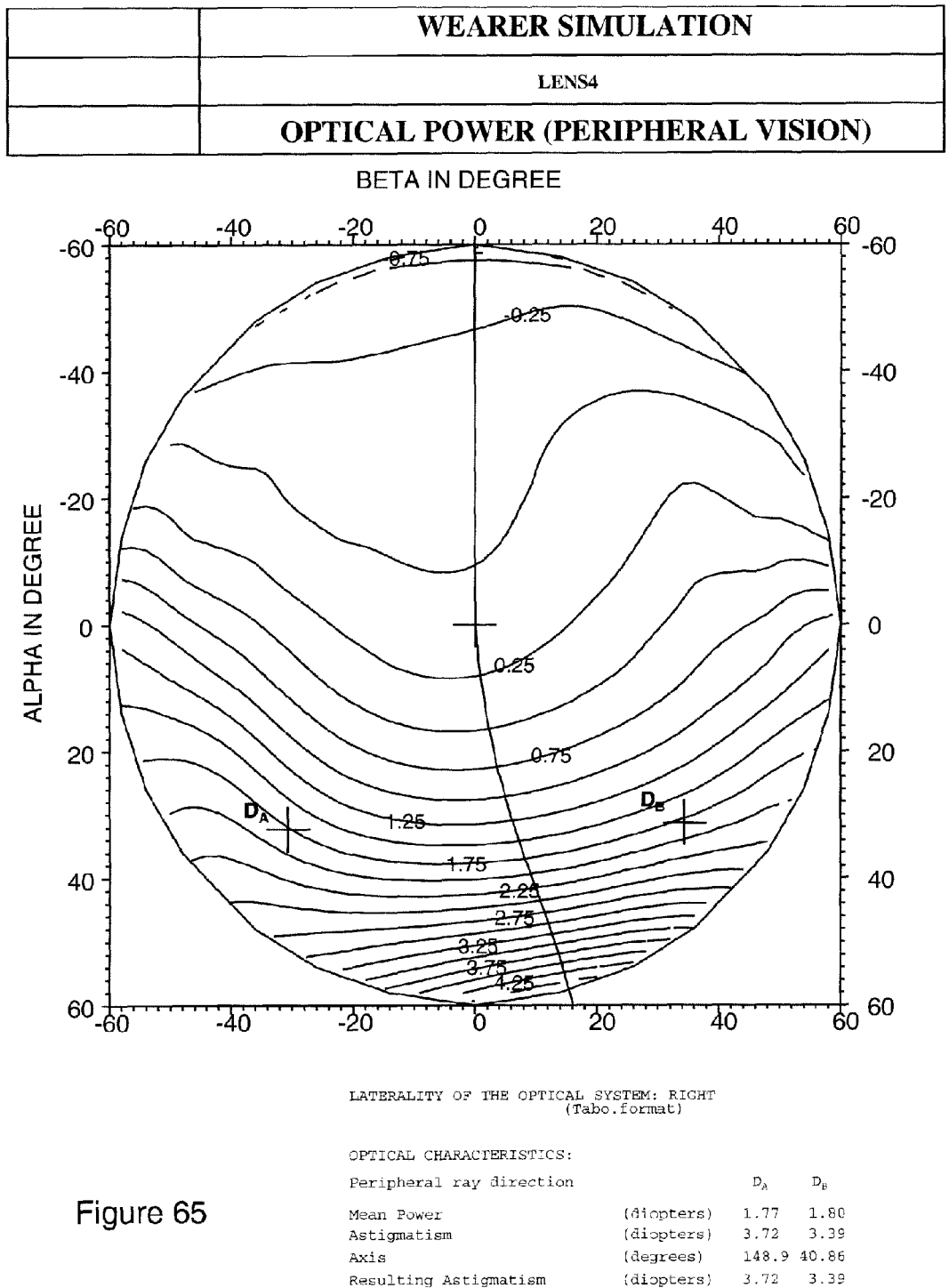
Figure 66:
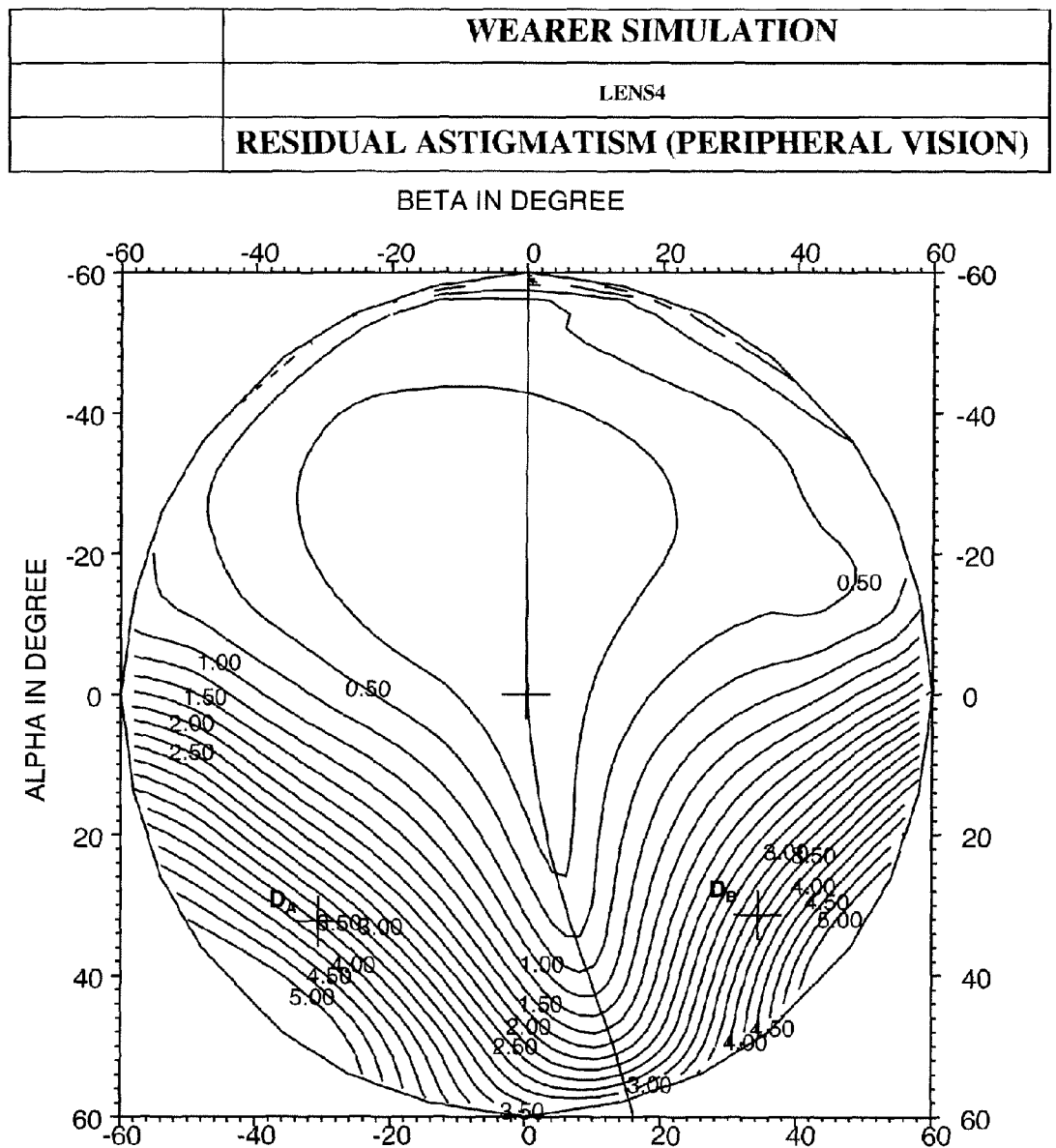

FIGS. 65 and 66 give optical analyses of the peripheral performance of LENS4. For the sake of comparison, the same two specific directions $D_A$ and $D_B$ are considered. For direction $D_A$, mean power is 1.77 δ, astigmatism is 3.72 δ, axis of the defect astigmatism $\gamma_A$ is 149° and astigmatism defect is 3.72 δ. For direction $D_B$, mean power is 1.80 δ, astigmatism is 3.39 δ, axis of the defect astigmatism $\gamma_B$ is 41° and astigmatism defect is 3.39 δ This means that the optical performances of the LENS4 in directions $D_A$ and $D_B$ are substantially the same as the performance of the LENS1 regarding peripheral power and peripheral astigmatism values.

However, despite these similar performances, the distortion of LENS4 is reduced regarding LENS1. Indeed, the distortion in this direction $D_A$ may be indicated by the value of $G(\gamma_A+90°)-G(\gamma_A)$ which amounts to 0.04724064. Compared to the value of LENS1, there is a reduction of 9.8%. The corresponding value of $G(\gamma_A+90°)*G(\gamma_A)$ is 1.05189442. Compared to the value of LENS1, there is a reduction of 0.45%. As expected, the reduction is higher than for LENS2.

Similarly, the distortion in this direction $D_B$ may be indicated by the value of $G(\gamma_B+90°)-G(\gamma_B)$ which amounts to 0.04342451. Compared to the value of LENS1, there is a reduction of 10.2%. The corresponding value of $G(\gamma_B+90°)*G(\gamma_B)$ is 1.05173226. Compared to the value of LENS1, there is a reduction of 0.45%. As expected, the reduction is higher than for LENS2.

A global analysis may also be carried out. The global axis γ for the temporal area is 150°. The corresponding value of G(γ+90°)-G(γ) is 0.03396042 Compared to the value of LENS1, there is a reduction of 1.65%. The reduction is higher than for the LENS2.

The global axis γ for the nasal area is 40°. The corresponding value of G(γ+90°)-G(γ) is 0.026100465. Compared to the value of LENS1, there is a reduction of 3.28%. The corresponding value of $G(\gamma_B+90°)*G(\gamma_B)$ is 1.041071791. Compared to the value of LENS1, there is a reduction of 0.3%. The reduction is higher than for the LENS2.

Figure 67:
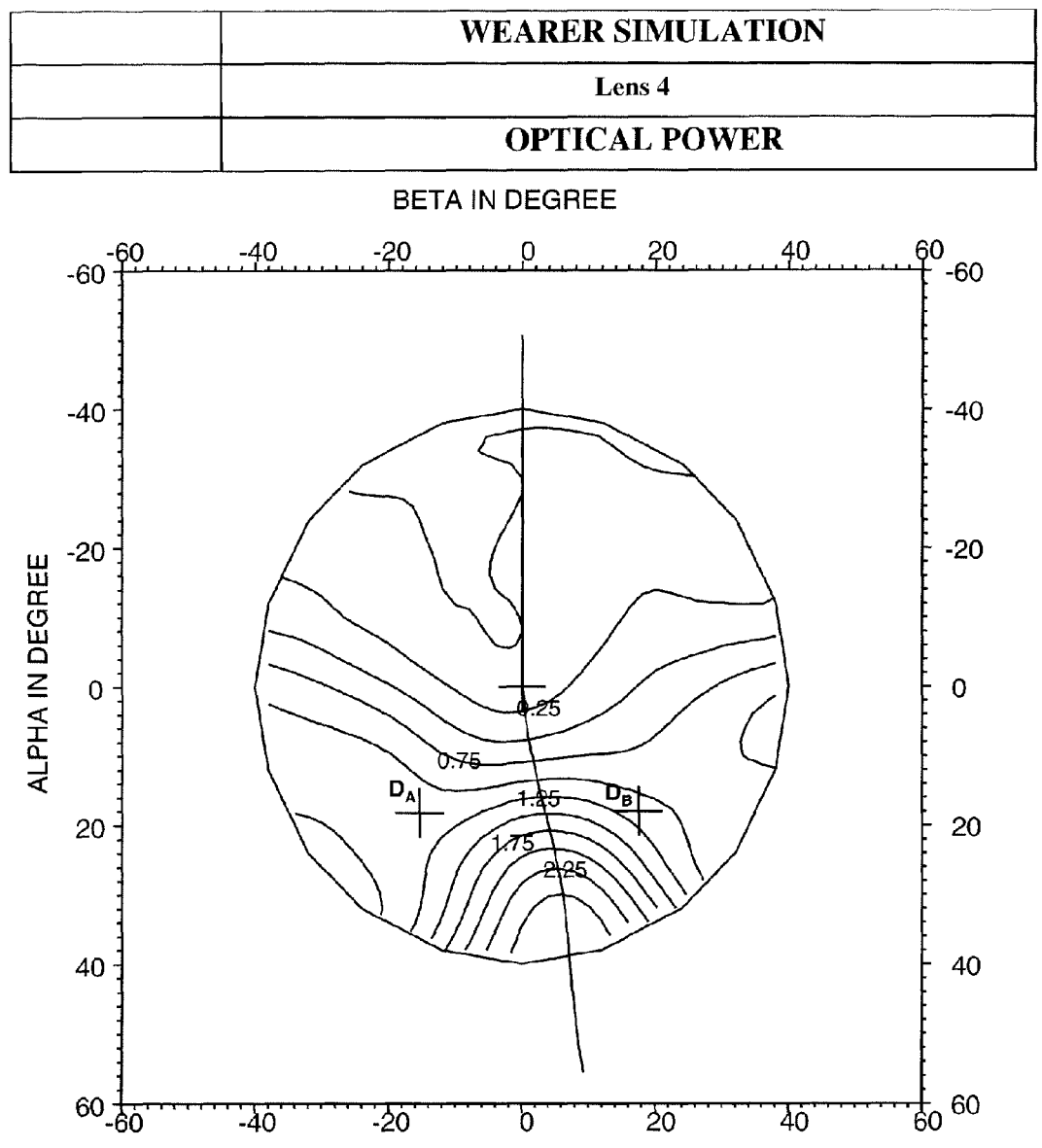
Figure 68:
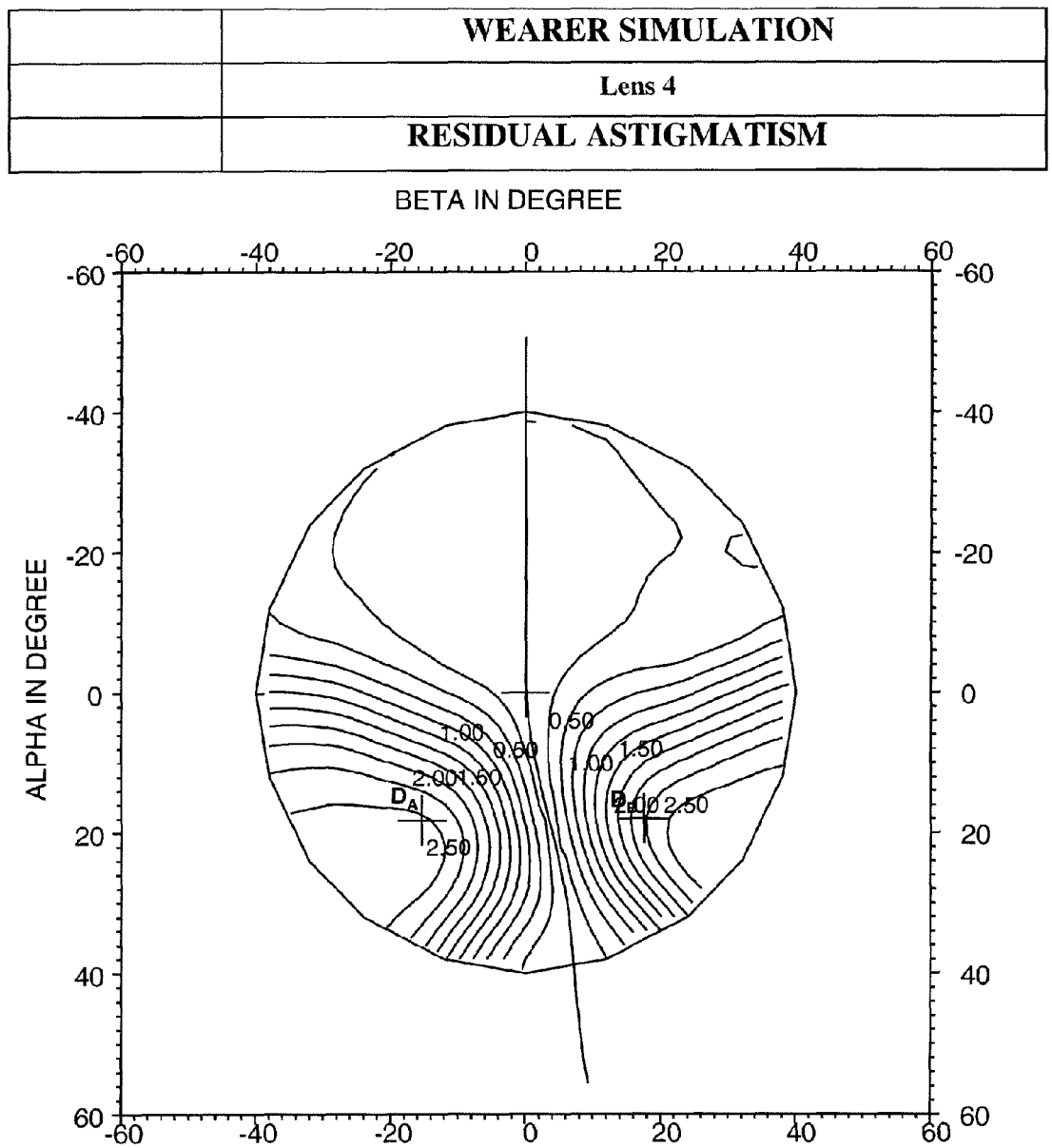

The same evaluation can be done in central vision. FIGS. 67 and 68 give optical performances of LENS4 for central vision.

For direction $D_A$, in central vision, mean power is 1.13 δ, astigmatism is 2.55 δ, axis of the defect astigmatism $\gamma_A$ is 152° and astigmatism defect is 2.55 δ. For direction $D_B$, mean power is 1.12 δ, astigmatism is 2.21 δ, axis of the defect astigmatism $\gamma_B$ is 37° and astigmatism defect is 2.21 δ. This means that the optical performances of LENS3 in $D_A$ and $D_B$ are substantially the same as the optical performances of LENS1 regarding power and astigmatism values.

The distortion in this direction $D_A$ may be indicated by the value of $G_{DA}(\gamma_A+90°)-G_{DA}(\gamma_A)$ which amounts to 0.063119118. Compared to the value of LENS1, there is a reduction of 7.67%. The corresponding value of $G_{DA}(\gamma_A+90°)*G_{DA}(\gamma_A)$ is 1.064612381. Compared to the value of LENS1, there is a reduction of 0.45%. The reduction is higher than for LENS2. The distortion in this direction $D_B$ may be indicated by the value of $G(\gamma_B+90°)-G(\gamma_B)$ which amounts to 0.055665757. Compared to the value of example 1, there is a reduction of 8.28%. The corresponding value of $G_{DB}(\gamma_B+90°)*G_{DB}(\gamma_B)$ is 1.062706521. Compared to the value of LENS1, there is a reduction of 0.45%. The reduction is higher than for LENS2.

Then, the performance of the LENS4 relative to distortion is improved compared to LENS1 while guaranteeing the same sharpness of the image for the wearer. Furthermore, the performance of the LENS4 relative to distortion is improved compared to LENS2 while guaranteeing the same sharpness of the image for the wearer.

EXAMPLE 5

Figure 69:
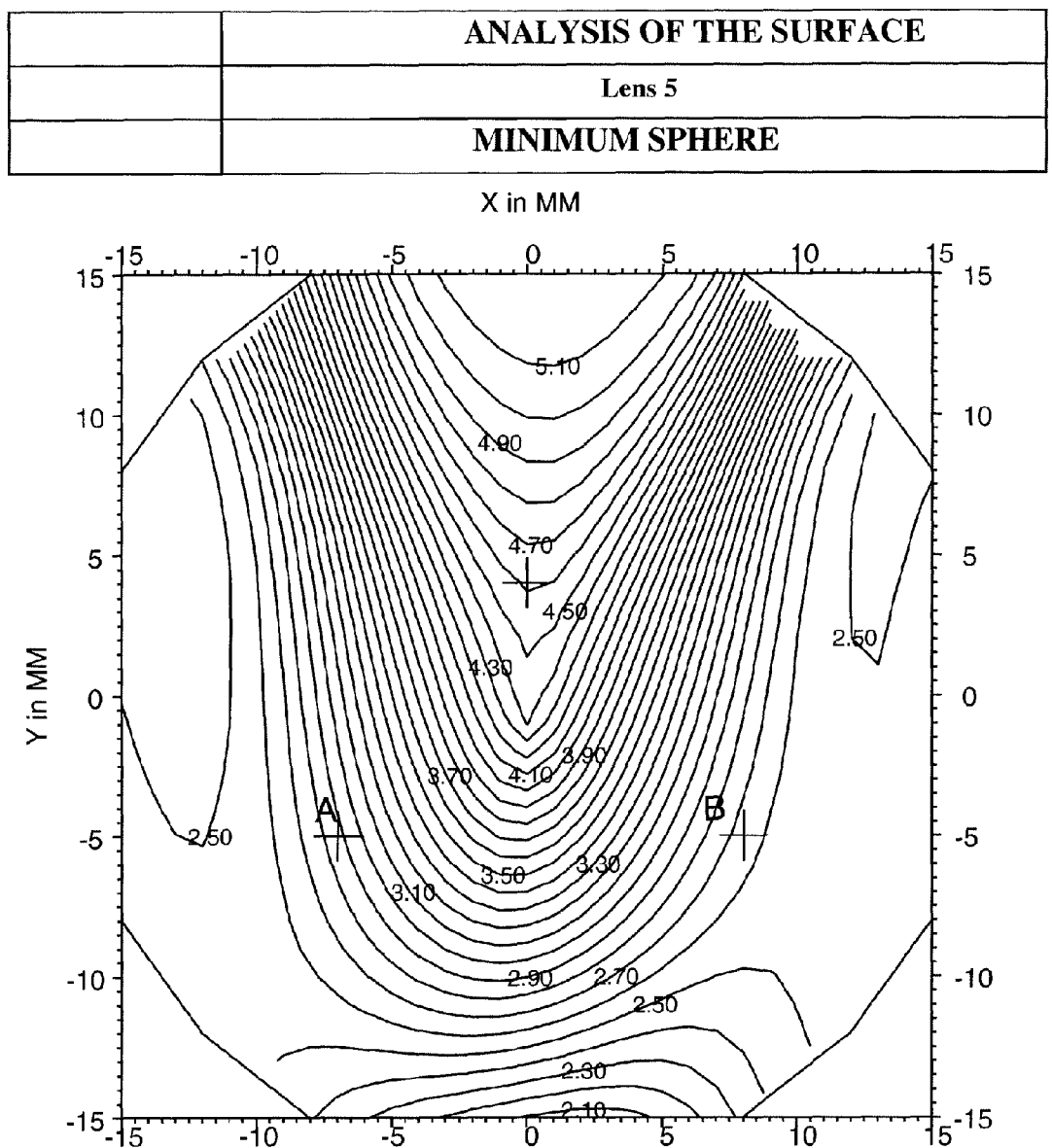
Figure 70:
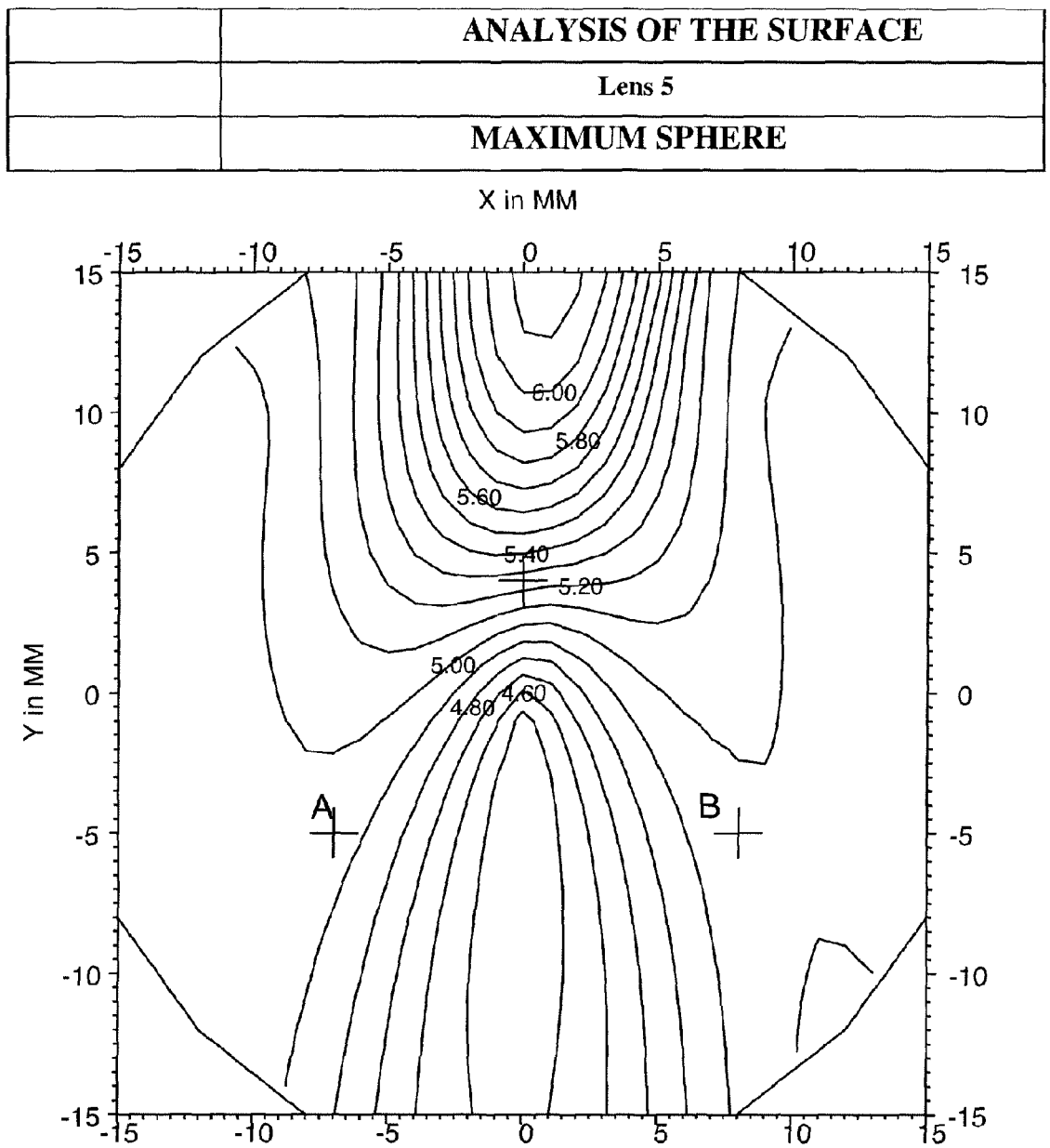
Figure 71:
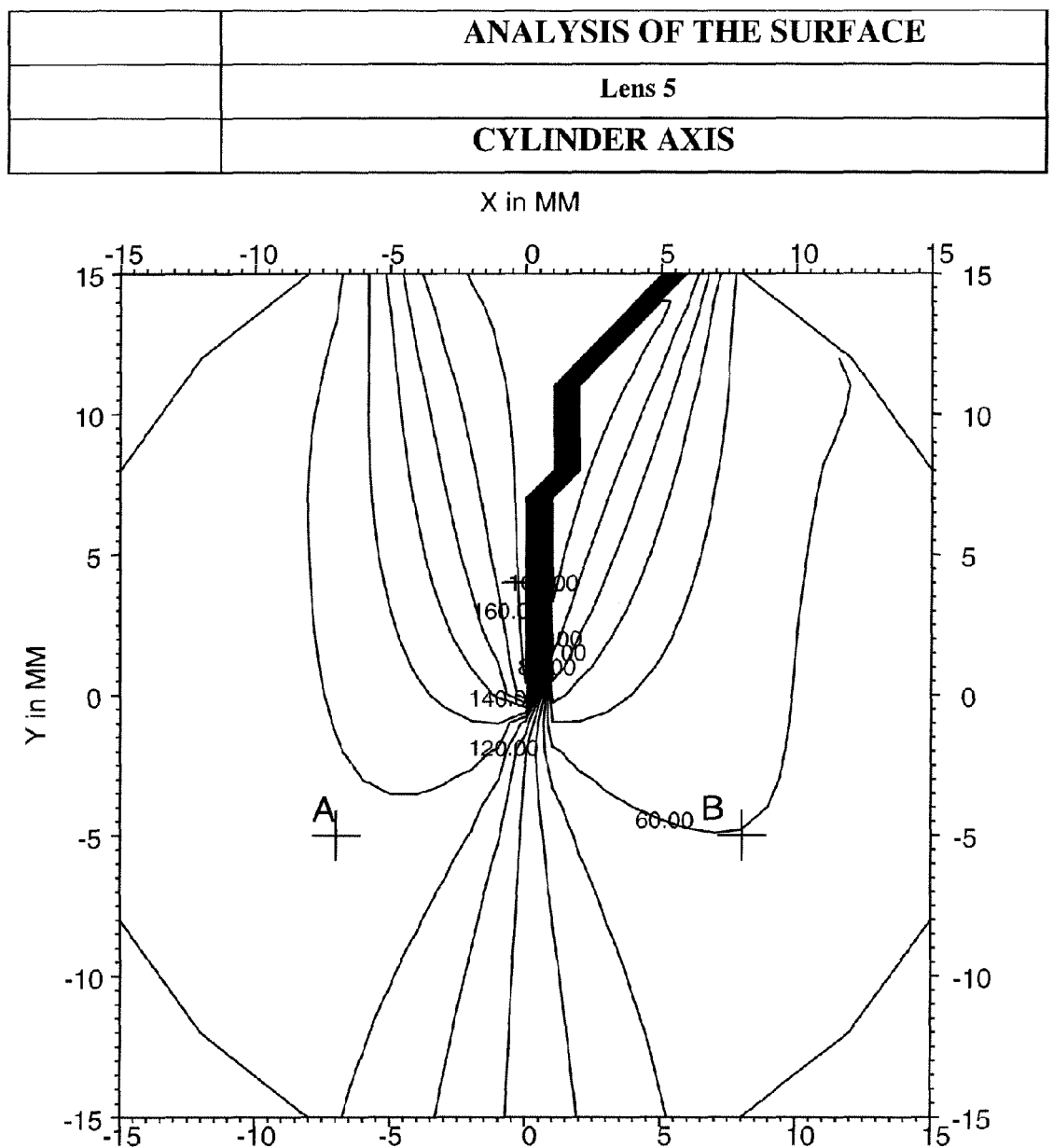

FIGS. 69, 70 and 71 are the surface characteristics of the front surface of LENS5. For point A, the maximum sphere $SPH_{max\_A}$ is equal to 4.95 δ, the minimum sphere $SPH_{min\_A}$ is equal to 2.87 δ and the cylinder axis $\gamma_{AX\_A}=117°$, then the mean sphere value is 3.91 δ. For point B, the maximum sphere $SPH_{max\_B}$ is equal to 4.98 δ, the minimum sphere $SPH_{min\_B}$ is equal to 2.66 δ and the cylinder axis $\gamma_{AX\_B}=60°$, then the mean sphere value is 3.82 δ.

In this example, the cylinder axis of the front surface in the points A and B are not based on the reference axis $\Gamma_1=150°$ and $\Gamma_2=40°$. Furthermore, the mean sphere values in points A and point B respectively are approximately the same as the ones in example 3. In these conditions, distortion should be higher than for LENS5 compared to LENS3.

Figure 72:
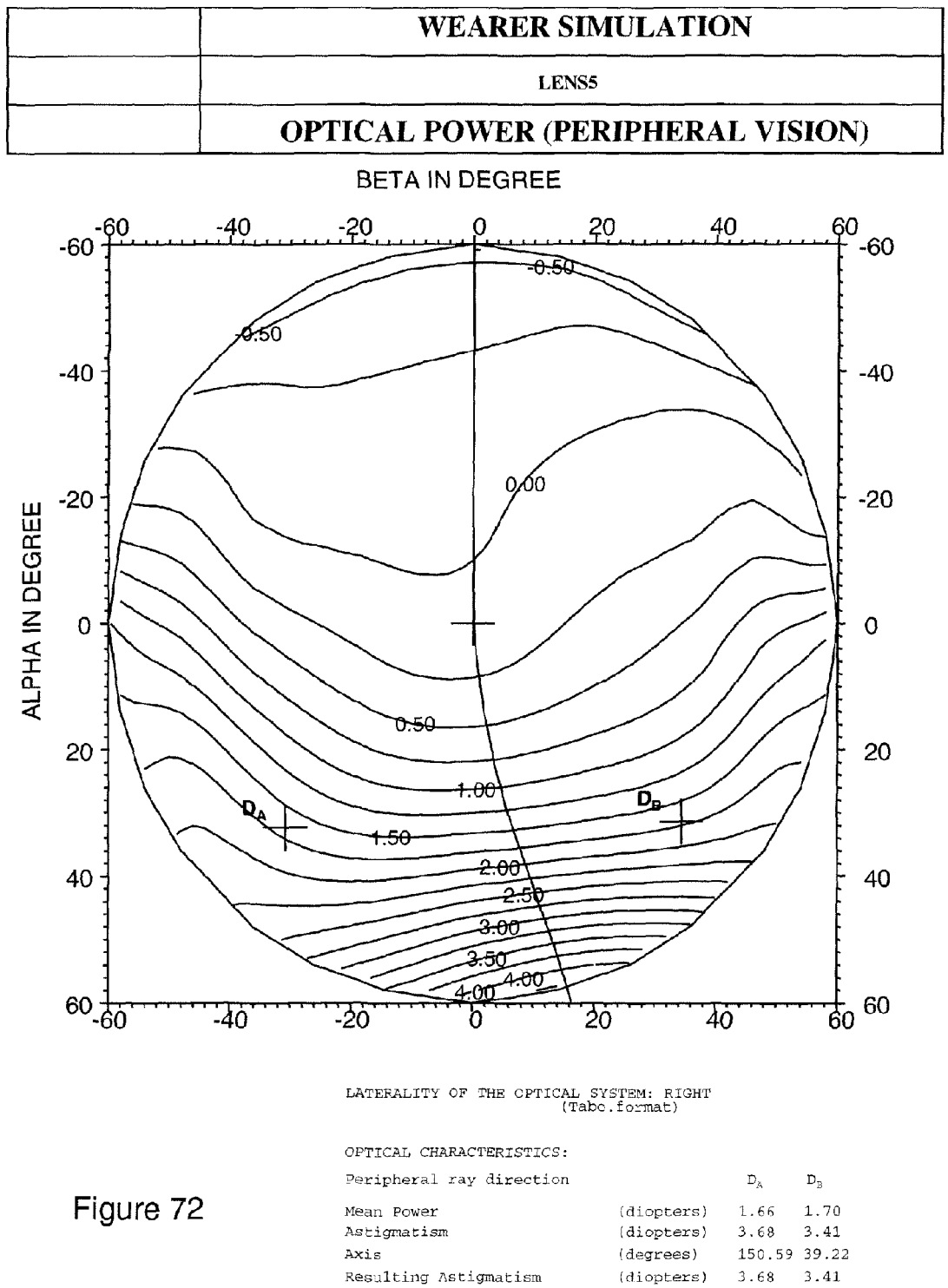
Figure 73:
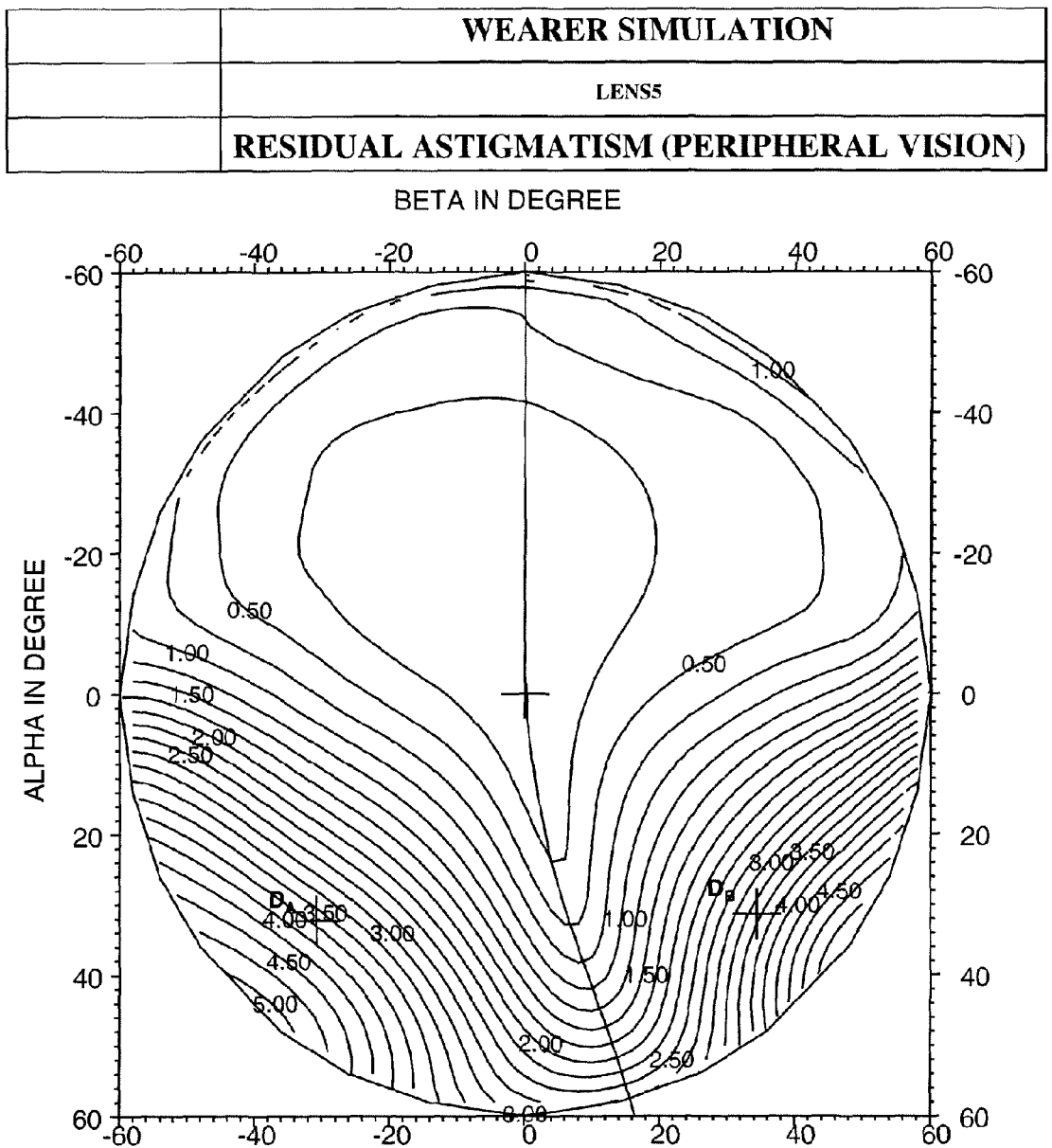

FIGS. 72 and 73 give optical analyses of the peripheral performances of the LENS5. For the sake of comparison, the same two specific directions $D_A$ and $D_B$ are considered. For direction $D_A$, mean power is 1.66 δ, astigmatism is 3.68 δ, axis of the defect astigmatism $\gamma_A$ is 151° and astigmatism defect is 3.68 δ. For direction $D_B$, mean power is 1.70 δ, astigmatism is 3.41 δ, axis of the defect astigmatism $\gamma_B$ is 39° and astigmatism defect is 3.41 δ. The optical performances of the LENS5 in directions $D_A$ and $D_B$ are substantially the same as the performance of the LENS1 regarding peripheral power and astigmatism values.

However, despite these similar performances, the distortion of LENS5 is reduced regarding LENS1. Indeed, the distortion in this direction $D_A$ may be indicated by the value of $G(\gamma_A+90°)-G(\gamma_A)$ which amounts to 0.04976309. Compared to the value of LENS1, there is a reduction of 5%. The corresponding value of $G(\gamma_A+90°*G(\gamma_A)$ is 1.05324847. Compared to the value of LENS1, there is a reduction of 0.3%. The reduction is lower than for the cases of LENS3.

Similarly, the distortion in this direction $D_B$ may be indicated by the value of $G(\gamma_B+90°)-G(\gamma_B)$ which amounts 0.04487357. Compared to the value of example 1, there is a reduction of 7.3%. The corresponding value of $G(\gamma_B+90°)*G(\gamma_B)$ is 1.05298936. Compared to the value of LENS1, there is a reduction of 0.3%. The reduction is lower than for the cases of LENS3.

A global analysis may also be carried out. The global axis γ for the temporal area is 150°. The corresponding value of $G(\gamma+90°)-G(\gamma)$ is 0.034391644 Compared to the value of LENS1, there is a reduction of 0.4%. The corresponding value of $G(\gamma+90°)*G(\gamma)$ is 1.044392747. Compared to the value of LENS1, there is a reduction of 0.12%.

The global axis γ for the nasal area is 40°. The corresponding value of $G(\gamma+90°)-G(\gamma)$ is 0.026054279. Compared to the value of LENS1, there is a reduction of 3.45%. The corresponding value of $G(\gamma+90°)*G(\gamma)$ is 1.042346482. Compared to the value of LENS1, there is a reduction of 0.18%.

Figure 74:
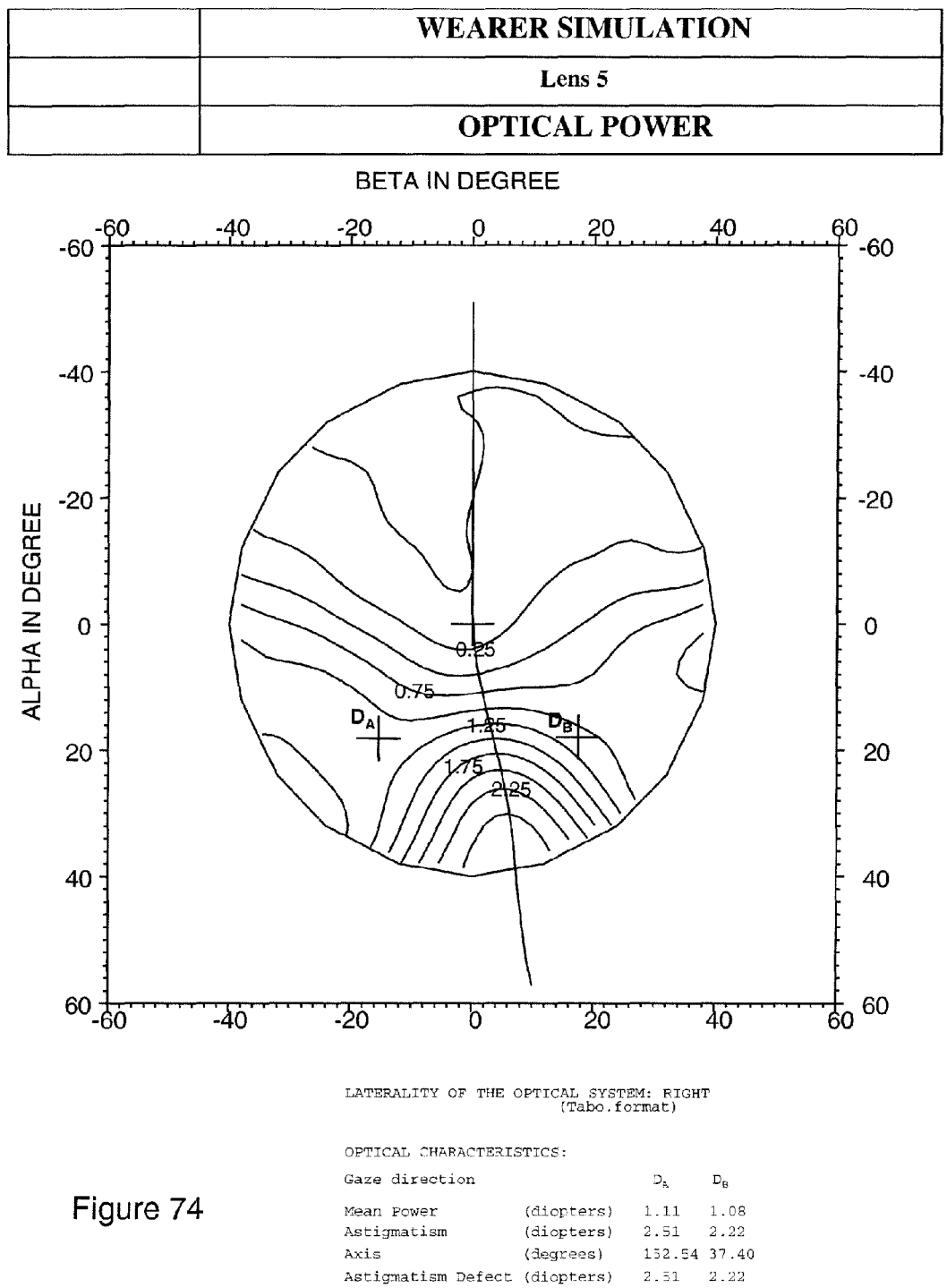
Figure 75:
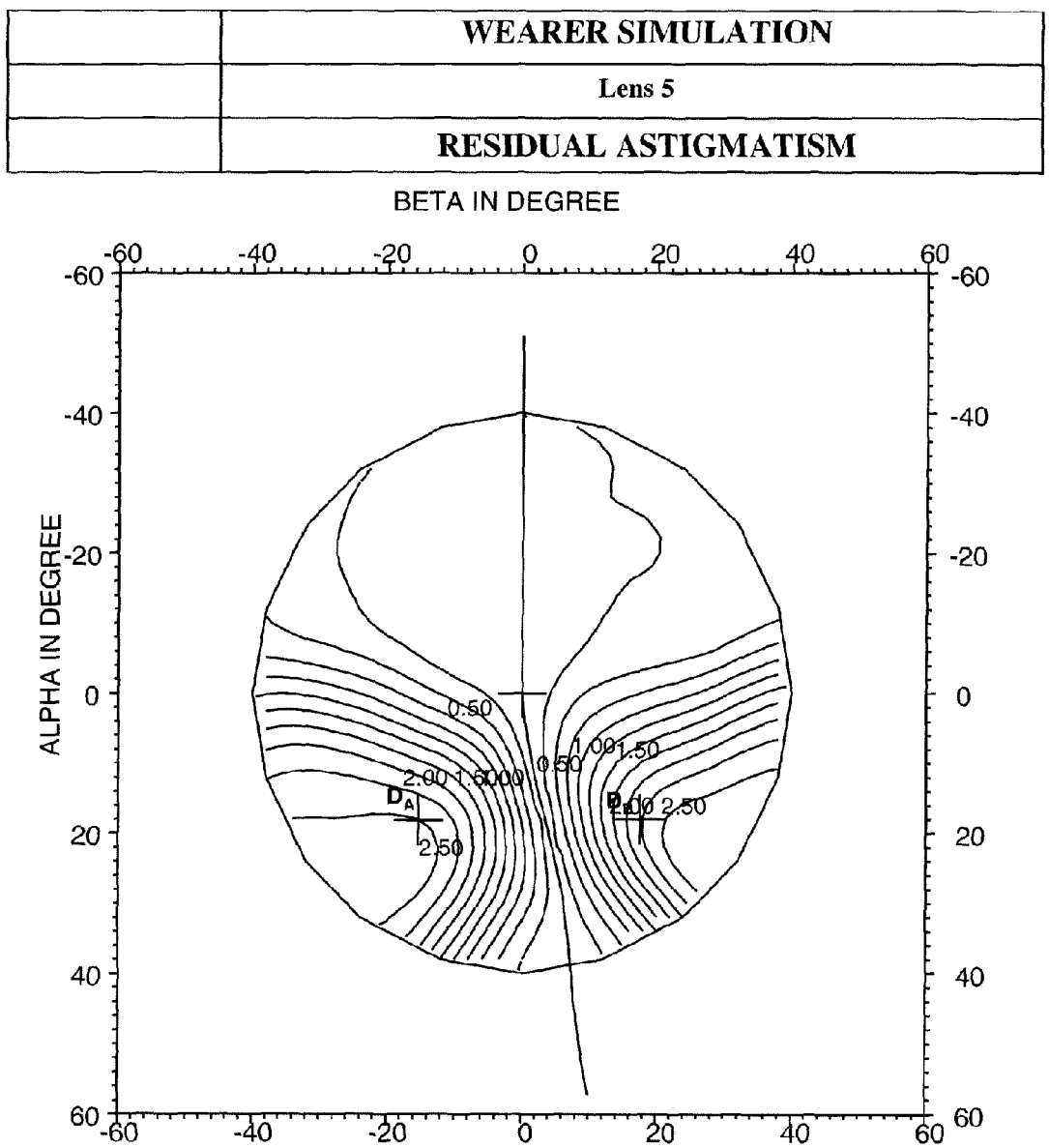
Figure 76:
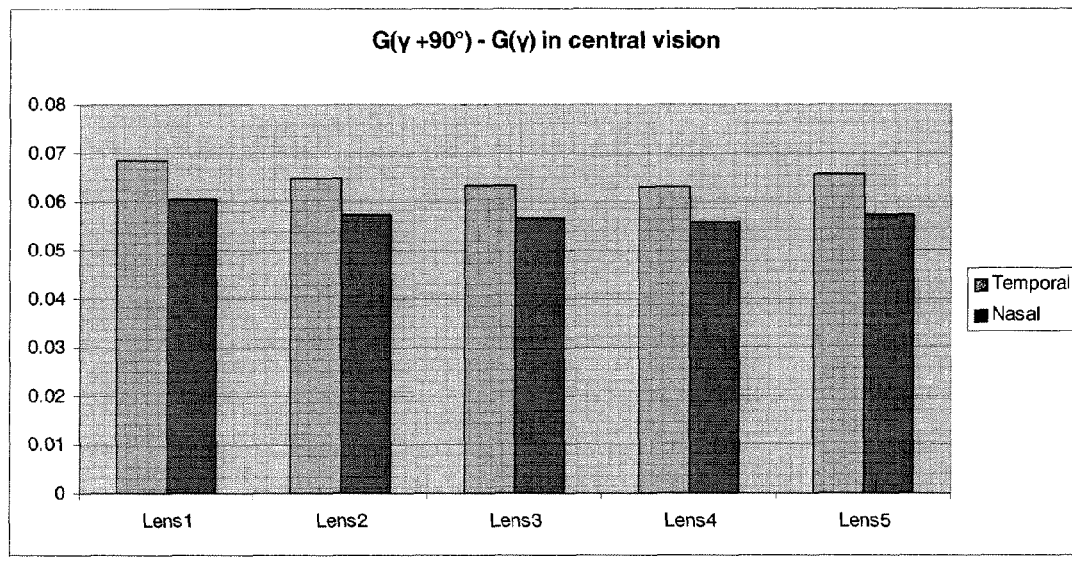
Figure 77:
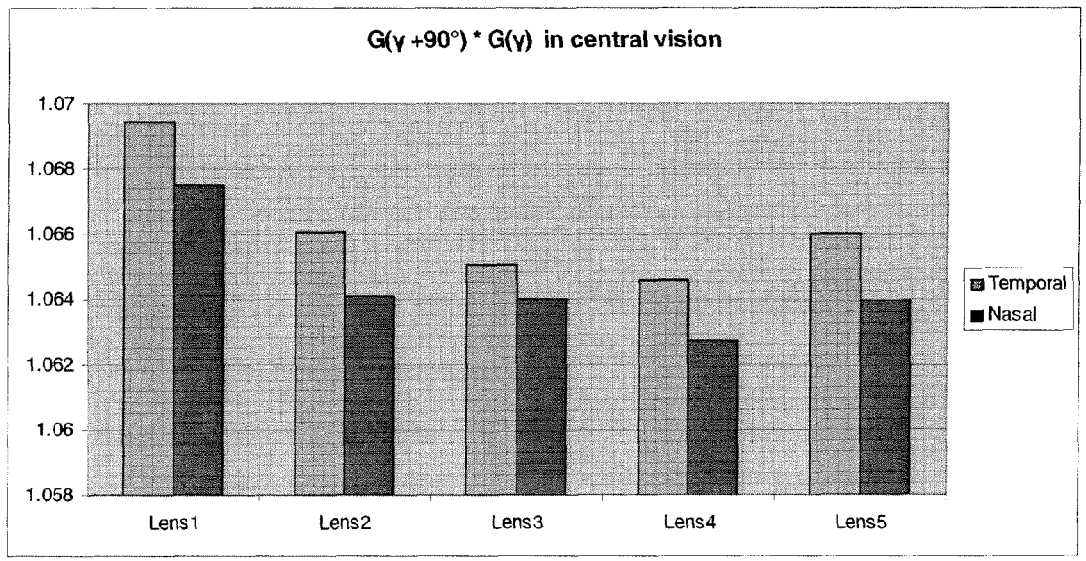
Figure 78:
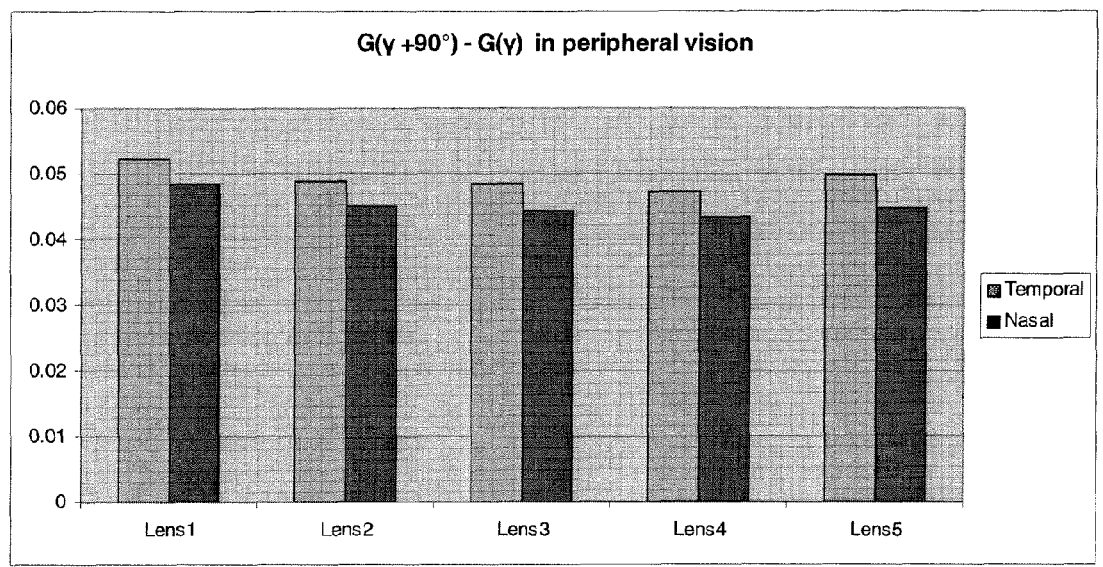
Figure 79:
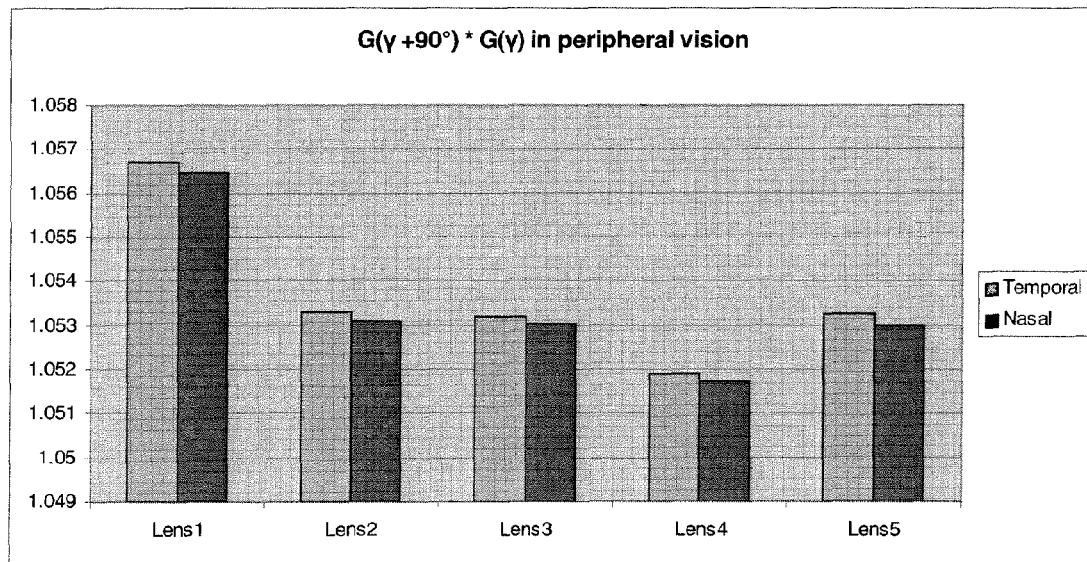

The same evaluation can be done in central vision. FIGS. 74 and 75 give optical performances of LENS4 for central vision.

For direction $D_A$, in central vision, mean power is 1.11 δ, astigmatism is 2.51 δ, axis of the defect astigmatism $\gamma_A$ is 153° and astigmatism defect is 2.51 δ. For direction $D_B$, mean power is 1.08 δ, astigmatism is 2.22 δ, axis of the defect astigmatism $\gamma_B$ is 37° and astigmatism defect is 2.22 δ. This means that the optical performances of LENS5 in $D_A$ and $D_B$ are substantially the same as the optical performances of LENS1 regarding power and astigmatism values in central vision.

The distortion in this direction $D_A$ may be indicated by the value of $G_{DA}(\gamma_A+90°)-G_{DA}(\gamma_A)$ which amounts to 0.065832877. Compared to the value of LENS1, there is a reduction of 3.70%. The corresponding value of $G_{DA}(\gamma_A+90°)*G_{DA}(\gamma_A)$ is 1.065982726. Compared to the value of LENS1, there is a reduction of 0.33%. As expected, the reduction is lower than for LENS3.

The distortion in this direction $D_B$ may be indicated by the value of $G(\gamma_B+90°)-G(\gamma_B)$ which amounts to 0.057219922. Compared to the value of LENS1, there is a reduction of 5.71%. The corresponding value of $G_{DB}(\gamma_B+90°)*G_{DB}(\gamma_B)$ is 1.063976669. Compared to the value of LENS1, there is a reduction of 0.33%. As expected, the reduction is lower than for LENS3.

Then, the performance of the LENS5 relative to distortion is improved compared to LENS1 while guaranteeing the same sharpness of the image for the wearer. Furthermore, the performance of the LENS3 relative to distortion is improved compared to LENS5 while guaranteeing the same sharpness of the image for the wearer.

In FIGS. 76, 77, 78 and 79 are shown $G_{DA}(\gamma_A+90°)-G_{DA}(\gamma_A)$ and $G_{DA}(\gamma_A+90°)*G_{DA}(\gamma_A)$ for temporal direction $D_A$, $G(\gamma_B+90°)-G(\gamma_B)$ and $G_{DB}(\gamma_B+90°)*G_{DB}(\gamma_B)$ for nasal direction $D_B$, for LENS1, LENS2, LENS3, LENS4 and LENS5 , in central vision and in peripheral vision. One can see that distortion is improved for LENS2, LENS3, LENS4 and LENS5 compared to LENS1. Furthermore distortion is improved for LENS4 compared to LENS2. Distortion is also improved for LENS3 compared to LENS5.

EXAMPLE 6

Prior Art

Example 6 corresponds to a lens LENS6 according to prior art. In this case, the power prescription is 0.0 δ and the addition is 2.5 δ. For this example 6, the astigmatism prescribed for the wearer is 2.00 δ, with an axis of 45°.

The front surface of LENS6 is the same as the front surface of LENS1. As for the example 1, FIGS. 41, 42 and 43 are the surface characteristics of the front surface of LENS6. For the sake of comparison, the same points A and B are considered. For point A, the maximum sphere $SPH_{max\_A}$ is equal to 6.90 δ, the minimum sphere $SPH_{min\_A}$ is equal to 4.80 δ and the cylinder axis $\gamma_{AX\_A}=64°$. For point B, the maximum sphere $SPH_{max\_B}$ is equal to 6.90 δ, the minimum sphere $SPH_{min\_B}$ is equal to 4.65 δ and the cylinder axis $\gamma_{AX\_B}=126°$.

Figure 80:
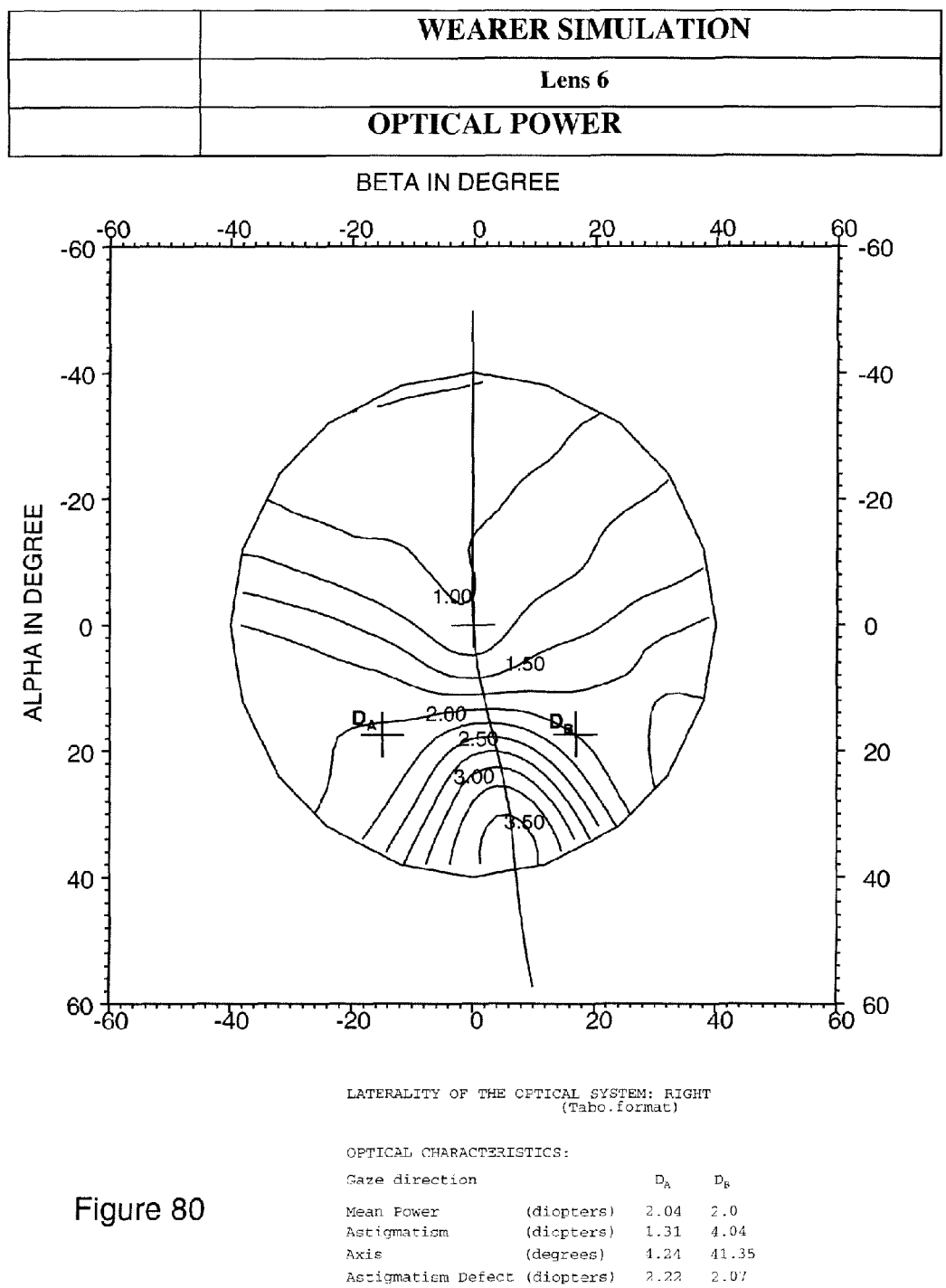
Figure 81:
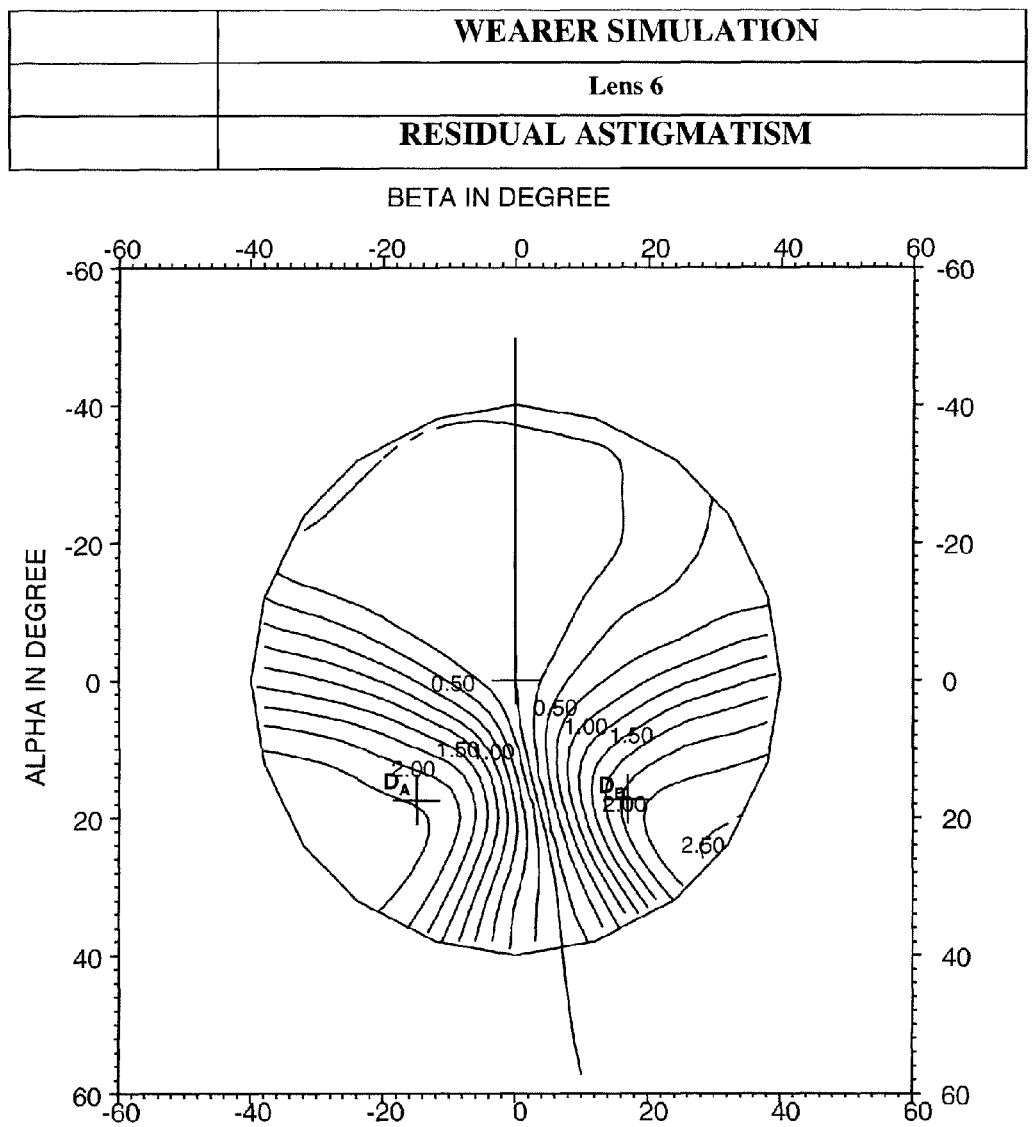
Figure 82:
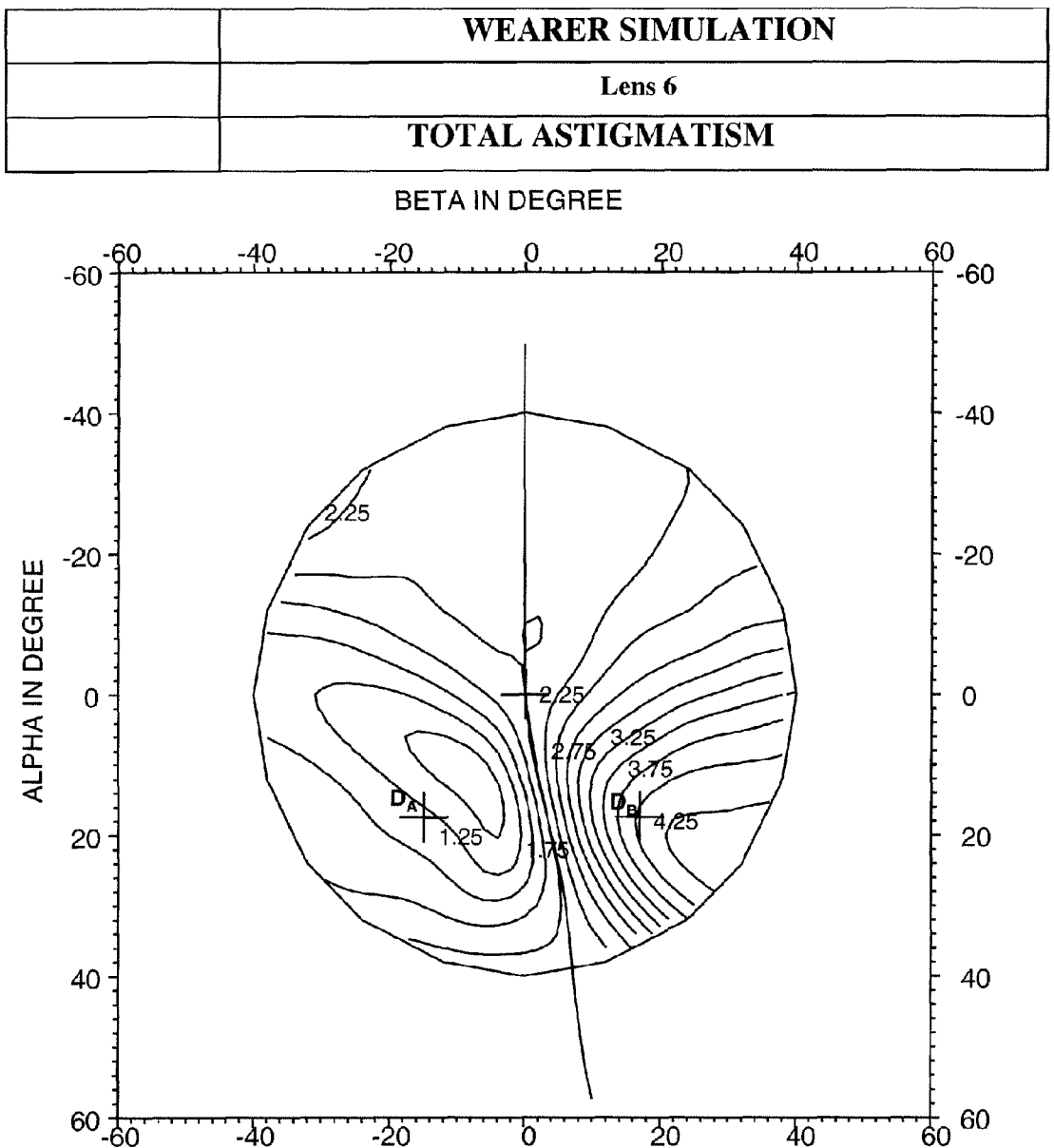

FIGS. 80, 81 and 82 give optical analyses of the performances of the LENS6. For the sake of comparison, the same directions $D_A$ and $D_B$ of example 1 are considered.

For direction $D_A$, mean power is 2.04 δ, astigmatism is 1.31δ, axis of the defect astigmatism $\gamma_A$ is 4° and astigmatism defect is 2.22 δ. In addition, the distortion in this direction $D_A$ may be indicated by the value of $G(\gamma_A+90°)-G(\gamma_A)$ which amounts to 0.041523015. The corresponding value of $G(\gamma_A+90°)*G(\gamma_A)$ is 1.125915769.

For direction $D_B$, mean power is 2.00 δ, astigmatism is 4.04 δ, axis of the defect astigmatism $\gamma_B$ is 41° and astigmatism defect is 2.07 δ. In addition, the distortion in this direction $D_B$ may be indicated by the value of $G(\gamma_B+90°)-G(\gamma_B)$ which amounts to 0.11919188. The corresponding value of $G(\gamma_B+90°)*G(\gamma_B)$ is 1.127009929

These different characterizations will enable a comparison with LENS7 and LENS8 whose characteristics are developed in examples 7 and 8. These two examples are lenses according to the invention made for the same prescription of the one of LENS6. Thus, for this prescription, reference axes determined at step 16 of the method are $\Gamma_1=5°$ in Portion 1 (Temporal_Area) and $\Gamma_2=40°$ in Portion2 (Nasal Area), Portion 1 and Portion 2 of the front surface being determined from optical Portion1 and Portion 2 defined in the example 1.

The first step of the method (step 10 in FIG. 18) is to define a target optical function. The predetermined target optical function is the same for LENS6, LENS7 and LENS8.

EXAMPLE 7

The front surface of LENS7 is the same as the front surface of LENS2. As for the example 2, FIGS. 48, 49 and

50 are the surface characteristics of the front surface of LENS7. For point A, the maximum sphere $SPH_{max\_A}$ is equal to 4.88 δ, the minimum sphere $SPH_{min\_A}$ is equal to 3.00 δ and the cylinder axis $\gamma_{AX\_A}$=153°, then the mean sphere value is 3.94 δ. For point B, the maximum sphere $SPH_{max\_B}$ is equal to 4.72 δ, the minimum sphere $SPH_{min\_B}$ is equal to 3.05 δ and the cylinder axis $\gamma_{AX\_B}$=37°, then the mean sphere value is 3.89 δ.

Figure 83:
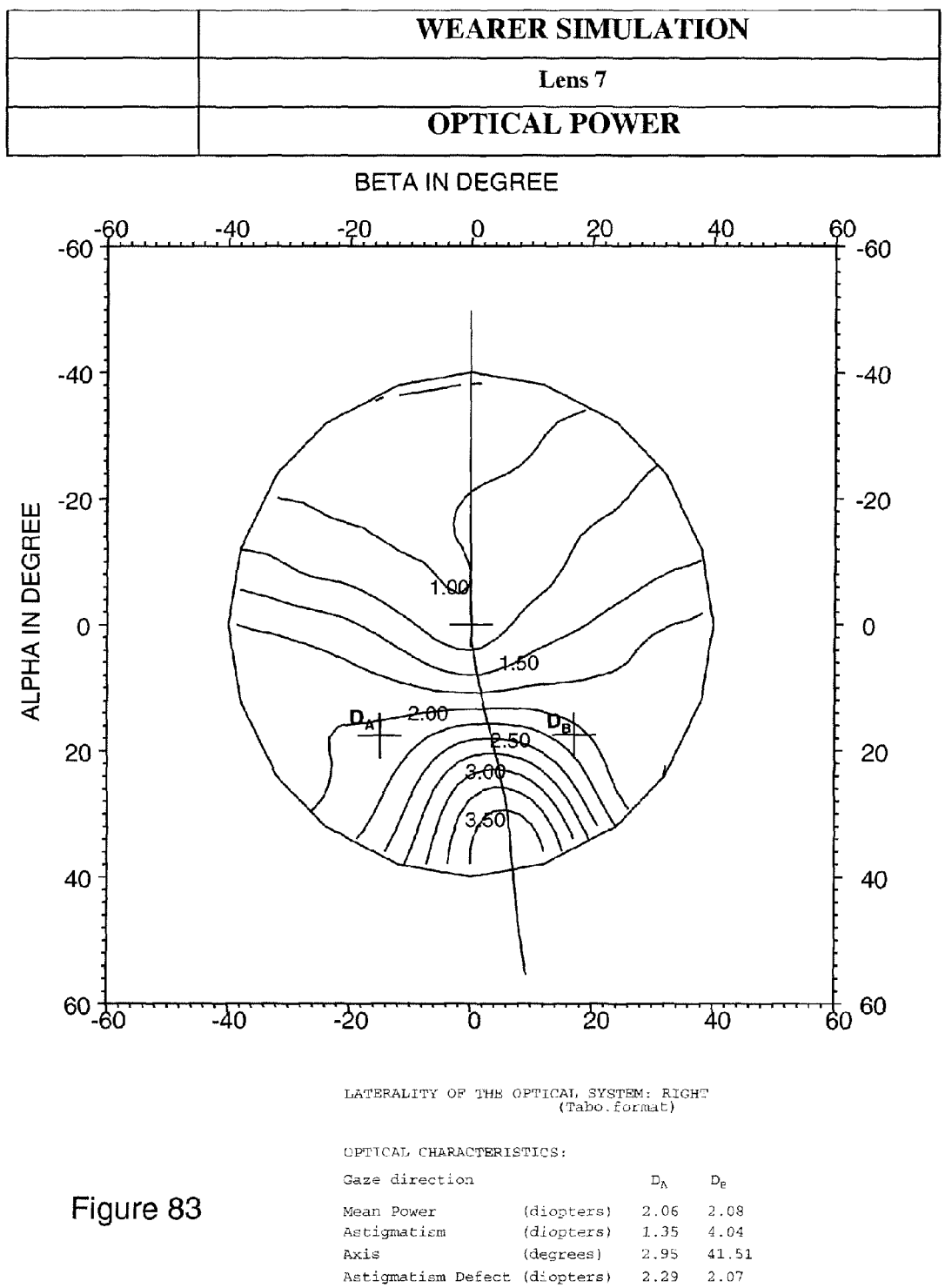
Figure 84:
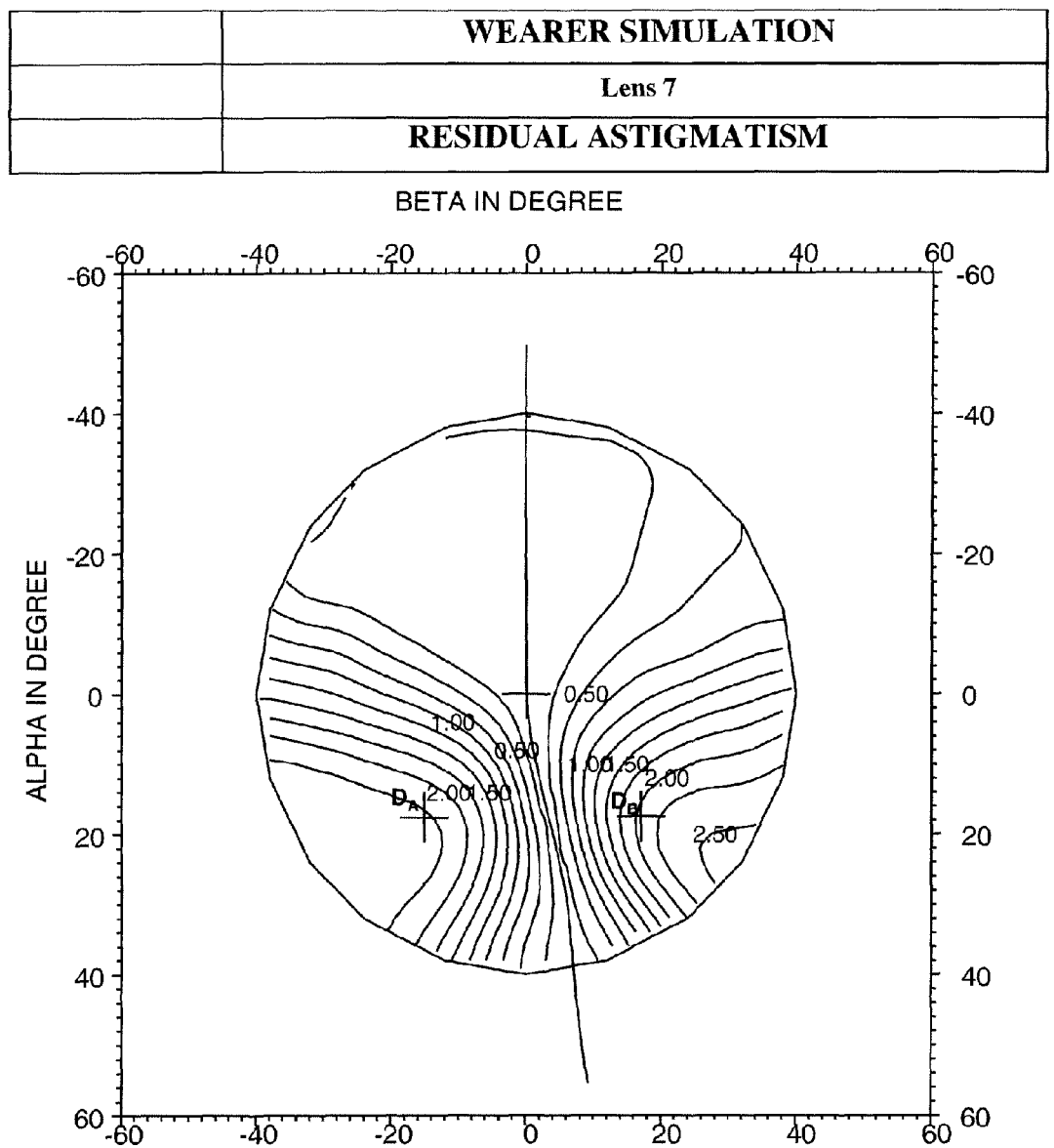
Figure 85:
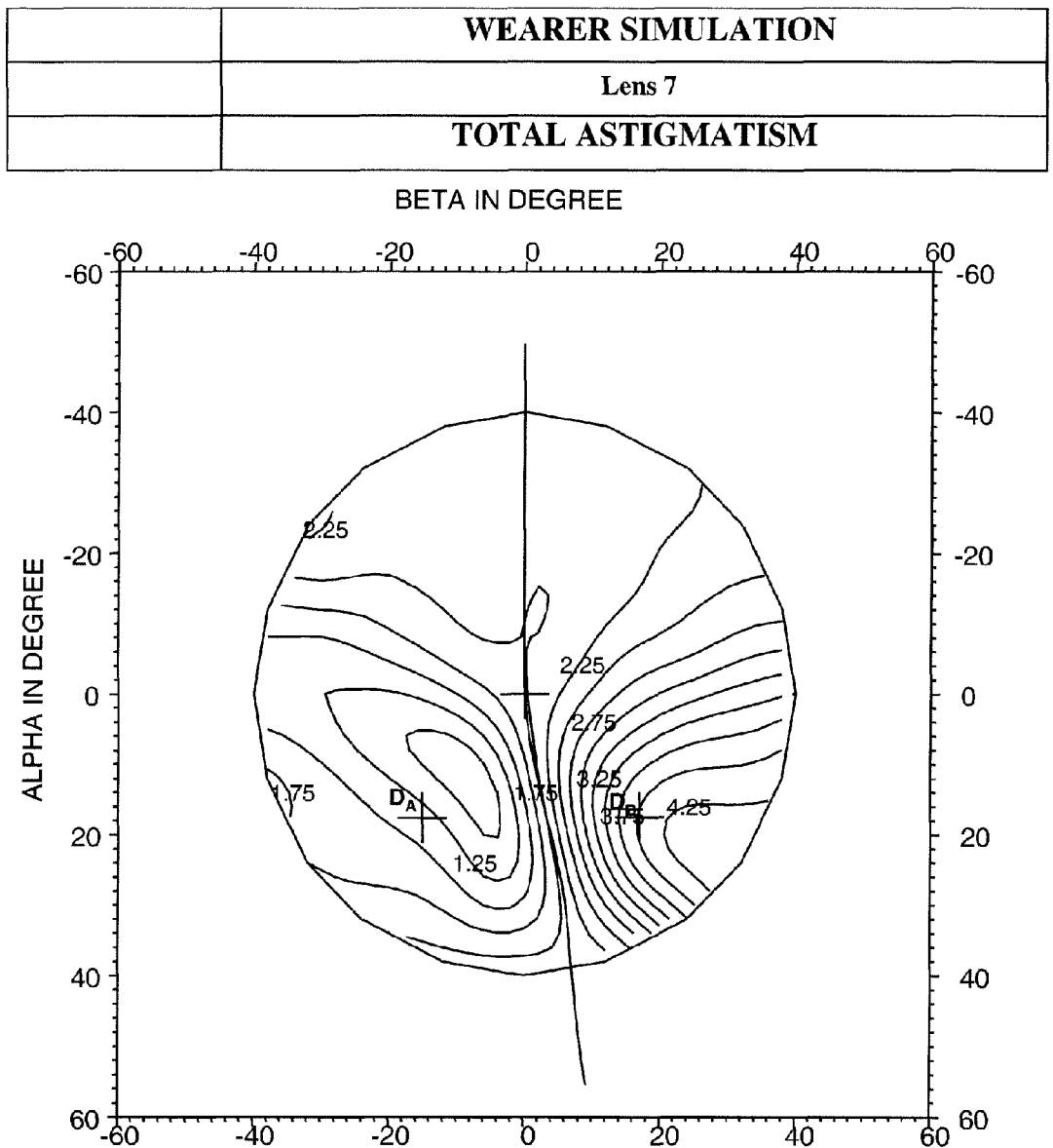

FIGS. 83, 84 and 85 give optical analyses of the performances of the LENS7 in central vision. For the sake of comparison, the same two specific directions $D_A$ and $D_B$ are considered. For direction $D_A$, mean power is 2.06 δ, astigmatism is 1.35 δ, axis of the defect astigmatism $\gamma_A$ is 3° and astigmatism defect is 2.29 δ. For direction $D_B$, mean power is 2.08 δ, astigmatism is 4.04 δ, axis of the defect astigmatism $\gamma_B$ is 41° and astigmatism defect is 2.07 δ. The optical performances of LENS7 in $D_A$ and $D_B$ are substantially the same as the optical performances of LENS6 regarding power and astigmatism values in central vision.

However, despite these similar performances, the distortion of LENS7 is reduced compared to LENS6. Indeed, the distortion in this direction $D_A$ may be indicated by the value of $G(\gamma_A+90°)-G(\gamma_A)$ which amounts to 0.039313407. Compared to the value of example 6, there is a reduction of 5.32%. The corresponding value of $G(\gamma_A+90°)*G(\gamma_A)$ is 1.122294486. Compared to the value of LENS6, there is a reduction of 0.32%.

Similarly, the distortion in this direction $D_B$ may be indicated by the value of $G(\gamma_B+90°)-G(\gamma_B)$ which amounts to 0.115520465. Compared to the value of example 6, there is a reduction of 3.08%. The corresponding value of $G(\gamma_B+90°)*G(\gamma_B)$ is 1.123422866 Compared to the value of LENS6, there is a reduction of 0.32%

Then, the performance of LENS7 relative to distortion is improved compared to LENS6 while guaranteeing the same sharpness of the image for the wearer.

EXAMPLE 8

Figure 86:
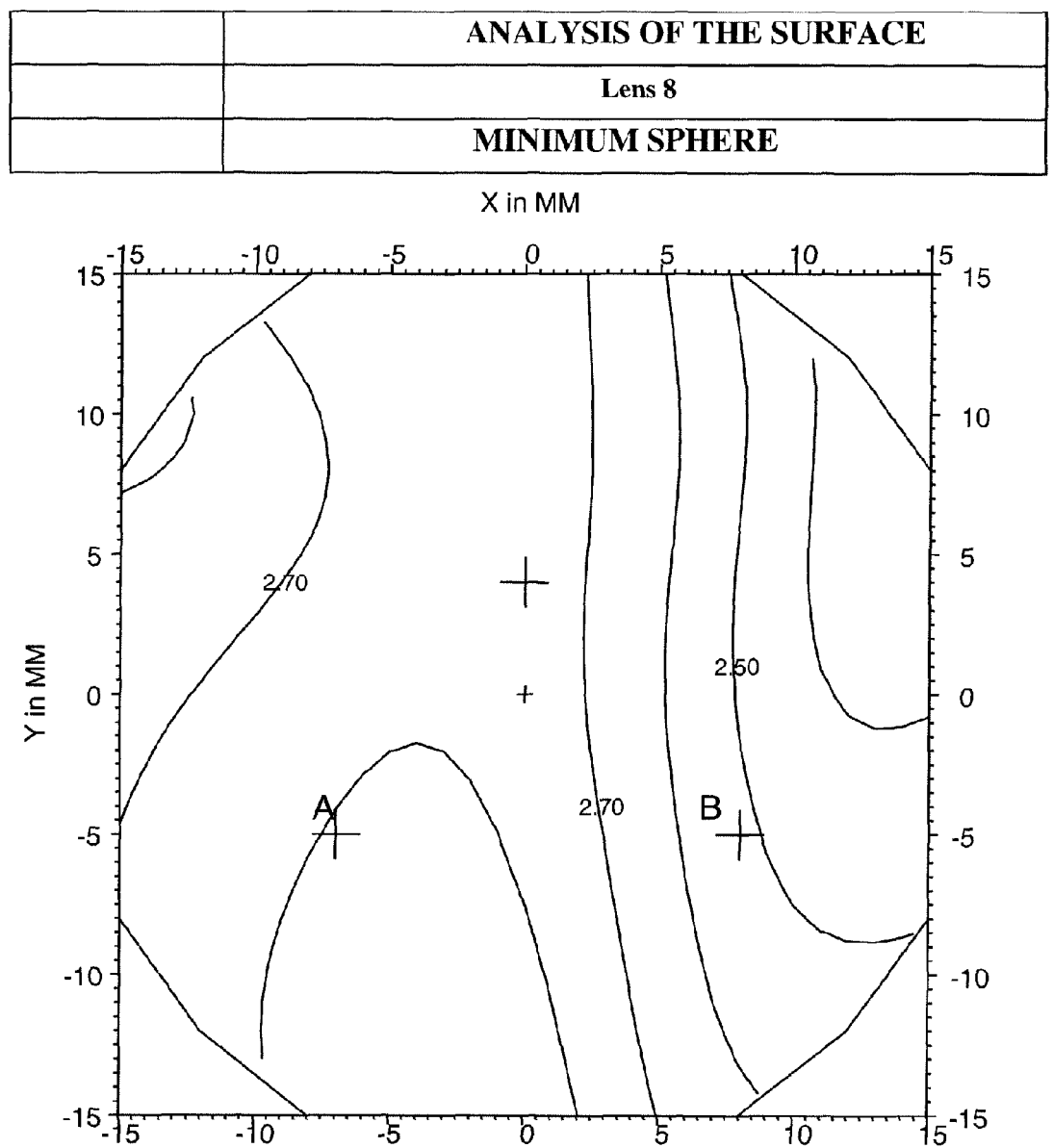
Figure 87:
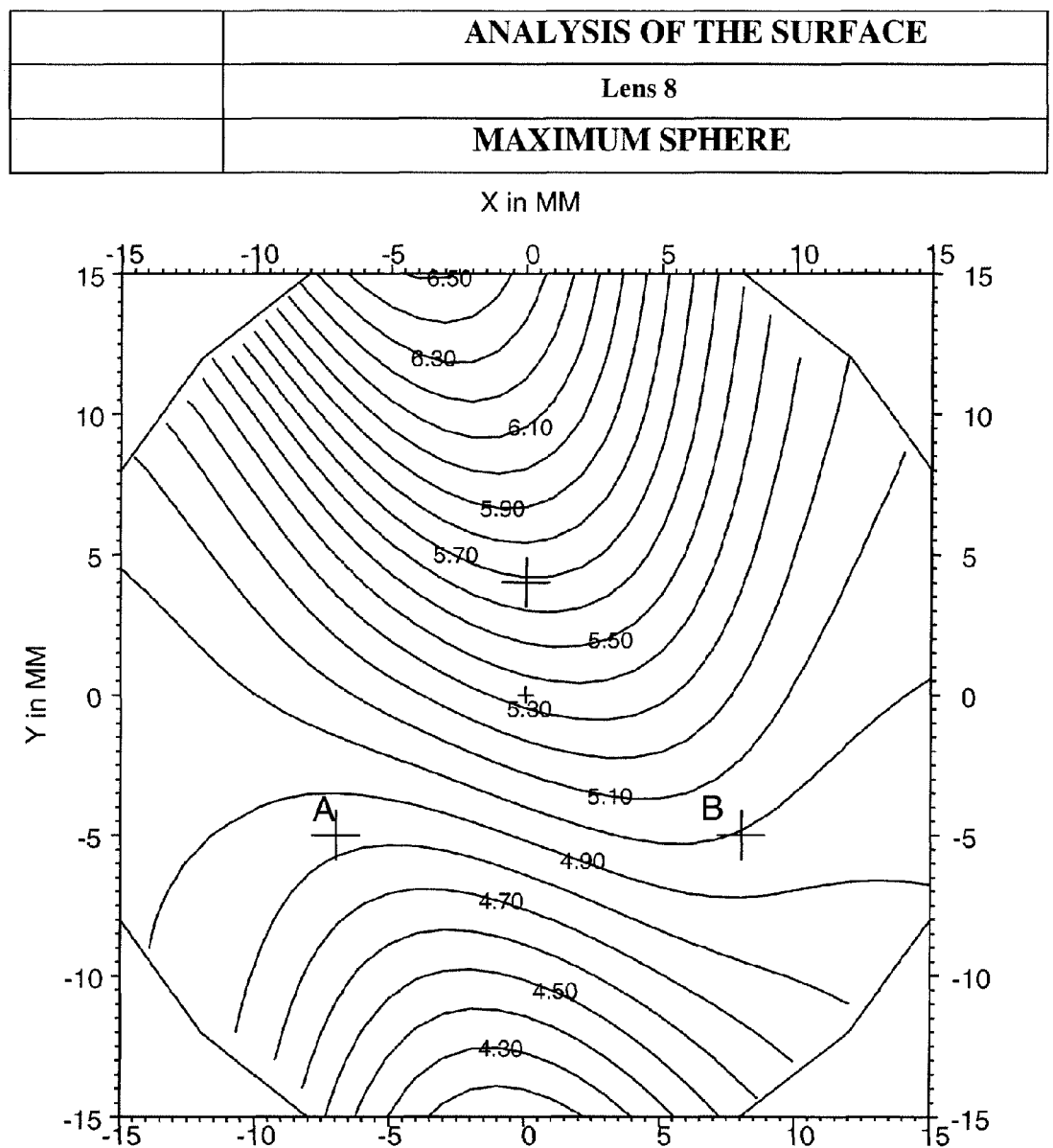
Figure 88:
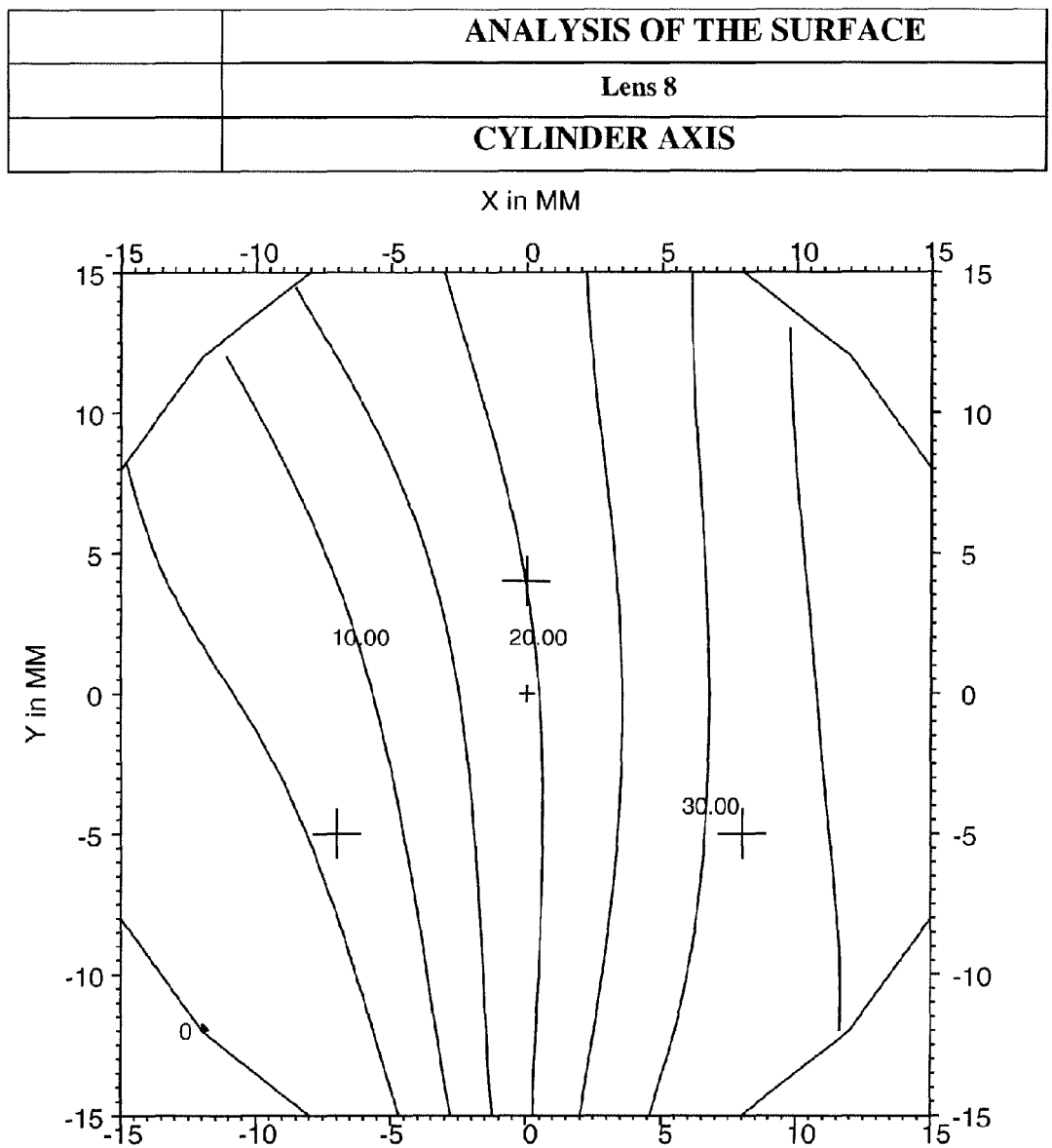

FIGS. 86, 87 and 88 are the surface characteristics of the front surface of LENS8. For point A, the maximum sphere $SPH_{max\_A}$ is equal to 4.84 δ, the minimum sphere $SPH_{min\_A}$ is equal to 2.81 δ and the cylinder axis $\gamma_{AX\_A}$=6°, then the mean sphere value in point A is 2.82 δ. For point B, the maximum sphere $SPH_{max\_B}$ is equal to 5.00 δ, the minimum sphere $SPH_{min\_B}$ is equal to 2.53 δ and the cylinder axis $\gamma_{AX\_B}$=32°. The mean sphere value in point B is 3.76 δ.

Mean sphere values in points A and B for LENS8 are approximately the same as the ones of LENS7. Cylinder axis in point A, $\gamma_{AX\_A}$ is approximately the value of the reference axis $\Gamma_1$ defined earlier. Furthermore, cylinder axis $\gamma_{AX\_B}$ is approximately the value of the reference axis $\Gamma_2$ defined above. So LENS8 should improve distortion compared to LENS7, since cylinder axes of the front surface of LENS7 are not based on the reference axis $\Gamma_1$ and $\Gamma_2$.

Figure 89:
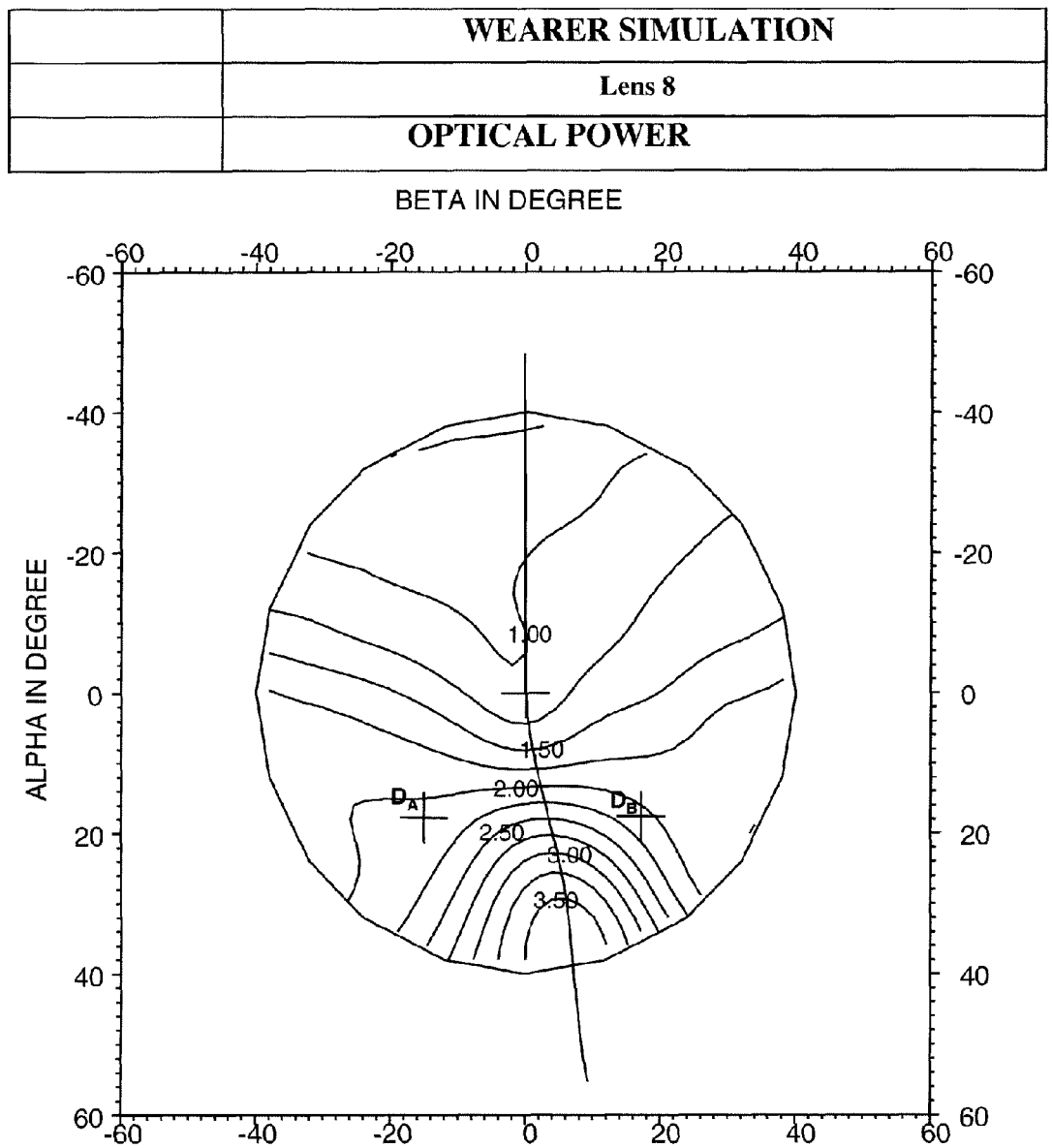
Figure 90:
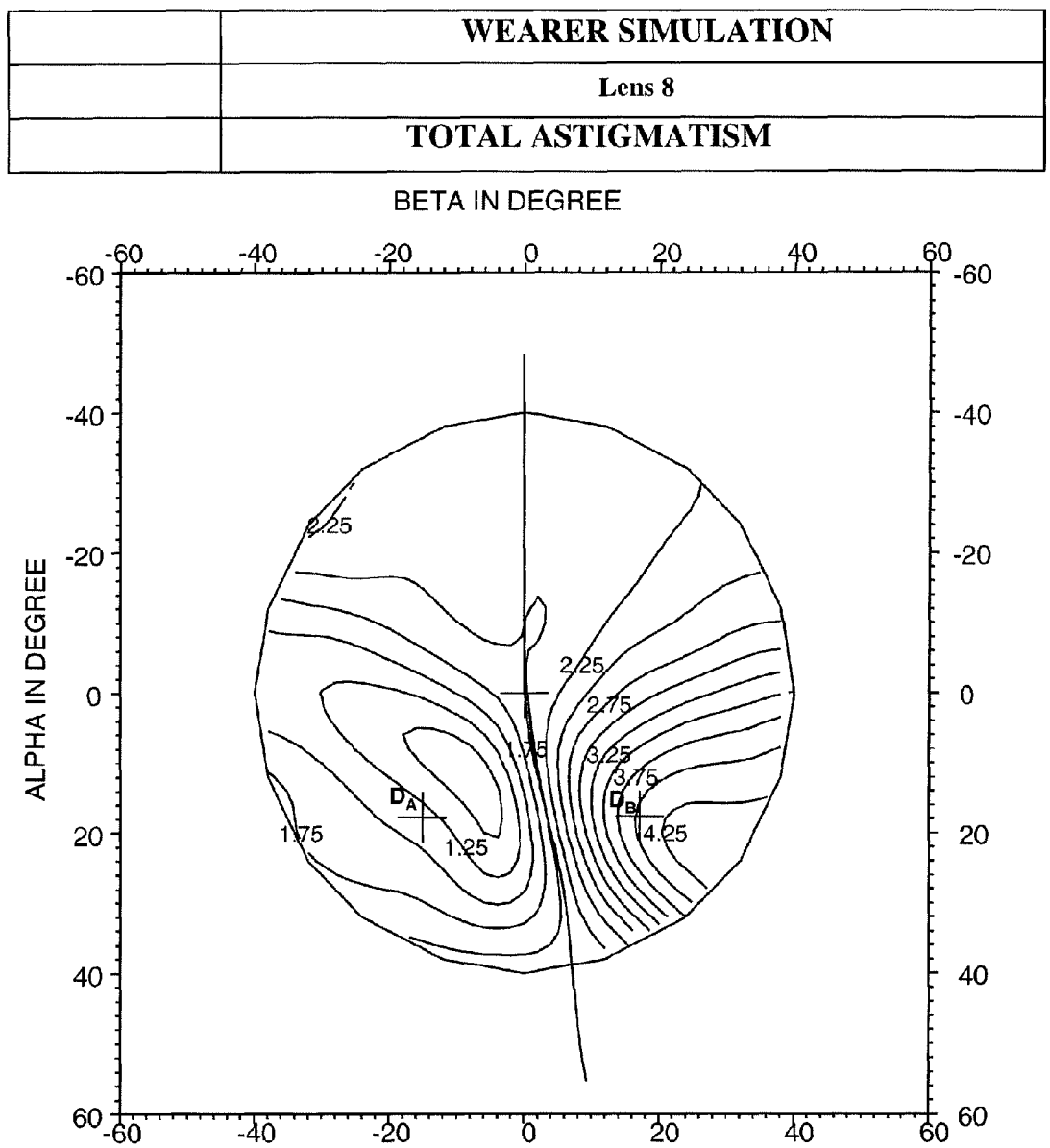

FIGS. 89 and 90 give optical analyses of the performances of the LENS8.

For direction $D_A$, mean power is 2.06 δ, astigmatism is 1.34δ, axis of the defect astigmatism $\gamma_A$ is 3° and astigmatism defect is 2.28 δ. For direction $D_B$, mean power is 2.07 δ, astigmatism is 4.05 δ, axis of the defect astigmatism $\gamma_B$ is 41° and astigmatism defect is 2.08 δ. The optical performances of LENS8 in $D_A$ and $D_B$ are substantially the same as the optical performances of LENS6 regarding power and astigmatism values in central vision.

However, despite these similar performances, the distortion of LENS8 is reduced regarding LENS6 and LENS7. Indeed, the distortion in this direction $D_A$ may be indicated by the value of $G(\gamma_A+90°)-G(\gamma_A)$ which amounts to 0.038391923. Compared to the value of example 6, there is a reduction of 7.54%. Compared to the value of LENS7, this is a reduction of 2.34%. The corresponding value of $G(\gamma_A+90°)*G(\gamma_A)$ is 1.121236736. Compared to the value of LENS6, there is a reduction of 0.42%. As expected, the reduction is 0.44% compared to LENS7.

Similarly, the distortion in this direction $D_B$ may be indicated by the value of $G(\gamma_B+90°)-G(\gamma_B)$ which amounts to 0.115015136. Compared to the value of example 6, there is a reduction of 3.50%. Compared to the value of LENS7, this is a reduction of 0.09%. The corresponding value of $G(\gamma_B+90°)*G(\gamma_B)$ is 1.123319183 Compared to the value of LENS6, there is a reduction of 0.33% Compared to the value of LENS7, this is a reduction of 0.01%.

Figure 91:
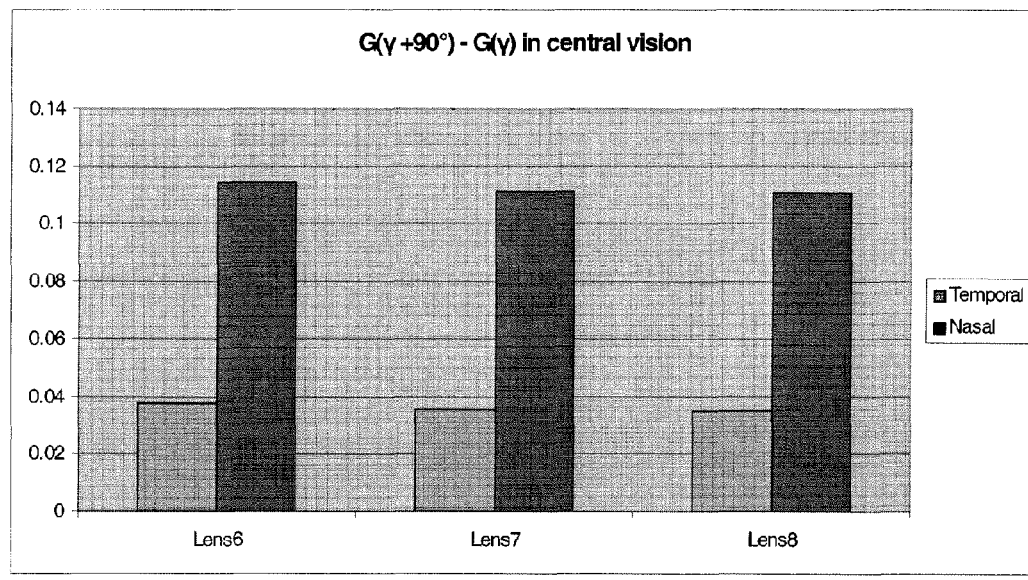
Figure 92:
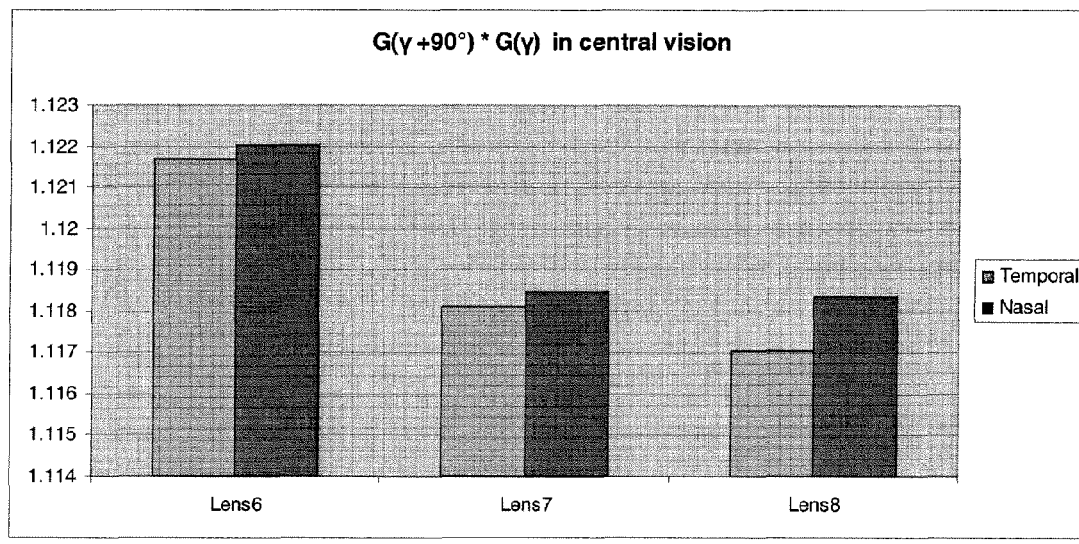

Then, the performance of the LENS8 relative to distortion is improved compared to LENS6 while guaranteeing the same sharpness of the image for the wearer. Furthermore, the performance of the LENS8 relative to distortion is improved compared to LENS7 while guaranteeing the same sharpness of the image for the wearer FIGS. 91 and 92 give $G_{DA}(\gamma_A+90°)-G_{DA}(\gamma_A)$ and $G_{DA}(\gamma_A+90°)*G_{DA}(\gamma_A)$ for temporal direction $D_A$, $G(\gamma_B+90°)-G(\gamma_B)$ and $G_{DB}(\gamma_B+90°)*G_{DB}(\gamma_B)$ for nasal direction $D_B$, in central vision for LENS6, LENS7 and LENS8. One can see that distortion is improved for LENS 7 and LENS8 compared to LENS6. Moreover, distortion is improved for LENS8 compared to LENS7.

EXAMPLE 9

Prior Art

Example 9 corresponds to a lens LENS9 according to prior art. In this case, the power prescription is 0.0 δ and the addition is 1.00 δ. For this example 9, the astigmatism prescribed for the wearer is 2.00 δ, with an axis of 140°.

The front surface of the LENS9 is not shown in the Figures but it is a classical progressive surface as such for the one of LENS1. The same points A and B are considered. For point A, the maximum sphere $SPH_{max\_A}$ is equal to 5.52 δ, the minimum sphere $SPH_{min\_A}$ is equal to 4.75 δ and the cylinder axis $\gamma_{AX\_A}$=60°. For point B, the maximum sphere $SPH_{max\_B}$ is equal to 5.50 δ, the minimum sphere $SPH_{min\_B}$ is equal to 4.65 δ and the cylinder axis $\gamma_{AX\_B}$=126°.

Figure 93:
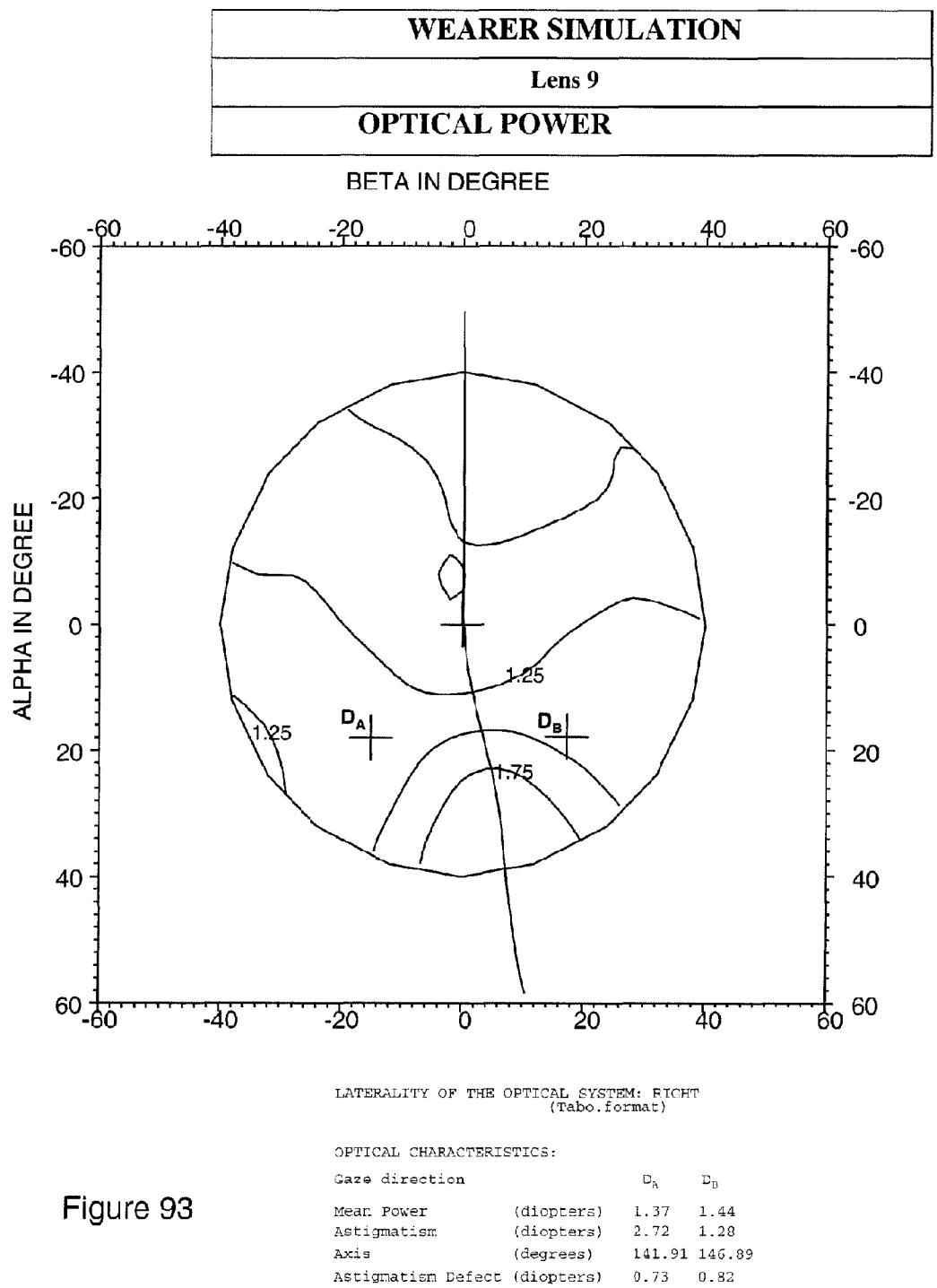
Figure 94:
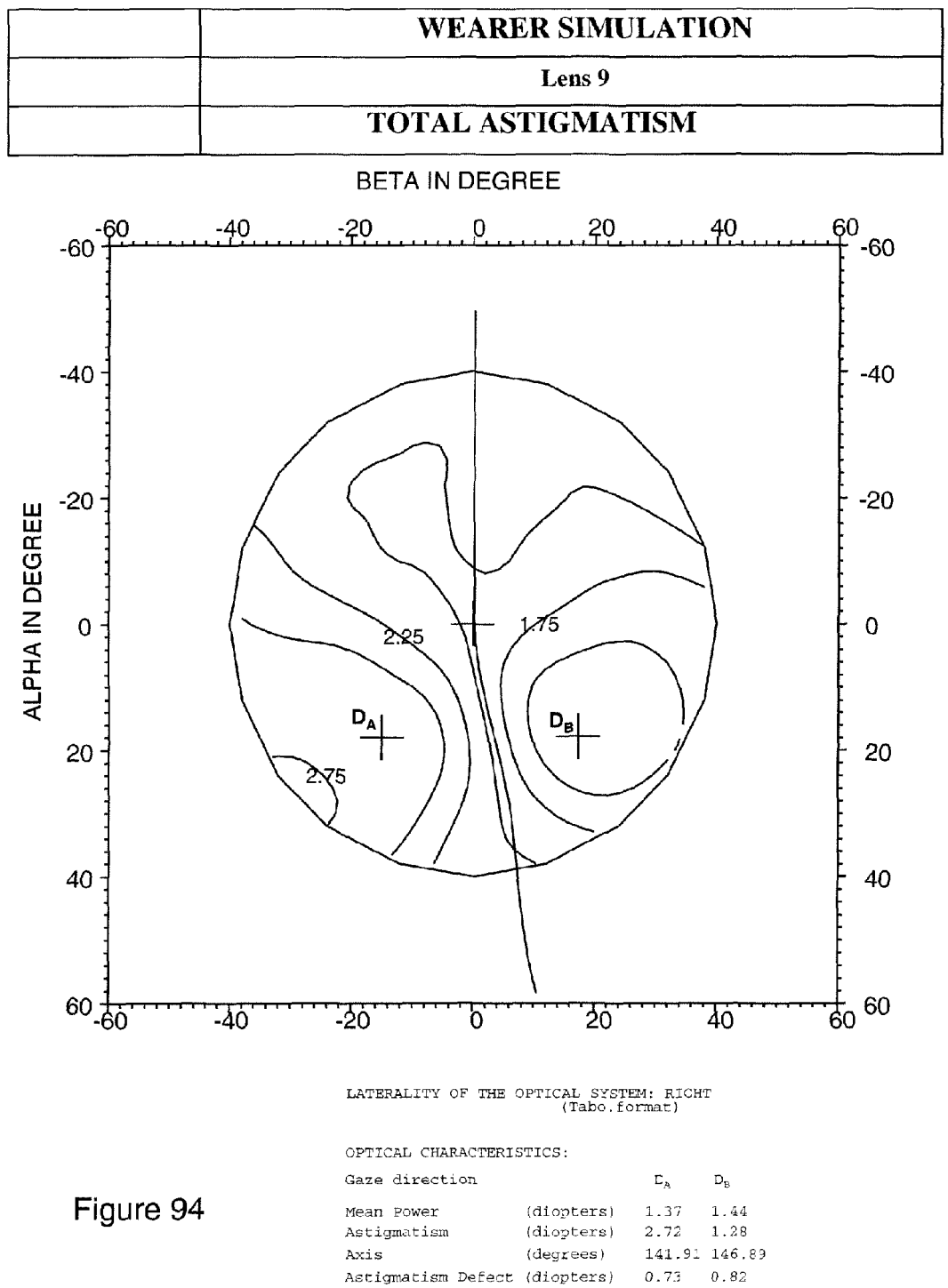

FIGS. 93 and 94 give optical analyses of the performance of the LENS9. As in example 1, for the sake of comparison, the same two specific directions $D_A$ and $D_B$ are considered.

For direction $D_A$, mean power is 1.37 δ, astigmatism is 2.72δ, axis of the defect astigmatism $\gamma_A$ is 142° and astigmatism defect is 0.73 δ. In addition, the distortion in this direction $D_A$ may be indicated by the value of $G(\gamma_A+90°)-G(\gamma_A)$ which amounts to 0.07396544. The corresponding value of $G(\gamma_A+90°)*G(\gamma_A)$ is 1.08283716.

For direction $D_B$, mean power is 1.44 δ, astigmatism is 1.28 δ, axis of the defect astigmatism $\gamma_B$ is 147° and astigmatism defect is 0.82 δ. The distortion in this direction $D_B$ may be indicated by the value of $G(\gamma_B+90°)-G(\gamma_B)$ which amounts to 0.03403641. The corresponding value of $G(\gamma_B+90°)*G(\gamma_B)$ is 1.048741551

These different characterizations will enable a comparison with LENS10 whose characteristics are developed in example 10. This example is a lens according to the invention made for the same prescription of the one of LENS9. Then, for this prescription, reference axes determined at step 16 of the method are $\Gamma_1$=140° in Portion 1 (Temporal_Area)

and $\Gamma_2=145°$ in Portion2 (Nasal Area), Portion 1 and Portion 2 of the front surface being determined from optical Portion1 and Portion 2 defined in the example 1.

The first step of the method (step 10 in FIG. 18) is to define a target optical function. The predetermined target optical function is the same for LENS9 and LENS10.

EXAMPLE 10

Figure 95:
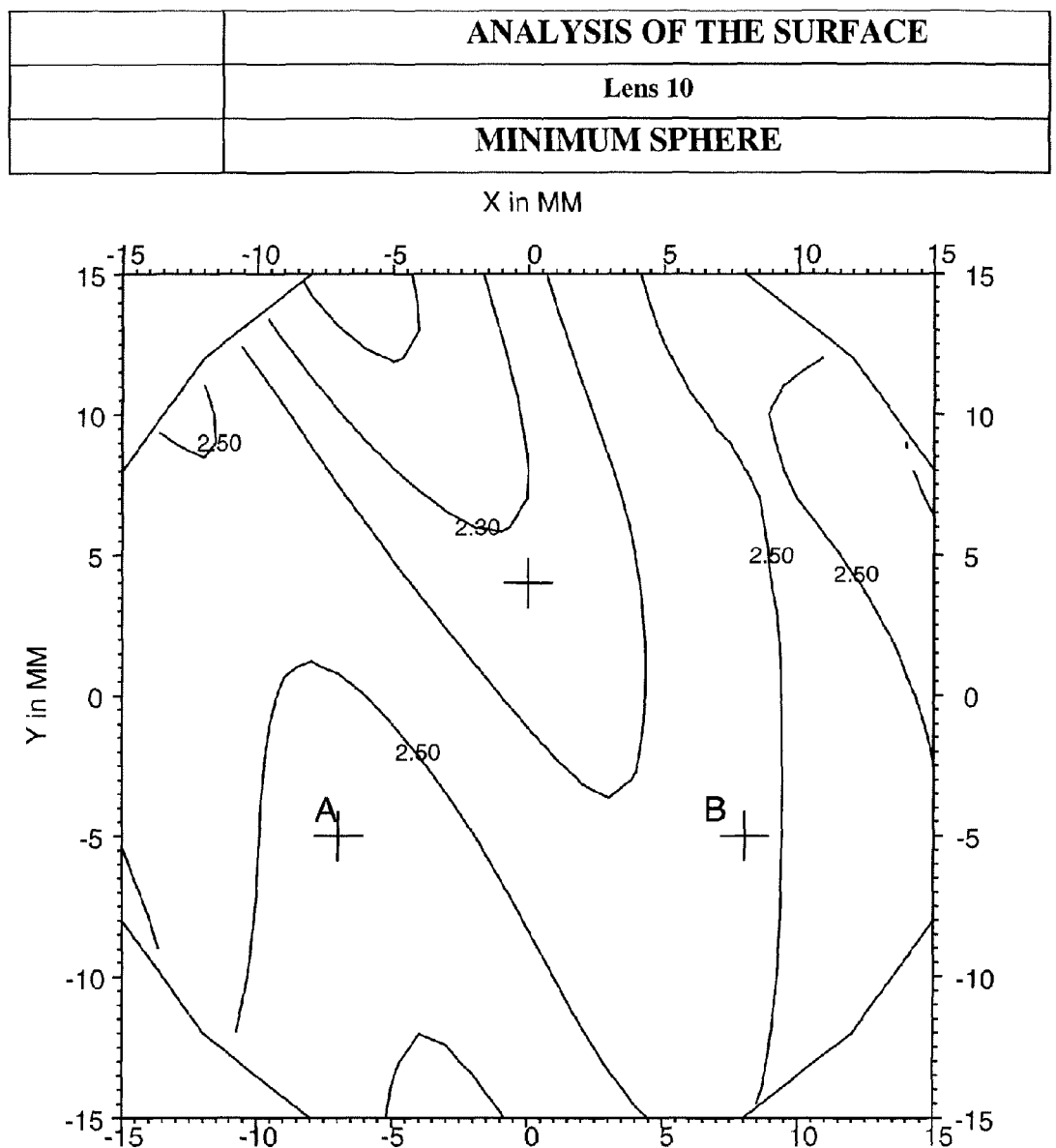
Figure 96:
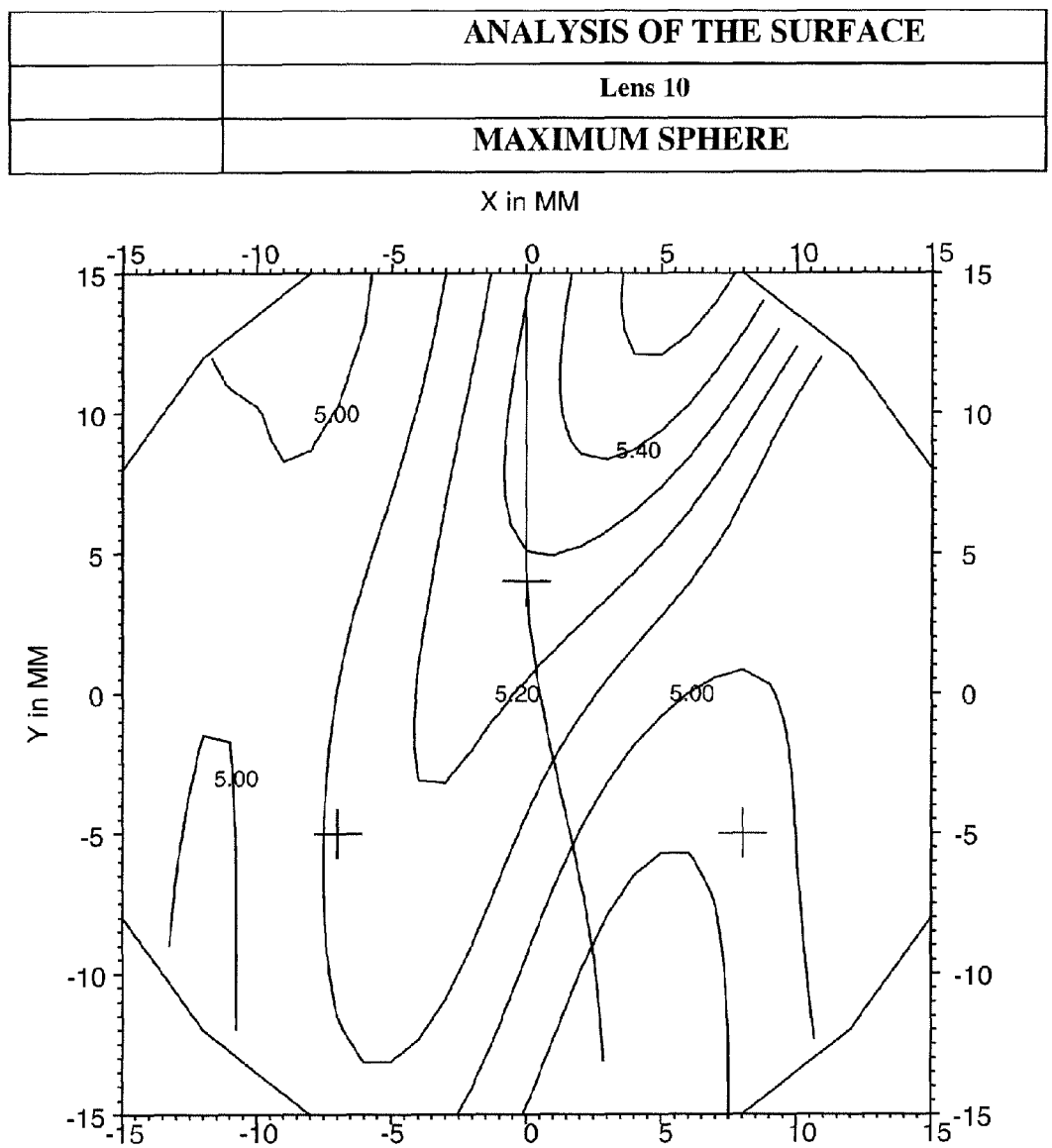
Figure 97:
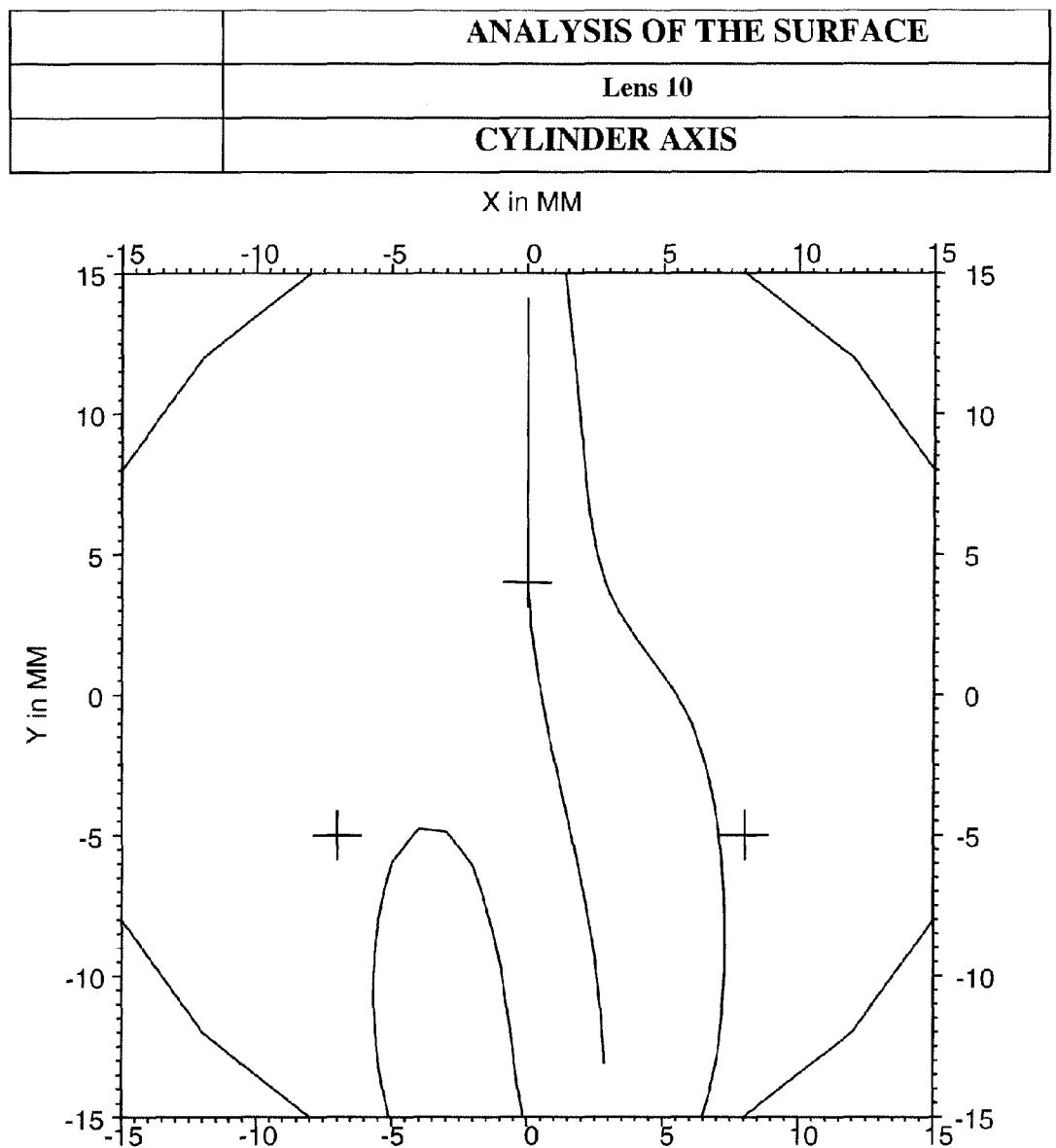

FIGS. 95, 96 and 97 are the surface characteristics of the front surface of LENS10. For point A, the maximum sphere $SPH_{max\_A}$ is equal to 5.12 δ, the minimum sphere $SPH_{min\_A}$ is equal to 2.54 δ and the cylinder axis $\gamma_{AX\_A}=144°$. For point B, the maximum sphere $SPH_{max\_B}$ is equal to 4.95 δ, the minimum sphere $SPH_{min\_B}$ is equal to 2.48 δ and the cylinder axis $\gamma_{AX\_B}=146°$.

Figure 98:
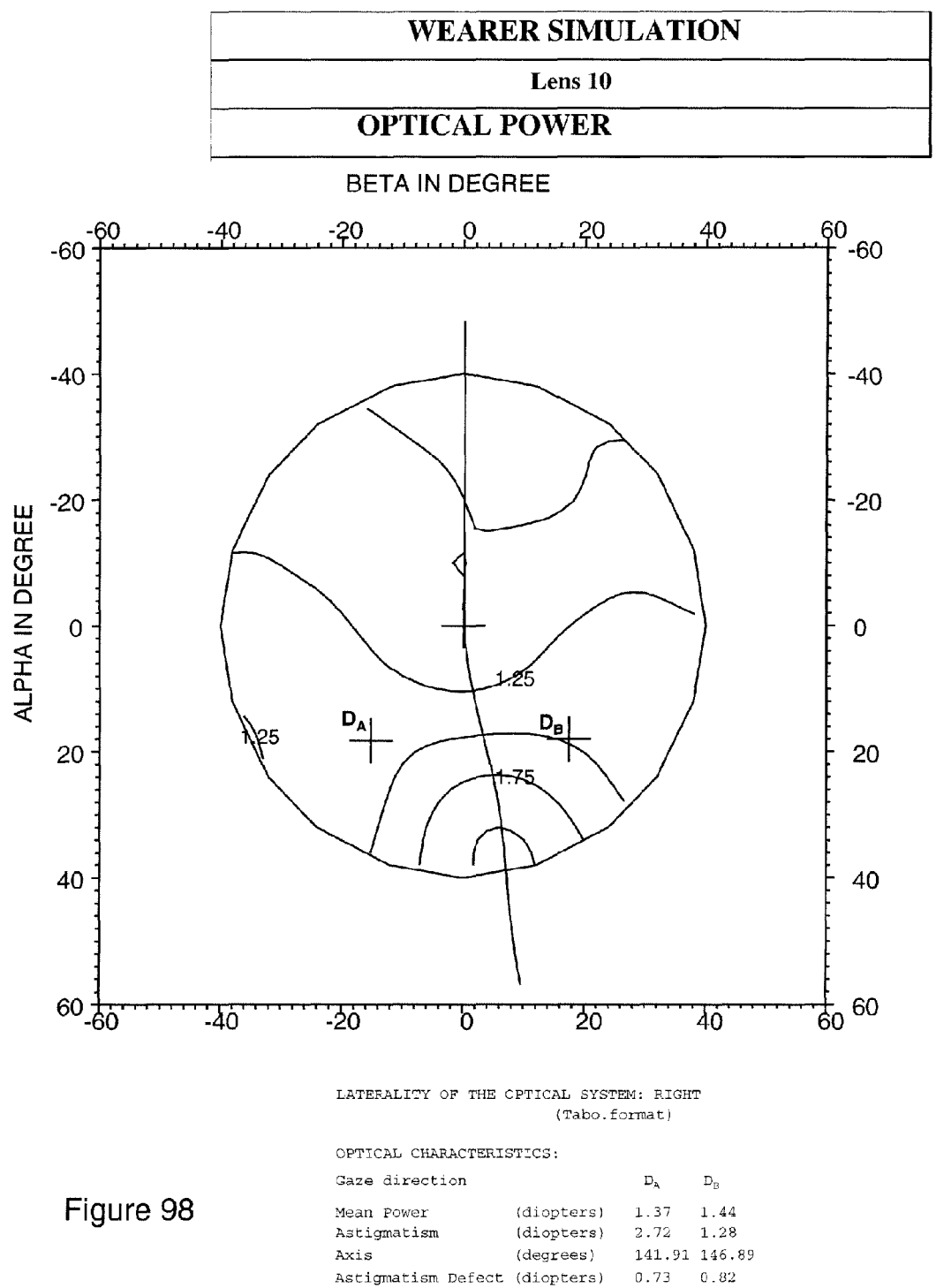
Figure 99:
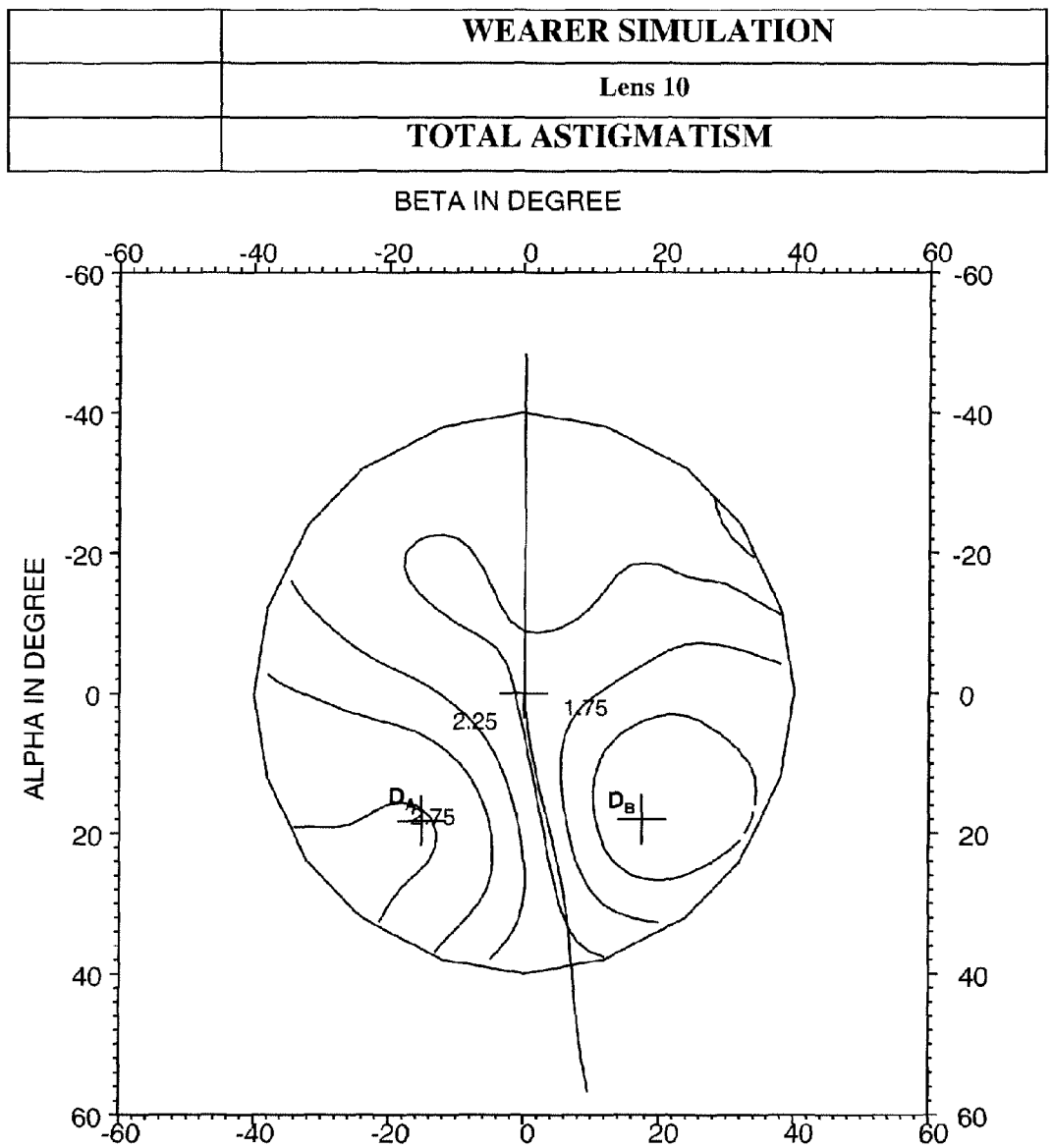

FIGS. 98 and 99 give optical analyses of the performance of the LENS10. For the sake of comparison, the two specific directions $D_A$ and $D_B$ previously defined are considered.

For direction $D_A$, mean power is 1.37 δ, astigmatism is 2.72δ, axis of the defect astigmatism $\gamma_A$ is 142° and astigmatism defect is 0.73 δ. For direction $D_B$, mean power is 1.44 δ, astigmatism is 1.28 δ, axis of the defect astigmatism $\gamma_B$ is 147° and astigmatism defect is 0.82 δ. This means that the optical performances of LENS10 in $D_A$ and $D_B$ are substantially the same as the optical performances of LENS9 regarding power and astigmatism values in central vision The distortion in this direction $D_A$ may be indicated by the value of $G(\gamma_A+90°)-G(\gamma_A)$ which amounts to 0.07097944. Compared to the value of LENS9, there is a reduction of 4.04%. Corresponding value of $G(\gamma_A+90°)*G(\gamma_A)$ is 1.08045844. Compared to the value of LENS9, there is a reduction of 0.20%

The distortion in this direction $D_B$ may be indicated by the value of $G(\gamma_B+90°)-G(\gamma_B)$ which amounts to 0.03238737. Compared to the value of LENS9, there is a reduction of 4.484%. The corresponding value of $G(\gamma_B+90°)*G(\gamma_B)$ is 1.08312921. Compared to the value of LENS9, there is a reduction of 0.23%.

For this prescription, $\Gamma_1$ and $\Gamma_2$ are substantially equal. So, a toric front surface whose axis is $\gamma_{Ax}=145°$ and eventually whose cylinder value equal to the cylinder value of the front surface of LENS10 will provide about the same result in term of the reduction in distortion.

Figure 100:
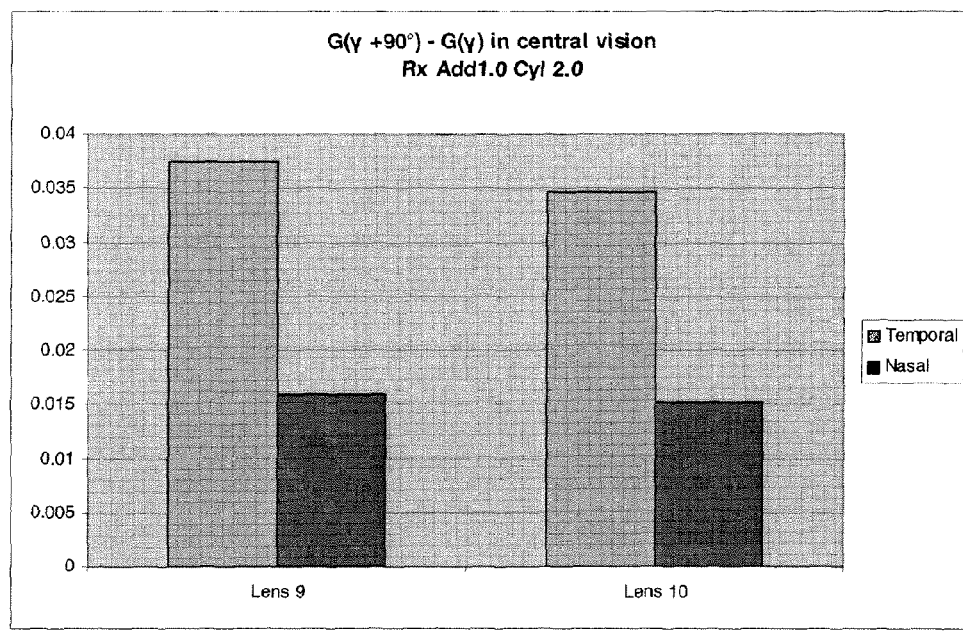
Figure 101:
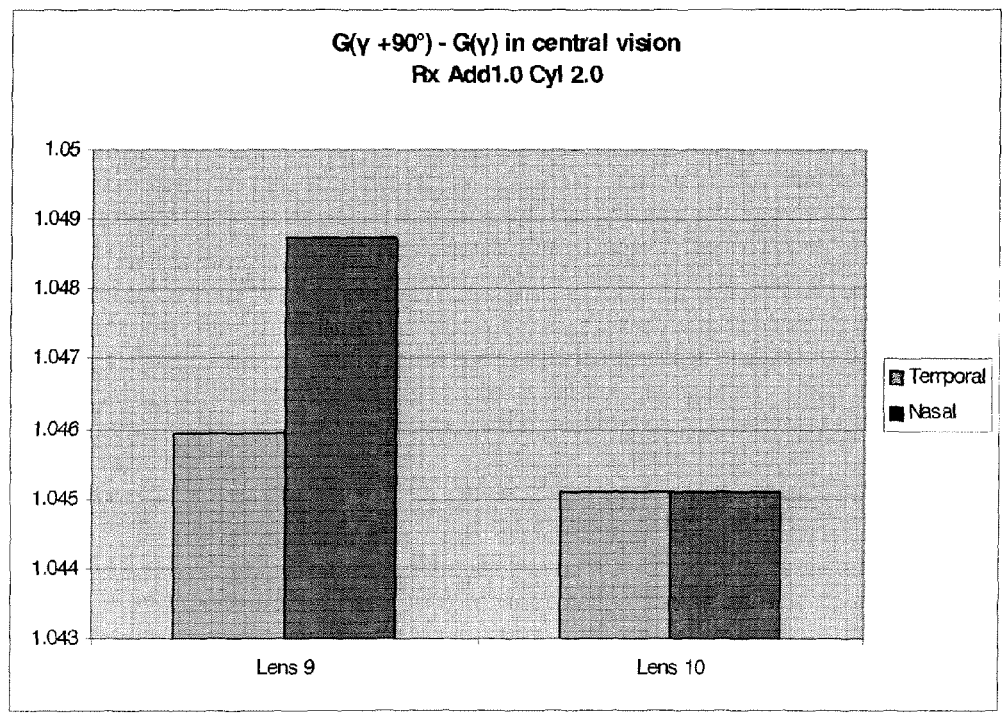

FIGS. 100 and 101 give $G_{DA}(\gamma_A+90°)-G_{DA}(\gamma_A)$ and $G_{DA}(\gamma_A+90°)*G_{DA}(\gamma_A)$ for temporal direction $D_A$, $G(\gamma_B+90°)-G(\gamma_B)$ and $G_{DB}(\gamma_B+90°)*G_{DB}(\gamma_B)$ for nasal direction $D_B$, for LENS9 and LENS10 in central vision and in peripheral vision. One can see that distortion is clearly improved for LENS10 compared to LENS9.

The examples 1 to 10 described above were given with conditions 1 and 2 being cumulated during determination of the first surface. It is however understood that only one of condition 1 or condition 2 may be used during determination of the first surface. The examples described above therefore apply for either the temporal portion or the nasal portion.

EXAMPLE 11

FIG. 102 is the surface characteristics of the front surface of LENS11 which is a toric surface. The maximum sphere, the minimum sphere and the axis values are constant over the surface. For all points and particularly for points A and B, the maximum sphere $SPH_{max}$ is equal to 5.0 δ, the minimum sphere $SPH_{min}$ is equal to 2.50 δ and the cylinder axis $\gamma_{AX}=145°$.

Figure 103:
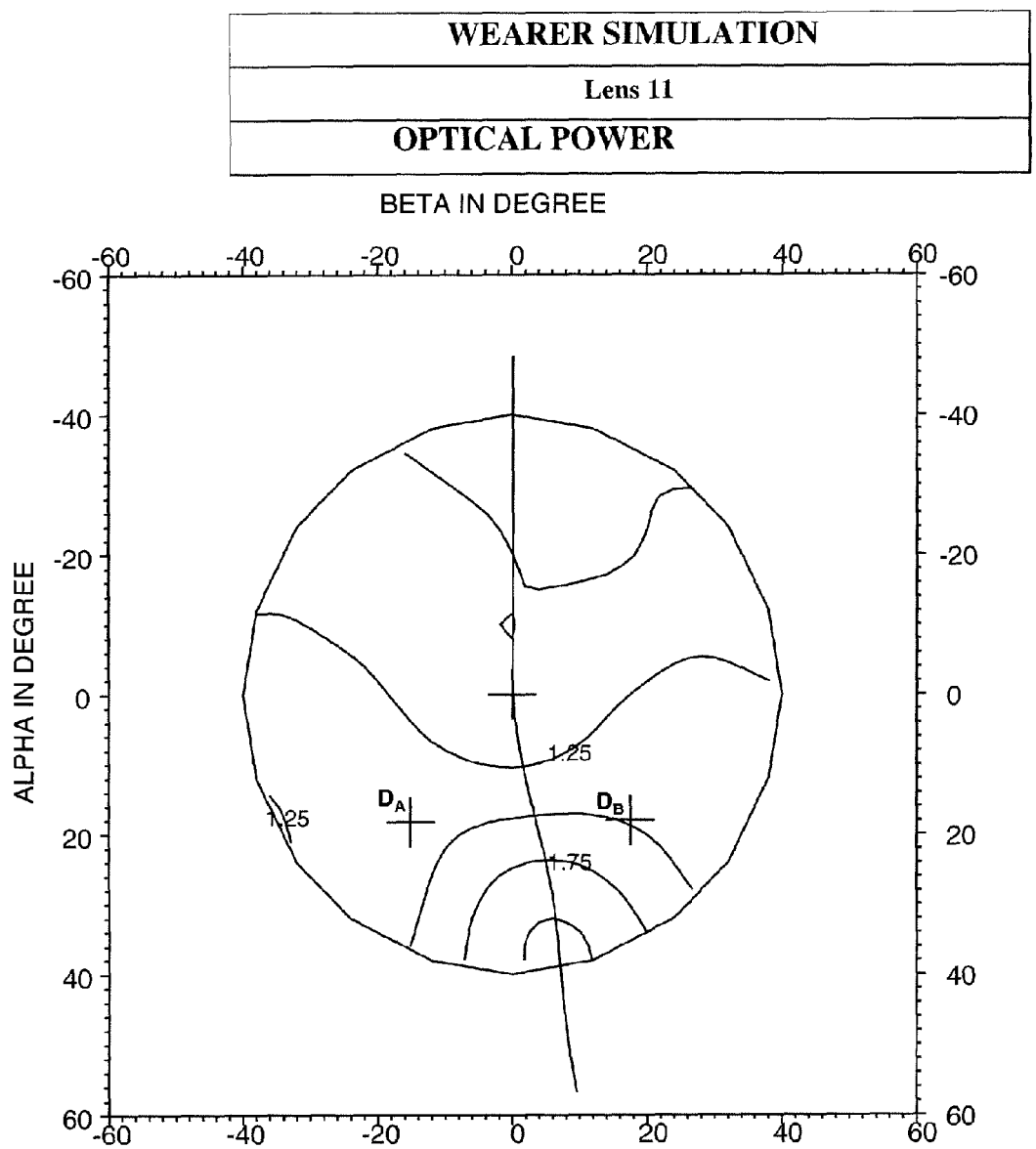
Figure 104:
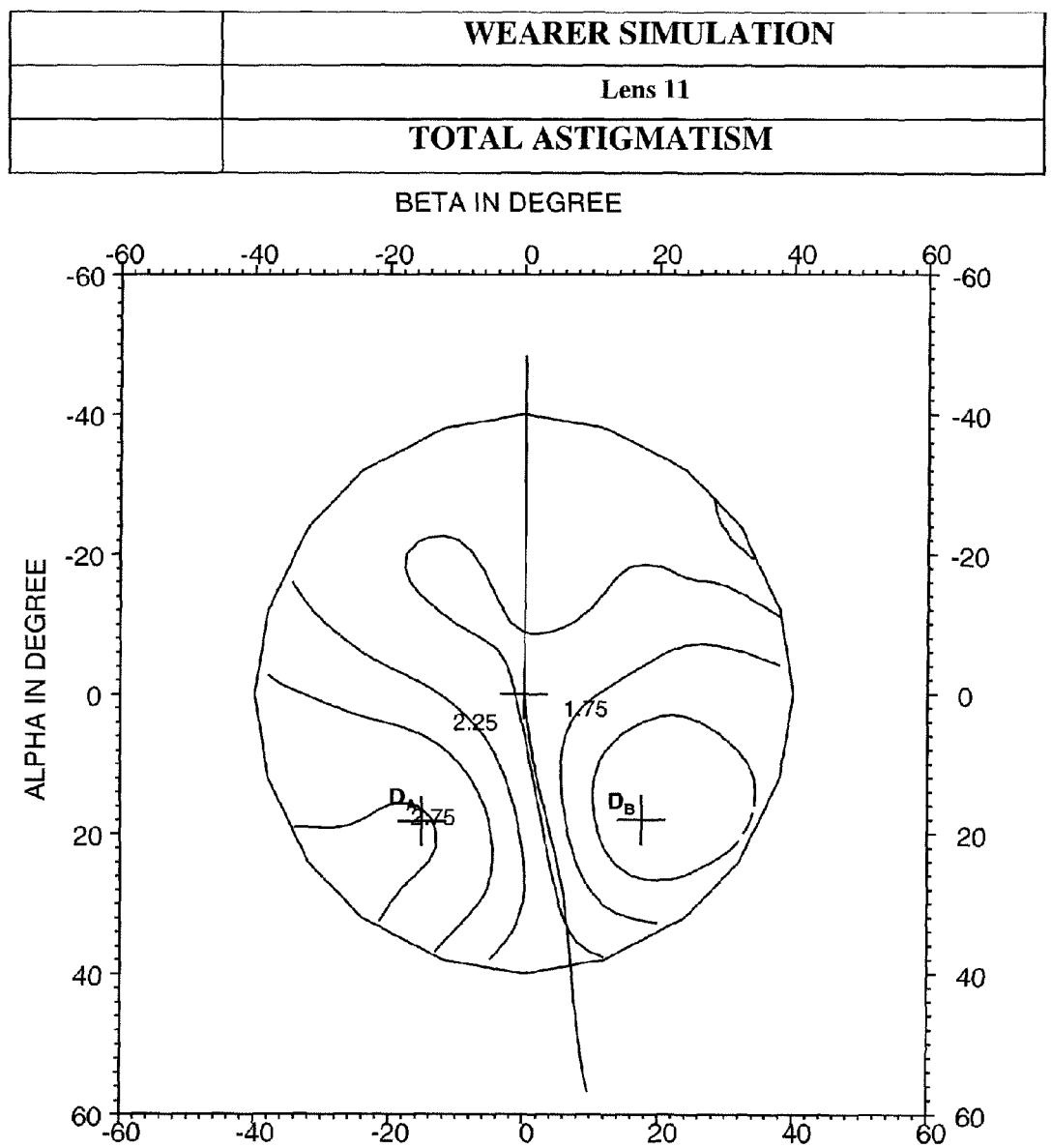

FIGS. 103 and 104 give optical analyses of the performance of the LENS11. For the sake of comparison, the two specific directions $D_A$ and $D_B$ previously defined are considered.

For direction $D_A$, mean power is 1.36 δ, astigmatism is 2.71δ, axis of the defect astigmatism $\gamma_A$ is 142° and astigmatism defect is 0.73 δ. For direction $D_B$, mean power is 1.43 δ, astigmatism is 1.27 δ, axis of the defect astigmatism $\gamma_B$ is 147° and astigmatism defect is 0.82 δ. This means that the optical performances of LENS11 in $D_A$ and $D_B$ are substantially the same as the optical performances of LENS9 regarding power and astigmatism values in central vision.

The distortion in this direction $D_A$ may be indicated by the value of $G(\gamma_A+90°)-G(\gamma_A)$ which amounts to 0.07105139. Compared to the value of LENS9, there is a reduction of 3.94%. Corresponding value of $G(\gamma_A+90°)*G(\gamma_A)$ is 1.08031271. Compared to the value of LENS9, there is a reduction of 0.23%

The distortion in this direction $D_B$ may be indicated by the value of $G(\gamma_B+90°)-G(\gamma_B)$ which amounts to 0.03236598. Compared to the value of LENS9, there is a reduction of 4.91%. The corresponding value of $G(\gamma_B+90°)*G(\gamma_B)$ is 1.08319312. Compared to the value of LENS9, there is a reduction of 0.22%.

LENS11 with a toric front surface provides about the same result in term of the reduction in distortion as LENS10.

EXAMPLE 12

In this case, the power prescription is 0.0 δ and the addition is 2.5 δ. For this example 12, the astigmatism prescribed for the wearer is 2.00 δ, with an axis of 45°.

Figure 106:
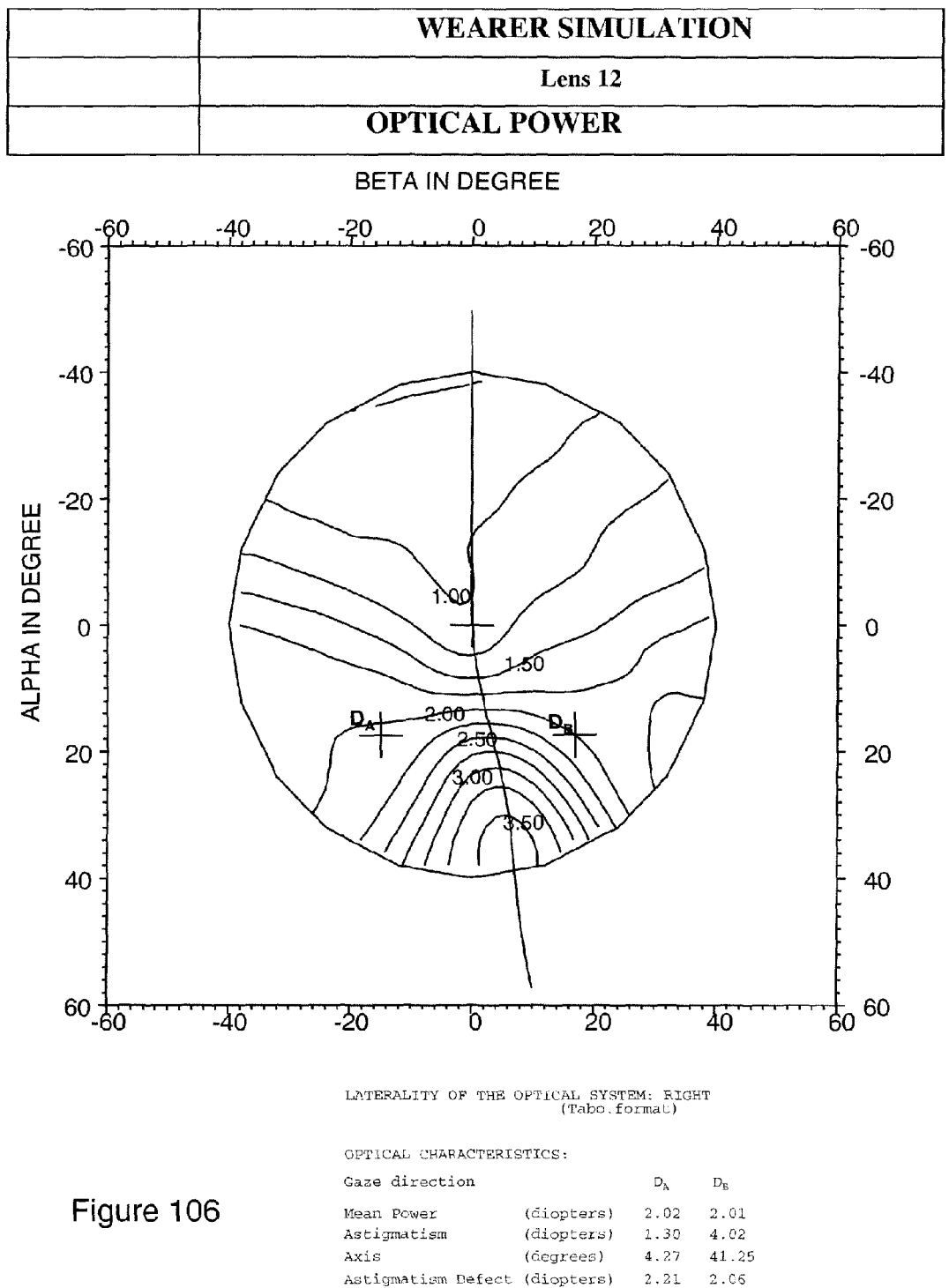
Figure 107:
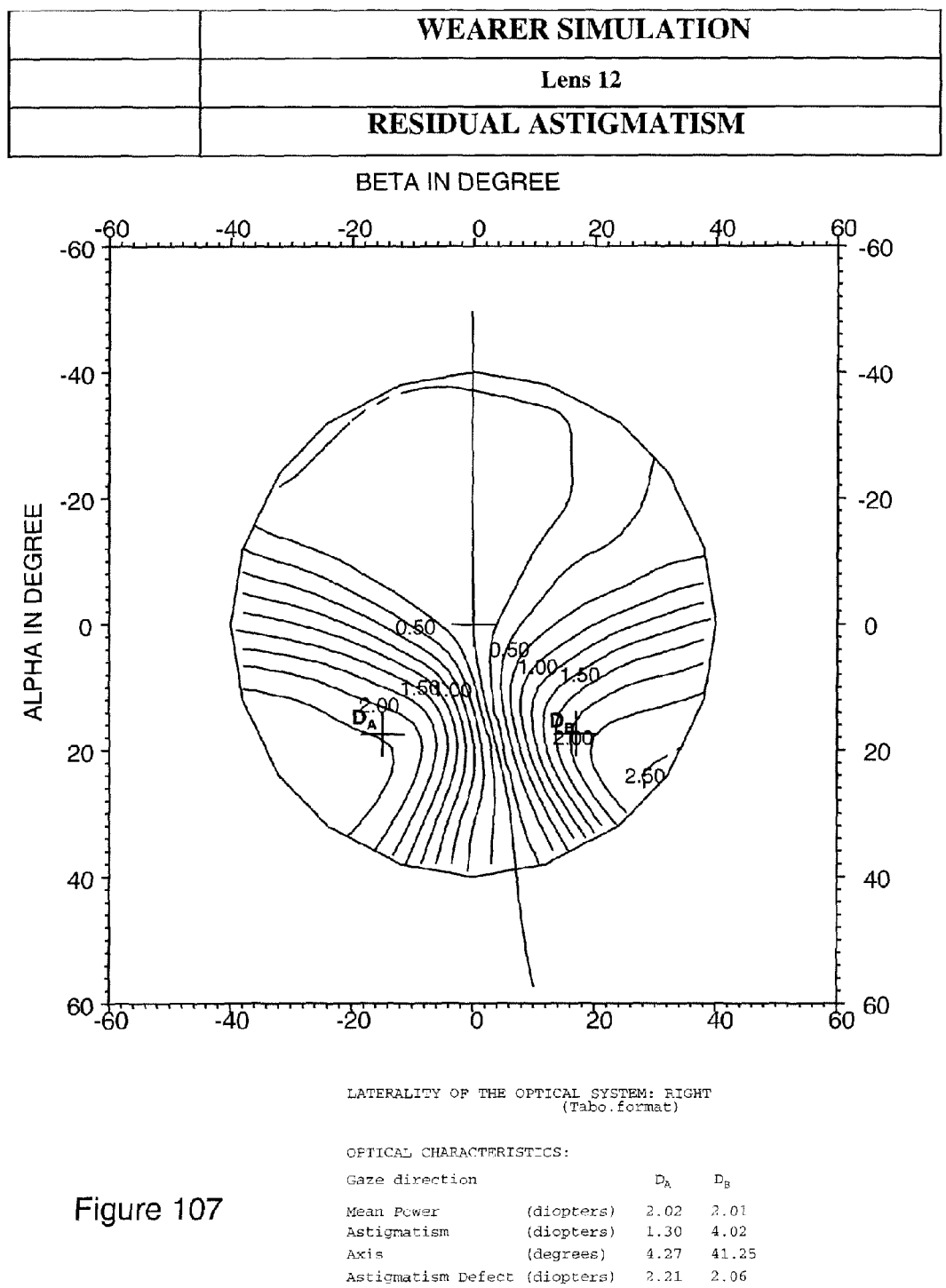
Figure 108:
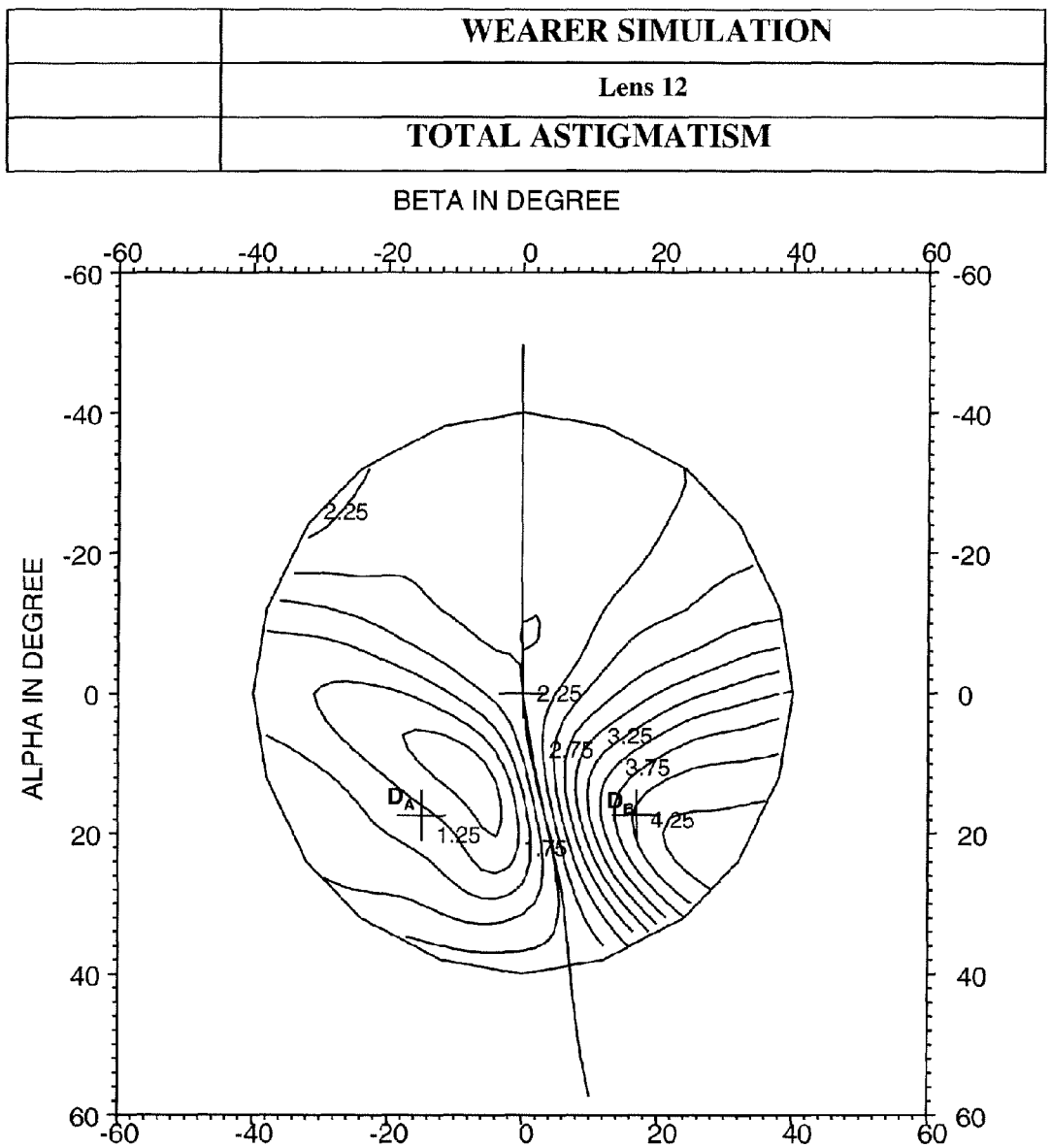

FIG. 105 is the surface characteristics of the front surface of LENS12 which is a toric surface. For all points and particularly for points A and B, the maximum sphere $SPH_{max}$ is equal to 4.8 δ, the minimum sphere $SPH_{min}$ is equal to 2.8 δ and the cylinder axis $\gamma_{AX}=6°$ FIGS. 106, 107 and 108 give optical analyses of the performance of the LENS12. For the sake of comparison, only the specific direction $D_A$ is considered.

For direction $D_A$, mean power is 2.02 δ, astigmatism is 1.30 δ, axis of the defect astigmatism $\gamma_A$ is 4° and astigmatism defect is 2.21 δ.

The distortion in this direction $D_A$ may be indicated by the value of $G(\gamma_A+90°)-G(\gamma_A)$ which amounts to 0.03854906. Compared to the value of LENS9, there is a reduction of 7.16%. Corresponding value of $G(\gamma_A+90°)*G(\gamma_A)$ is 1.12203026. Compared to the value of LENS6, there is a reduction of 0.35%.

LENS12 with a toric front surface which cylinder axis $\gamma_{AX}$ orientation is defined as almost equal to the first reference axis $\Gamma_1=5°$ (about equal to $\gamma_A$) provides good result in term of the reduction in distortion in the temporal side. For LENS 12, conditions 1 and 1' as defined above were used to determine the front surface.

Although not illustrated, a lens having reduced distortion on the nasal side could be defined in a similar way by defining a toric front surface having an orientation of the axis defined with $\Gamma_2$ only.

The invention claimed is:
1. A method for manufacturing a progressive ophthalmic lens, the lens comprising a main meridian (32) separating the lens in a nasal area (Area_nasal) and a temporal area (Area_temporal), the method comprising the steps of determining the lens by:
choosing a target optical function suited to a wearer, the target optical function defining, for each gaze direction when the lens is worn, a refractive power ($P_{\alpha,\beta}$), a module of astigmatism ($Ast_{\alpha,\beta}$) and an axis of astigmatism ($\gamma_{\alpha,\beta}$), each gaze direction corresponding to a lowering angle ($\alpha$) and to an azimuth angle ($\beta$);
defining a front surface of the lens and a rear surface of the lens, each surface having in each point a mean sphere value ($SPH_{mean}$), a cylinder value (CYL) and a cylinder axis ($\gamma_{AX}$), the front surface and the rear surface each being non-rotationally symmetrical aspheric surfaces,
defining at least one first portion (Portion1) in the temporal area (Area_temporal) and at least one second portion (Portion2) in the nasal area (Area_nasal);
for at least one of the first or the second portion of the front surface (Portion1, Portion2), determining respectively a first or a second reference axes ($\Gamma_1$, $\Gamma_2$), the first reference axis ($\Gamma_1$) being set to a value comprised between [$\gamma_T$−20°, $\gamma_T$+20°] with $\gamma_T$ being the average axis of astigmatism of the target optical function for gaze directions intersecting the front surface over the first temporal portion (Portion1), and the second reference axis ($\Gamma_2$) being set to a value comprised between [$\gamma_N$−20°, $\gamma_N$+20°] with $\gamma_N$ being the average axis of astigmatism of the target optical function for gaze directions intersecting the front surface over the second nasal portion (Portion2), the average axis($\gamma_N$, $\gamma_T$) of astigmatism of the target optical function defining a direction of smallest optical power; and
modifying the front surface so that:
over the first portion (Portion1), the sphere value (SPH ($\Gamma_1$)) along the first reference axis is superior to the sphere value (SPH($\perp\Gamma_1$)) along a perpendicular axis to the first reference axis (SPH ($\Gamma_1$)>SPH($\perp\Gamma_1$)); or
over the second portion (Portion2), the sphere value (SPH($\Gamma_2$)) along the second reference axis is superior to the sphere value (SPH($\perp\Gamma_2$)) along a perpendicular axis to the second reference axis (SPH ($\Gamma_2$)>SPH ($\perp\Gamma_2$));
the method further comprising manufacturing the progressive ophthalmic lens having the modified front surface.

2. The method according to claim 1, wherein the first and the second reference axes ($\Gamma_1$, $\Gamma_2$) are determined respectively for the first and second portion of the front surface (Portion1, Portion2) and wherein the front surface is modified so that:
over the first portion (Portion1), the sphere value (SPH ($\Gamma_1$)) along the first reference axis is superior to the sphere value (SPH($\perp\Gamma_1$)) along a perpendicular axis to the first reference axis (SPH ($\Gamma_1$)>SPH($\perp\Gamma_1$)); and
over the second portion (Portion2), the sphere value (SPH($\Gamma_2$)) along the second reference axis is superior to the sphere value (SPH($\perp\Gamma_2$)) along a perpendicular axis to the second reference axis (SPH($\Gamma_2$)>SPH ($\perp\Gamma_2$)).

3. The method according to claim 1, wherein the first reference axis ($\Gamma_1$) is determined for the first portion of the front surface (Portion1) and wherein the front surface is modified so that:
over the first portion (Portion1), the sphere value (SPH ($\Gamma_1$)) along the first reference axis is superior to the sphere value (SPH($\perp\Gamma_1$)) along a perpendicular axis to the first reference axis (SPH($\Gamma_1$)>SPH($\perp\Gamma_1$)); and
over the second portion (Portion2), the sphere value (SPH($\Gamma_1$)) along the first reference axis is superior to the sphere value (SPH($\perp\Gamma_1$)) along a perpendicular axis to the first reference axis (SPH($\Gamma_1$)>SPH($\perp\Gamma_1$)).

4. The method according to claim 1, wherein the second reference axis ($\Gamma_2$) is determined for the second portion of the front surface (Portion2) and wherein the front surface is modified so that:
over the first portion (Portion1), the sphere value (SPH ($\Gamma_2$)) along the second reference axis is superior to the sphere value (SPH($\perp\Gamma_2$)) along a perpendicular axis to the second reference axis (SPH($\Gamma_2$)>SPH($\perp\Gamma_2$)); and
over the second portion (Portion2), the sphere value (SPH($\Gamma_2$)) along the second reference axis is superior to the sphere value (SPH($\perp\Gamma_2$)) along a perpendicular axis to the second reference axis (SPH($\Gamma_2$)>SPH($\perp_2$)).

5. The method according to claim 3, wherein the front surface is modified so that the front surface is a toric surface with a cylinder axis ($\gamma_{AX}$) in each point set to the determined reference axis ($\Gamma_1$ or $\Gamma_2$).

6. The method according to claim 1, wherein the first reference axis ($\Gamma_1$) is set to the average axis of astigmatism ($\gamma_T$) over the first temporal portion (Portion1) and wherein the second reference axis ($\Gamma_2$) is set to the average axis of astigmatism ($\gamma_N$) over the second nasal portion (Portion2).

7. The method according to claim 1, wherein each respective reference axis ($\Gamma_1$, $\Gamma_2$) is defined by optical optimization to minimize the distortion over the respective portion (Portion1, Portion2).

8. The method according to claim 1, wherein the front surface has an upper part constituted by points of intersection with gaze directions corresponding to a negative lowering angle ($\alpha$) and a lower part of the lens constituted by points of intersection with gaze directions corresponding to a positive lowering angle ($\alpha$), a vertical axis being defined based on micro-markings of the lens,
the front surface being also modified so that:
over the first portion (Portion1), the mean sphere value ($SPH_{mean}$) decreases along any line parallel to the vertical axis orientated from the upper part to the lower part, and
over the second portion (Portion2), the mean sphere value ($SPH_{mean}$) decreases along any line parallel to the vertical axis orientated from the upper part to the lower part.

9. A non-transitory computer readable medium with a computer program product comprising one or more stored sequence of instruction that is accessible to a processor and which, when executed by the processor, causes the processor to carry out the steps of claim 1.

10. A set of data comprising data relating to a front surface of a lens determined according to the method of claim 1.

11. The method for manufacturing a progressive ophthalmic lens according to claim 1, further comprising the steps of:
providing data relative to the eyes of the wearer,
transmitting data relative to the wearer,
transmitting data relative to the front surface,
carrying out an optical optimization of the lens based on the transmitted data relative to the front surface, and transmitting the result of the optical optimization,
wherein the step of manufacturing the progressive ophthalmic lens is carried out according to the result of the optical optimization.

* * * * *